United States Patent
Nagae et al.

(10) Patent No.: US 7,954,713 B2
(45) Date of Patent: Jun. 7, 2011

(54) TAG LABEL PRODUCING DEVICE

(75) Inventors: Tsuyoshi Nagae, Kasugai (JP); Satoru Moriyama, Iwakura (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 1009 days.

(21) Appl. No.: 11/649,622

(22) Filed: Jan. 4, 2007

(65) Prior Publication Data

US 2007/0172290 A1    Jul. 26, 2007

(30) Foreign Application Priority Data

Jan. 13, 2006   (JP) ................................. 2006-006301

(51) Int. Cl.
*G06K 7/00* (2006.01)
(52) U.S. Cl. .................. 235/435; 235/375; 235/487
(58) Field of Classification Search .................. 235/375, 235/435, 451, 487
See application file for complete search history.

(56) References Cited

U.S. PATENT DOCUMENTS

| 2004/0238098 | A1 | 12/2004 | Bleckmann |
| 2005/0139667 | A1* | 6/2005 | Barrus et al. ................... 235/432 |
| 2005/0274800 | A1* | 12/2005 | Chapman et al. ............. 235/432 |
| 2007/0023516 | A1* | 2/2007 | Chapman et al. ............. 235/432 |
| 2007/0084548 | A1 | 4/2007 | Tanaka |

FOREIGN PATENT DOCUMENTS

| JP | 09-300793 | 11/1997 |
| JP | 2005-092699 | 4/2005 |
| WO | WO2005/101306 | 10/2005 |

* cited by examiner

*Primary Examiner* — Daniel A Hess
*Assistant Examiner* — Paultep Savusdiphol
(74) *Attorney, Agent, or Firm* — Day Pitney LLP

(57) ABSTRACT

The tag-label producing device includes: a cartridge holder for selectively installing a first roll and a first roll; a tape feed roller, a ribbon take-up roller, and a switching mechanism that impart a drive force in the tape length direction to this tape; an antenna for performing transmission/reception of information through wireless communication to/from an IC circuit part of an RFID circuit element, upon the installation of the first roll; a cartridge sensor for detecting which one of the first rolls has been installed; and a control circuit including a tag tape mode and an ordinary-tape mode, for controlling a drive unit by switching between the modes.

8 Claims, 42 Drawing Sheets

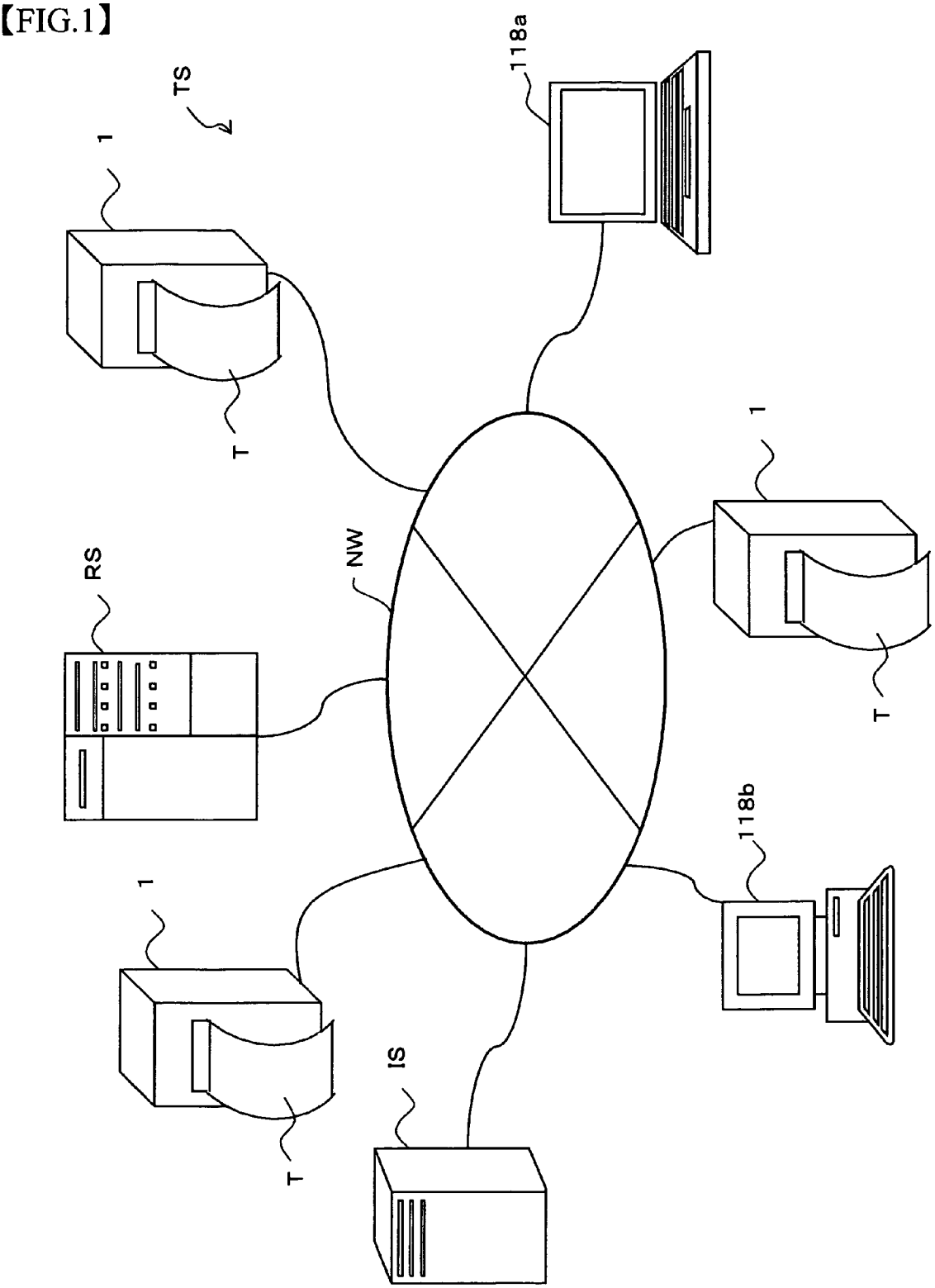
[FIG.1]

[FIG.2]
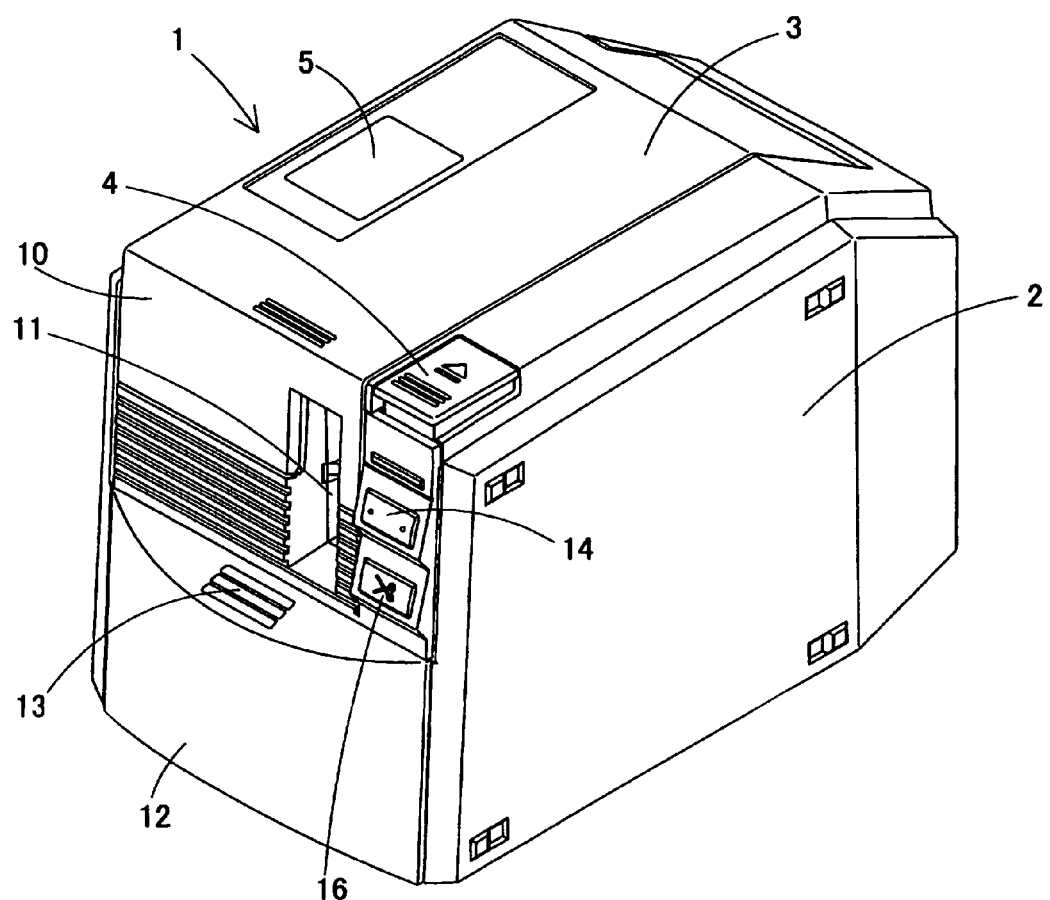

[FIG.3]
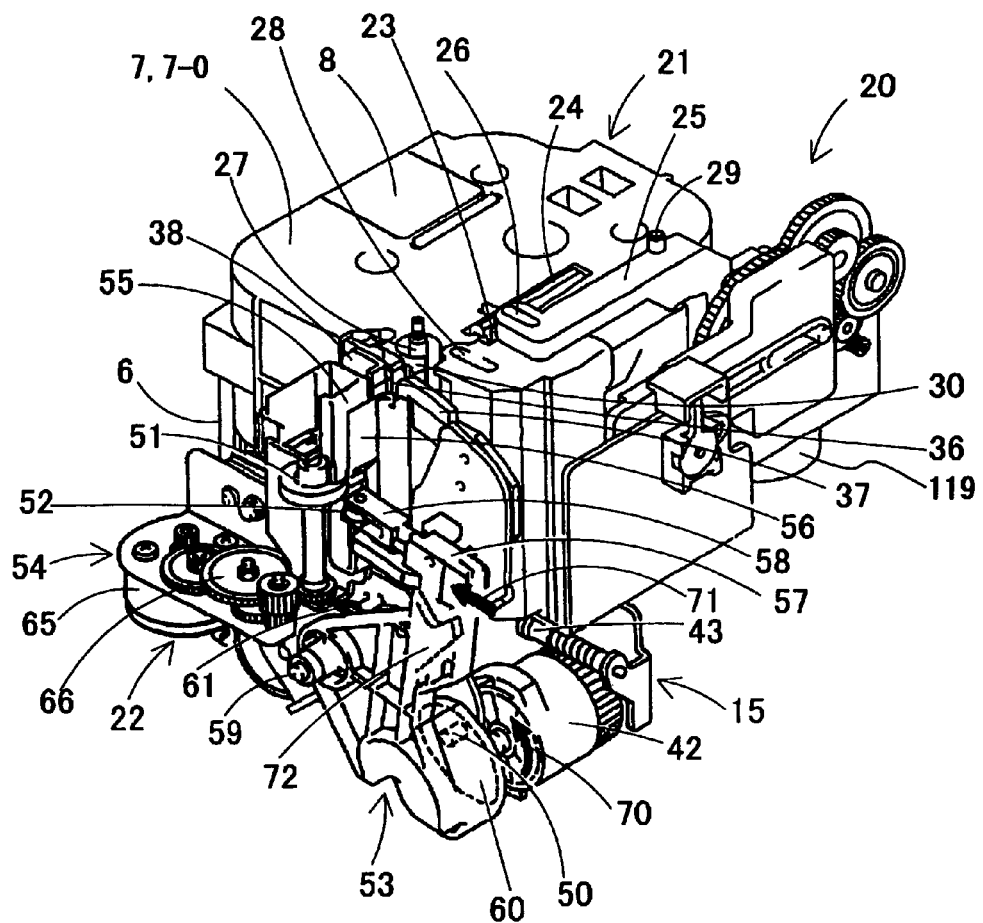

[FIG.4]
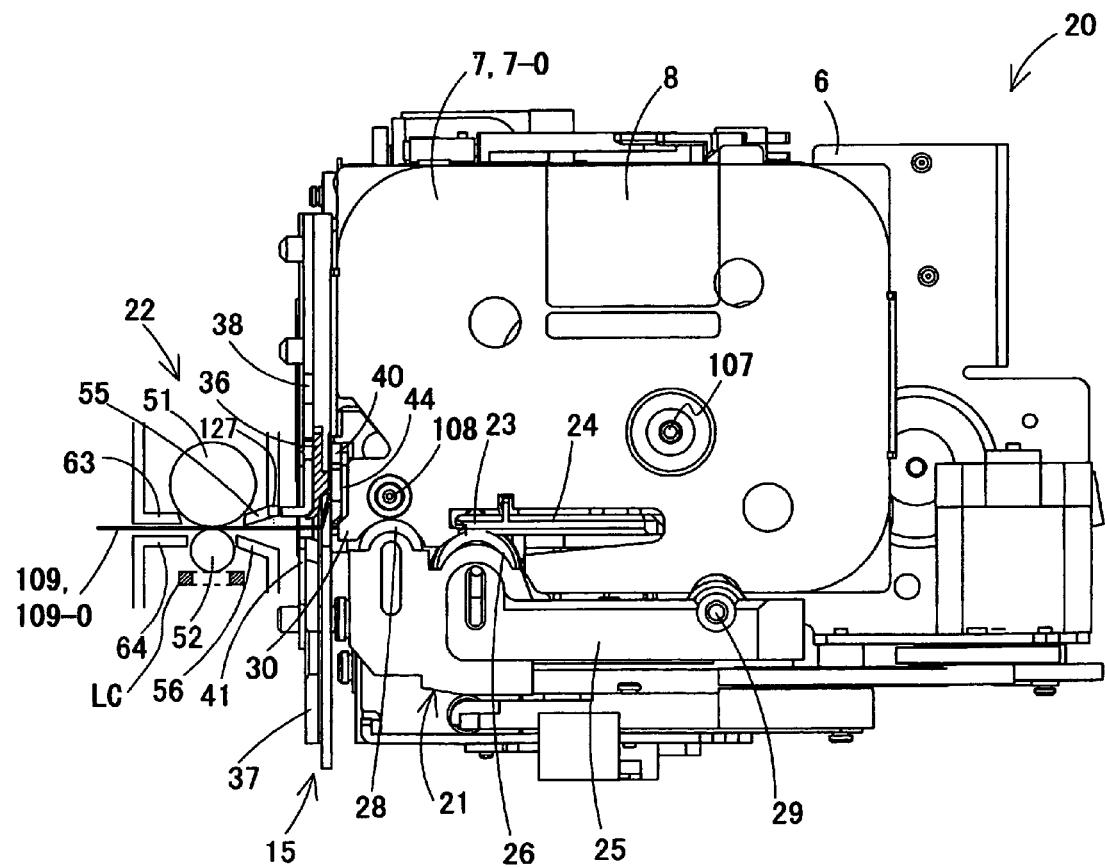

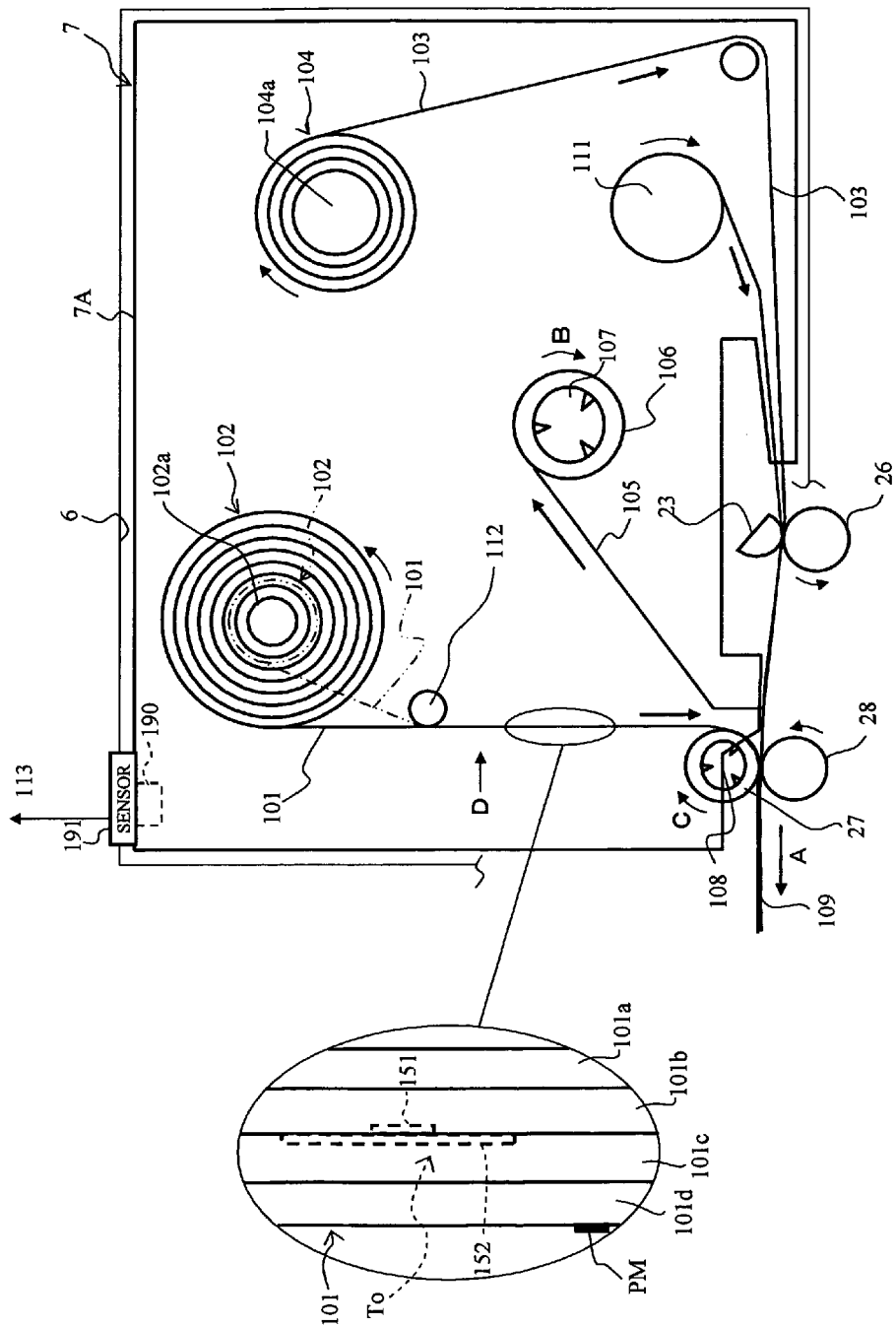
[FIG.5]

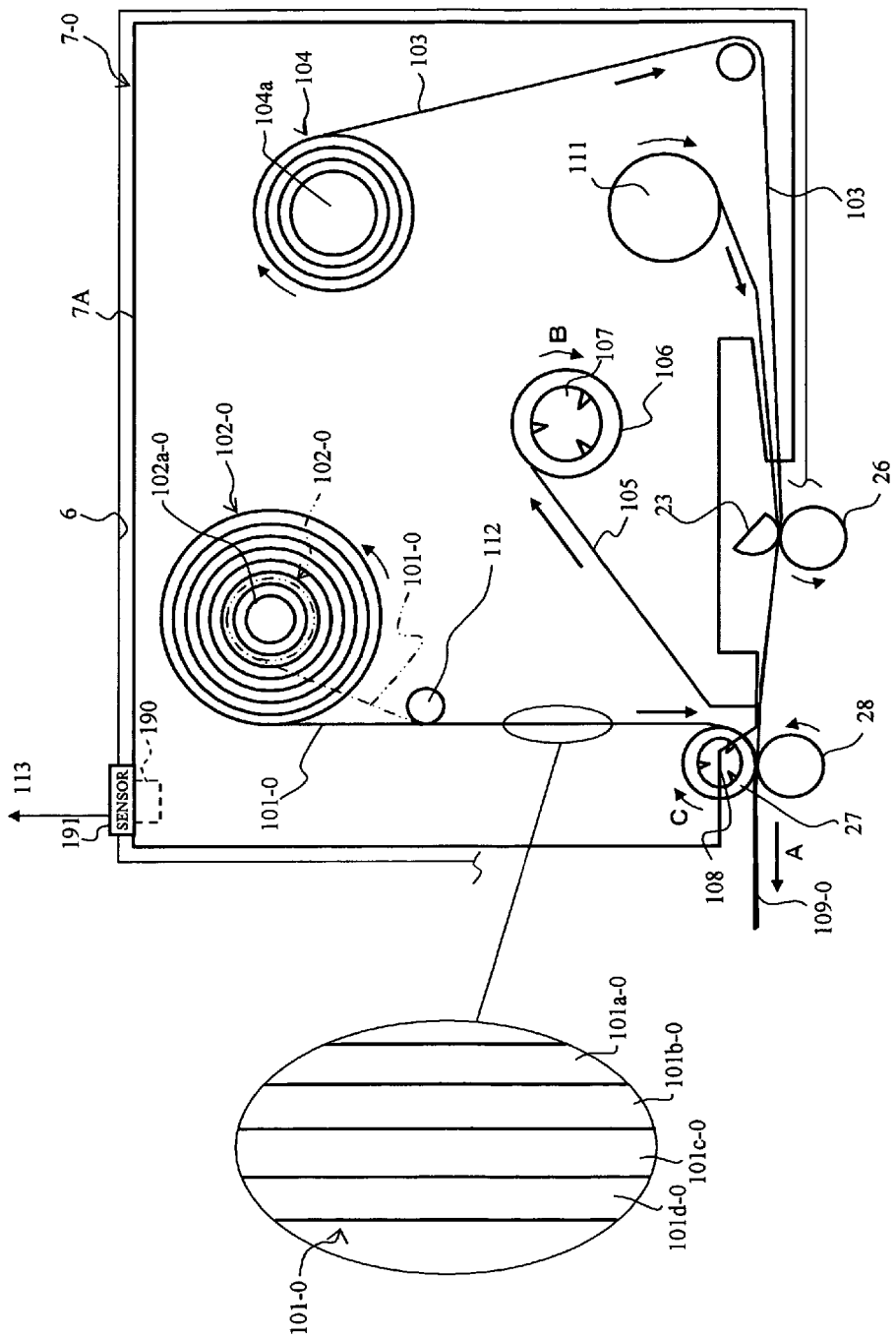
[FIG.6]

[FIG.7]
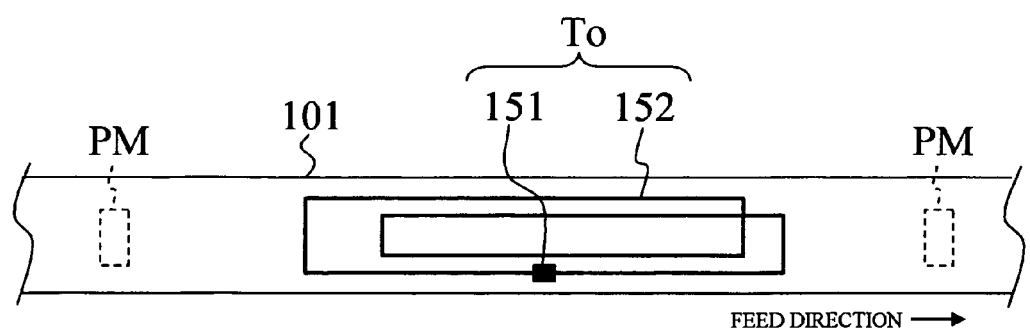

【FIG.8】
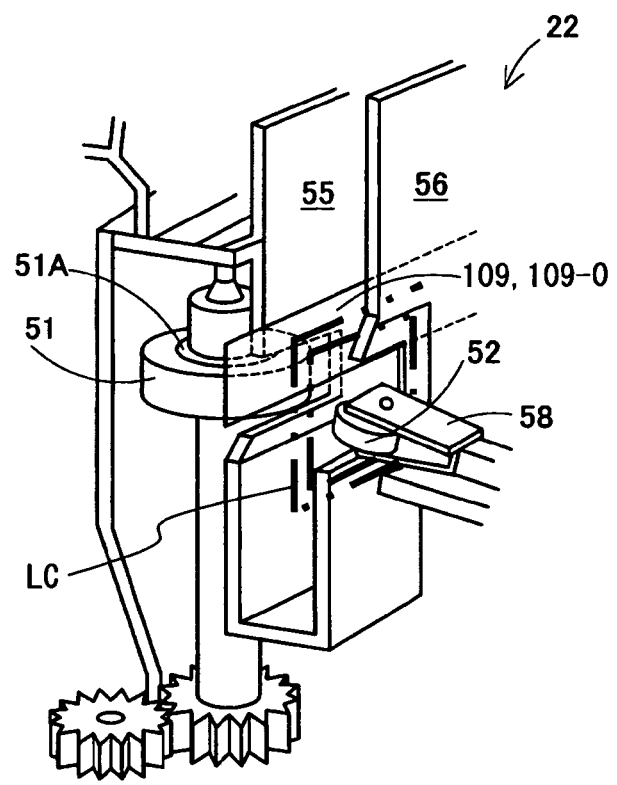

[FIG.9]
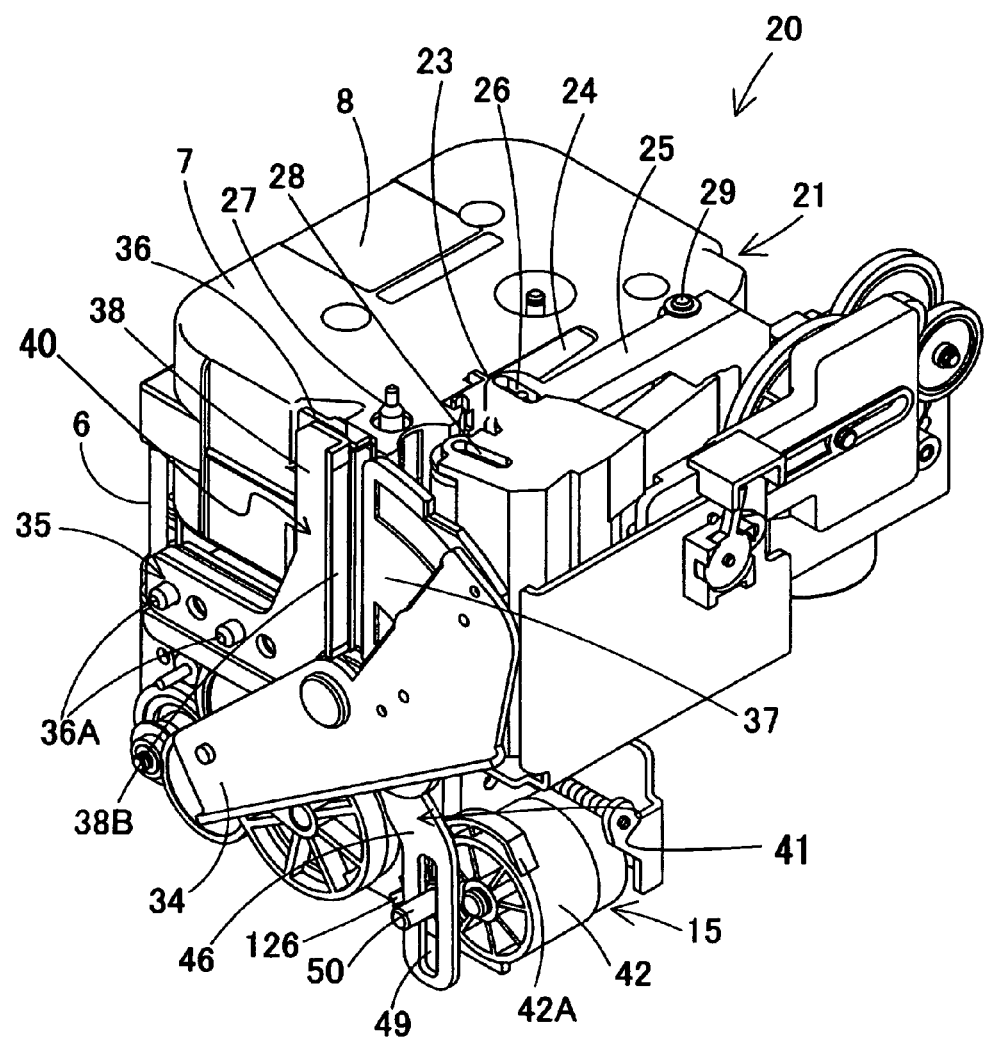

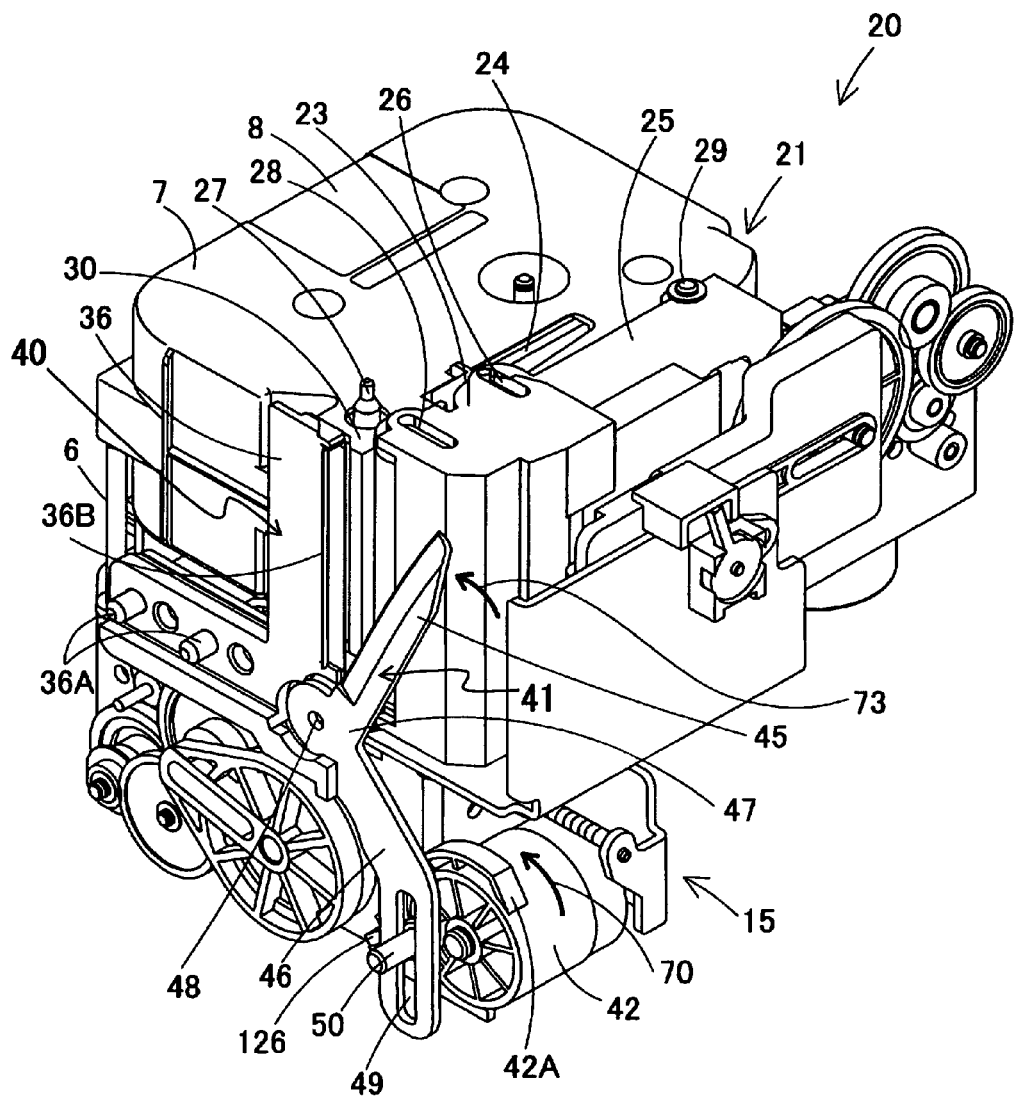
[FIG.10]

[FIG.11]
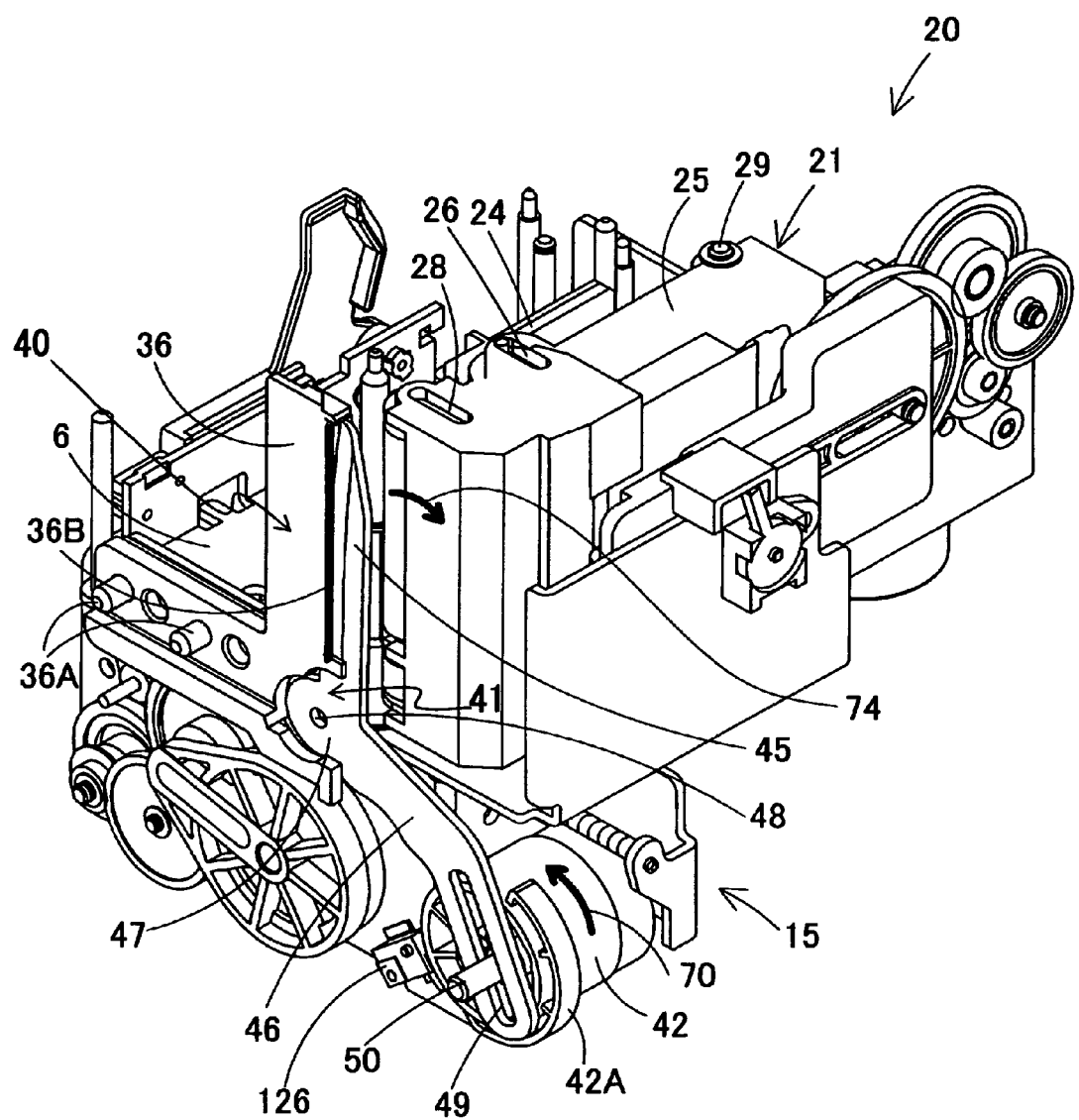

[FIG.12]
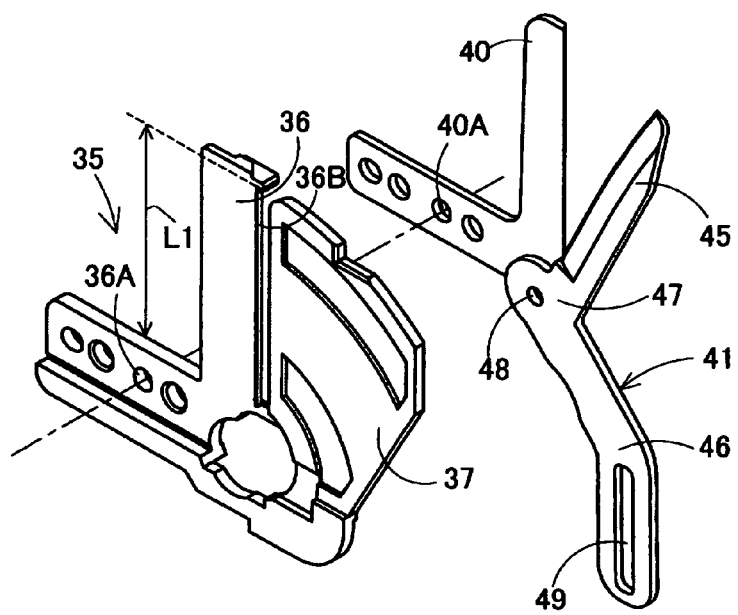
[FIG.13]
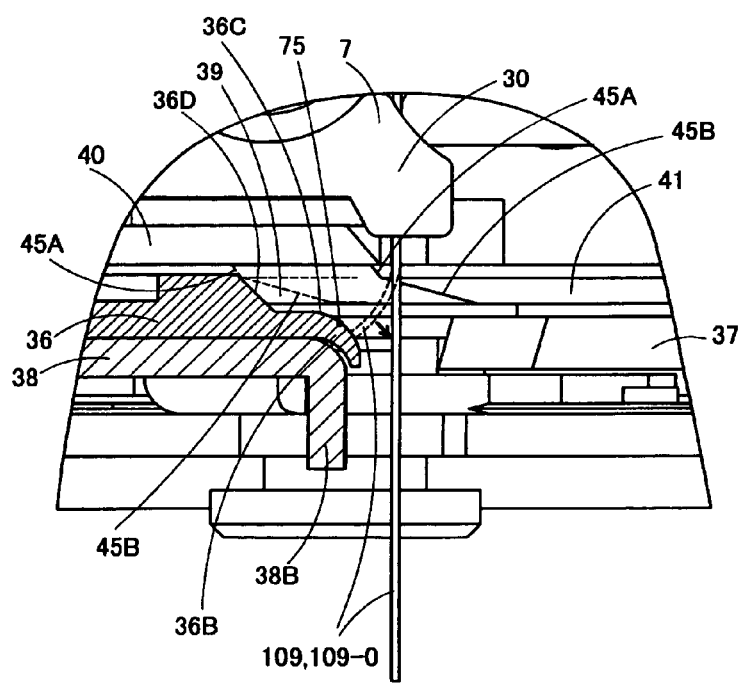

[FIG.14]
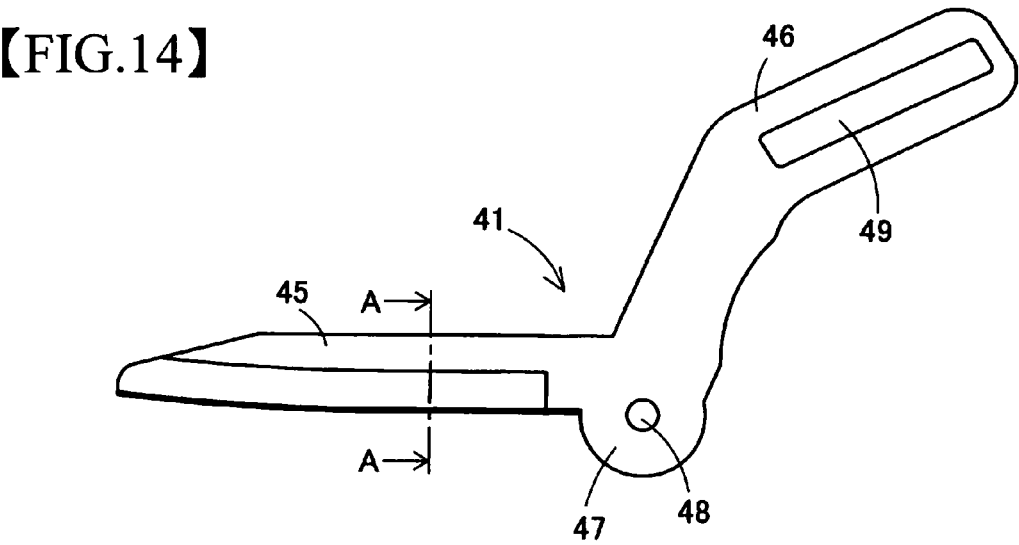
[FIG.15]
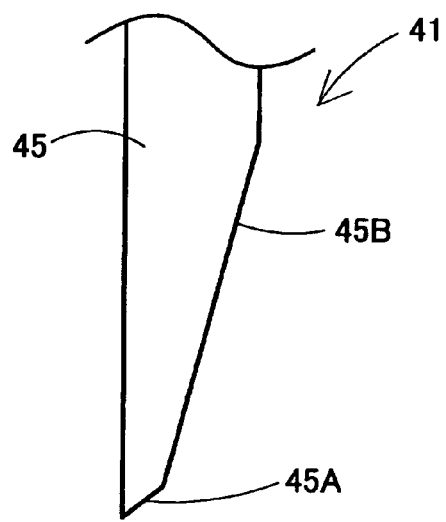

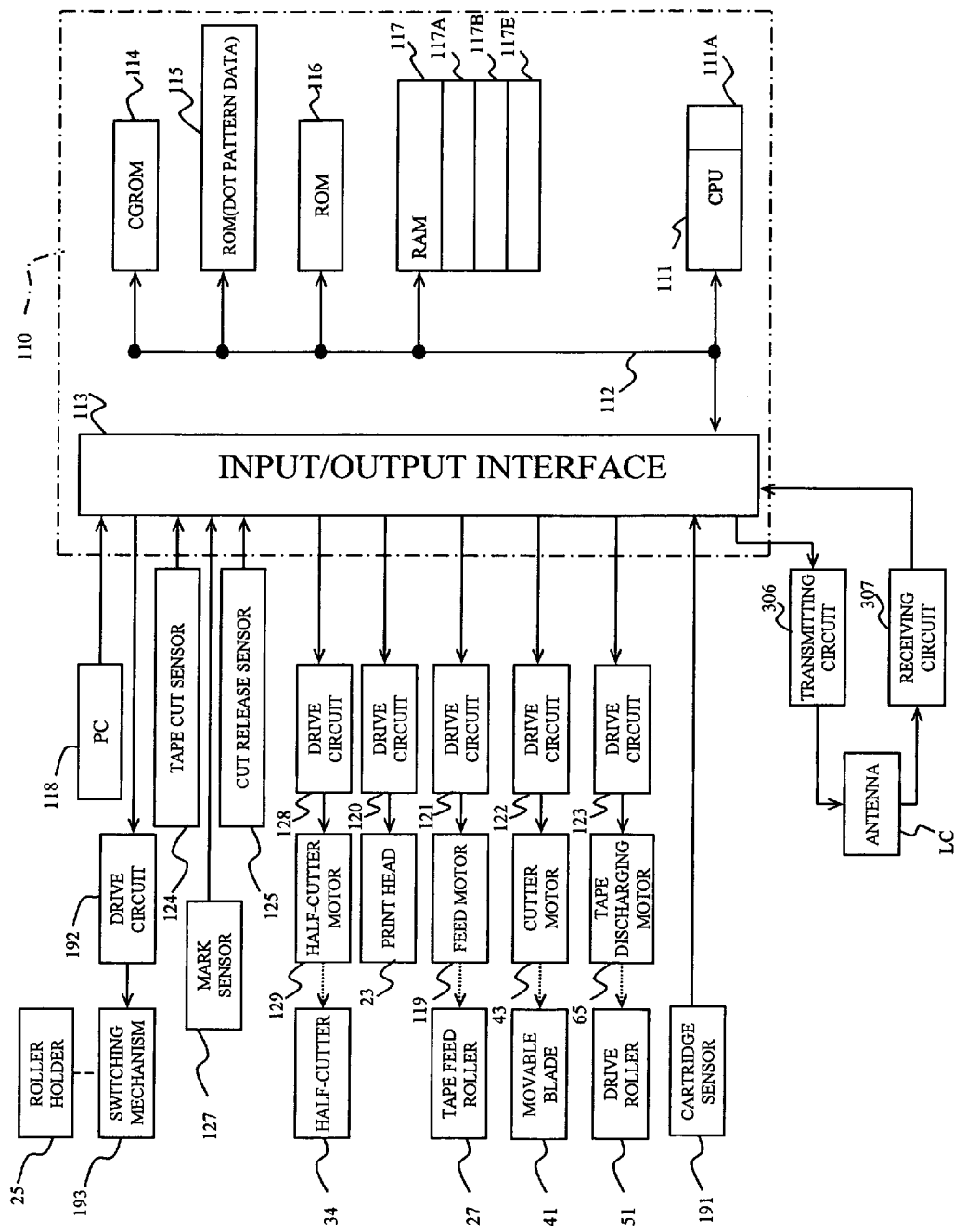
[FIG.16]

[FIG.17]
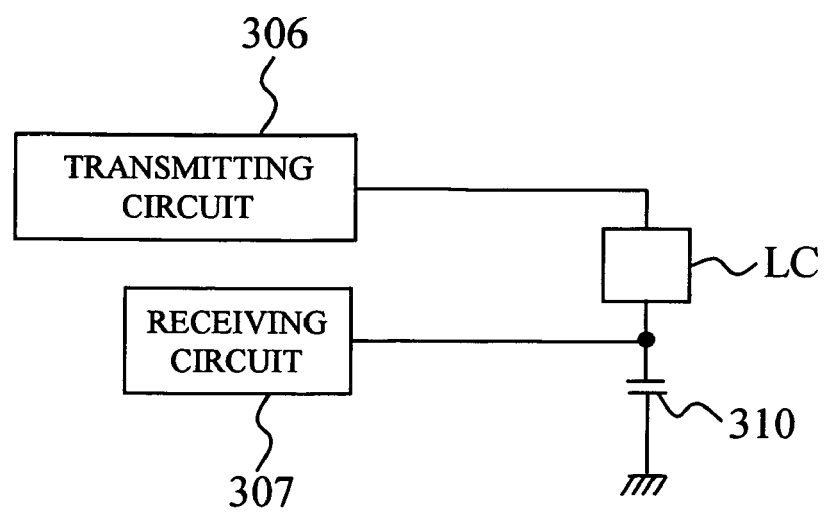

[FIG.18]
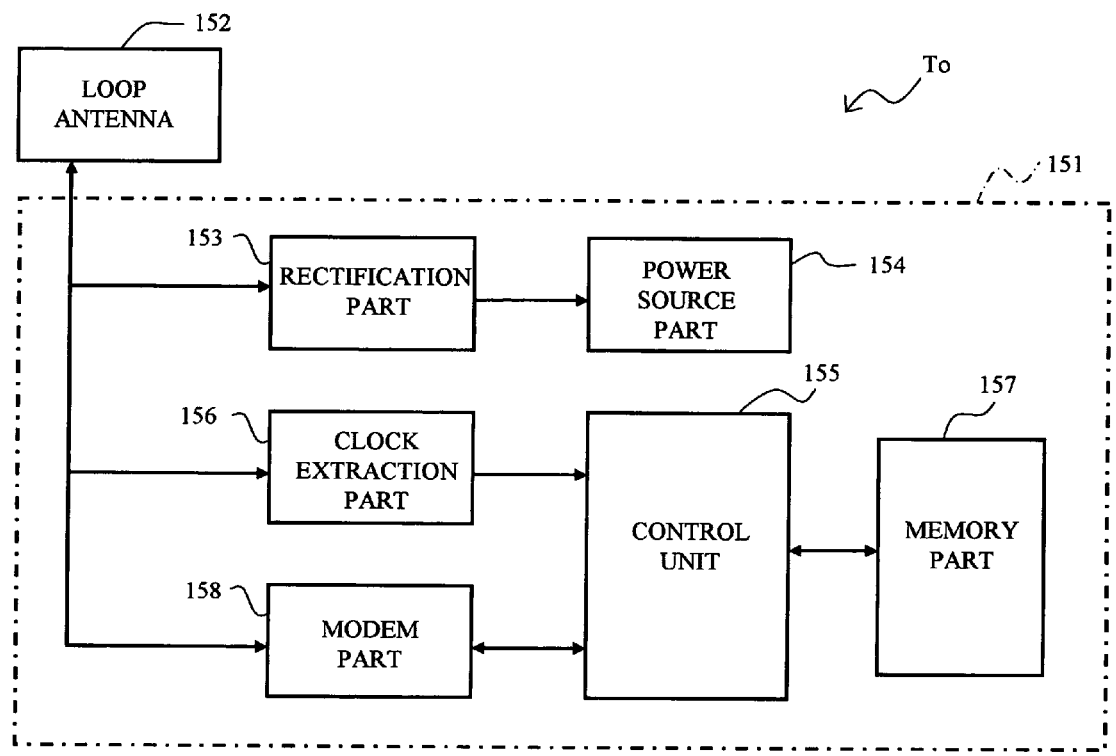

[FIG.19A]
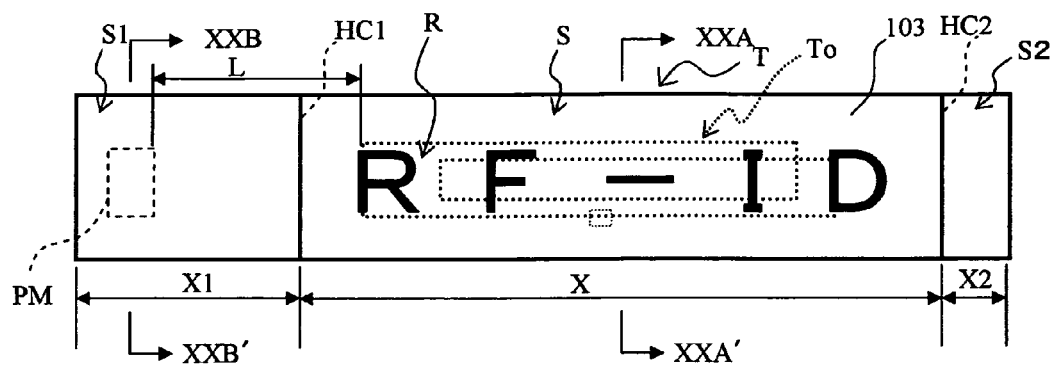
[FIG.19B]
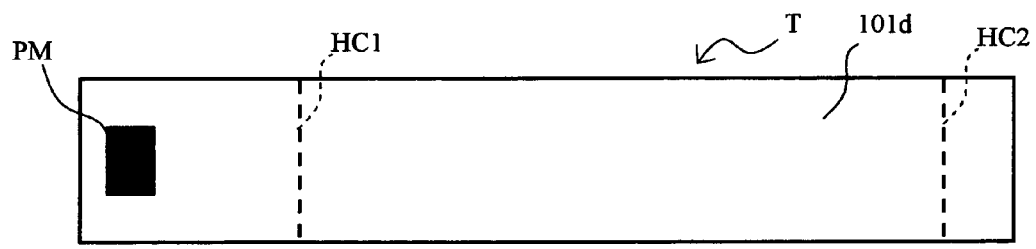

[FIG.20A]
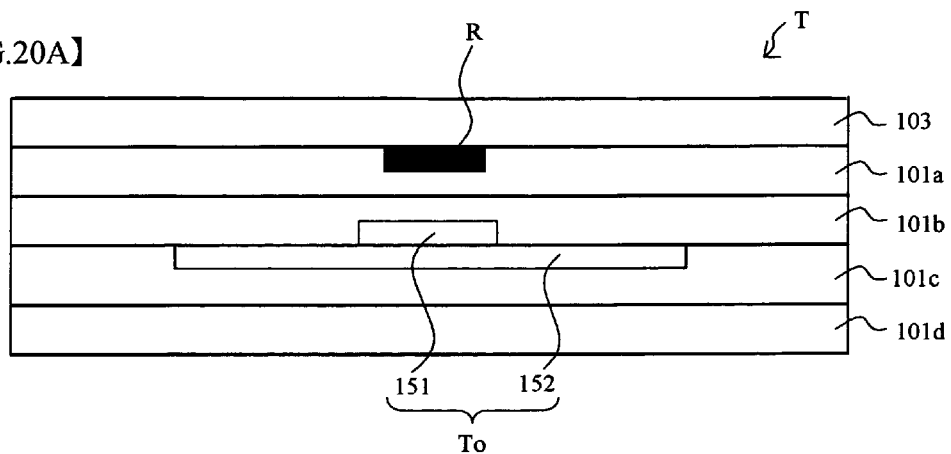
[FIG.20B]
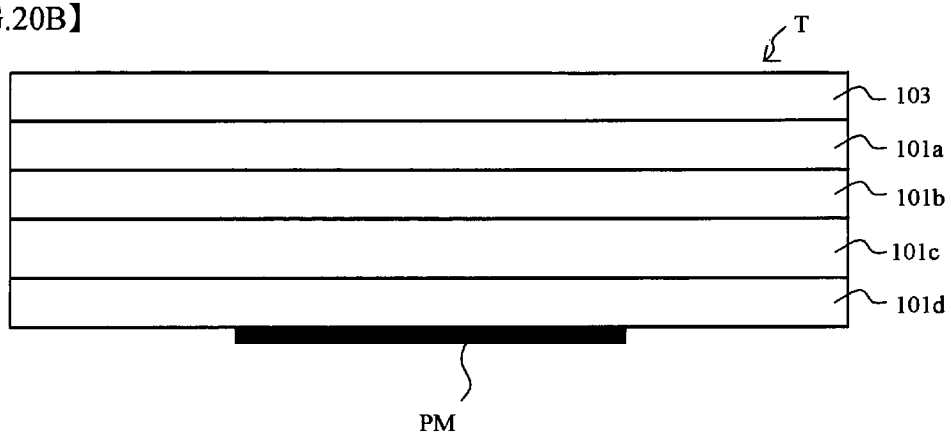
[FIG.20C]
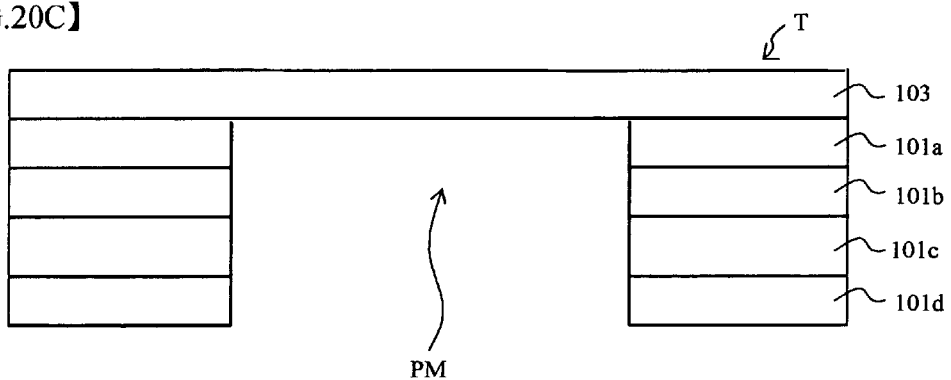

[FIG.21A]
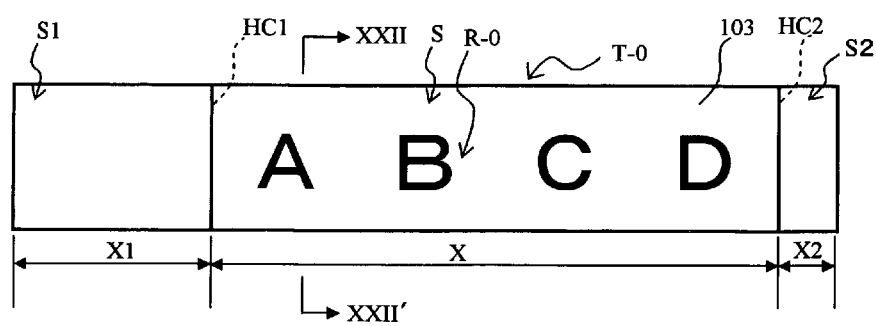
[FIG.21B]
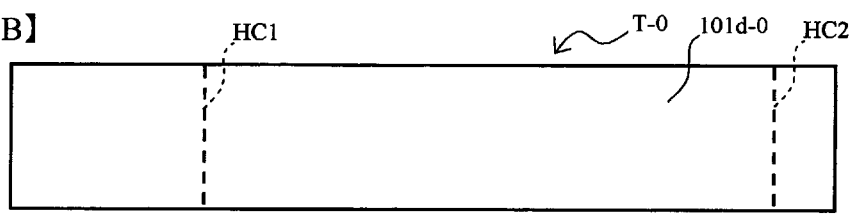
[FIG.22]
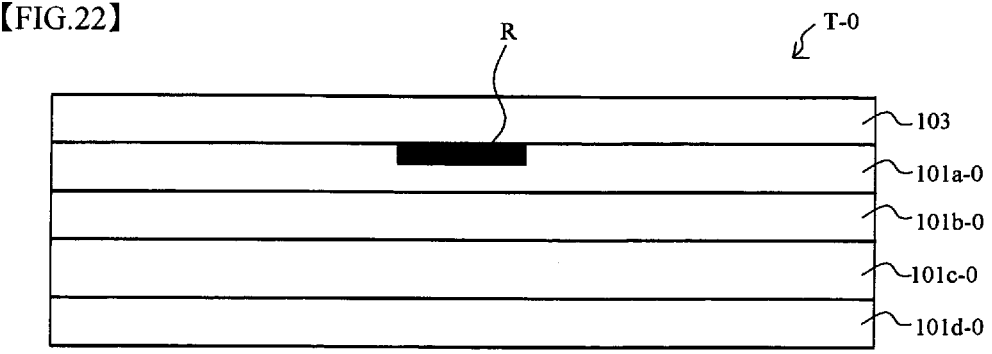

[FIG.23]

| TAG LABEL KIND |
|---|
| 13.56MHz, 100mm × 36mmTAG |

| PRINT LETTER |
|---|
| R F — I D |

| ACCESS ID |
|---|
| 1 6 , 7 7 7 , 2 1 5 |

| ITEM INFORMATION |
|---|
| 1 3 1 , 0 7 1 |

| SERVER INFORMATION |
|---|
| 2 , 0 9 7 , 1 5 1 |

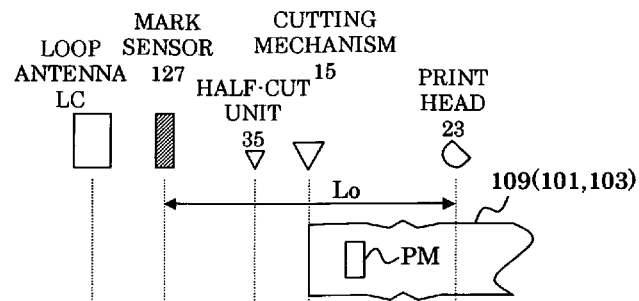
[FIG.24AO]
[FIG.24A] 
[FIG.24B] 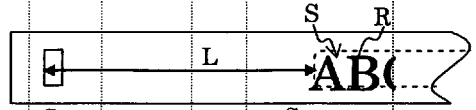
[FIG.24C] 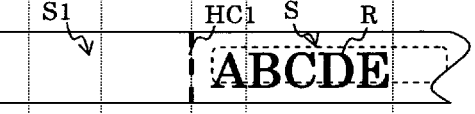
[FIG.24D] 
[FIG.24E] 
[FIG.24F] 
[FIG.24G] 
[FIG.24H] 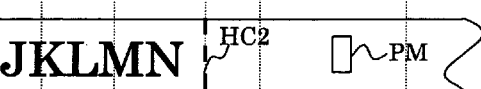
[FIG.24I] 
[FIG.24J]
[FIG.24K] 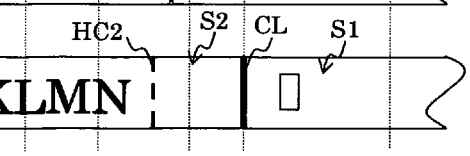

[FIG.25]
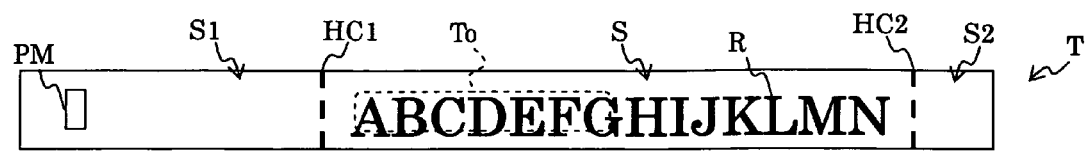

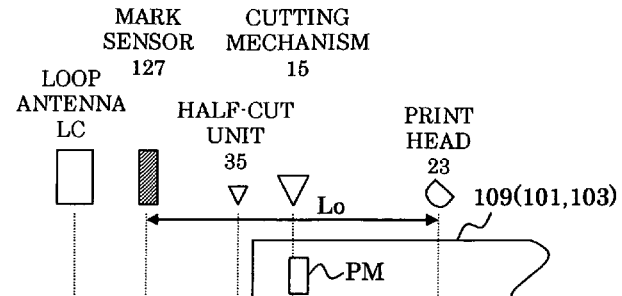
[FIG.26A]
[FIG.26B]
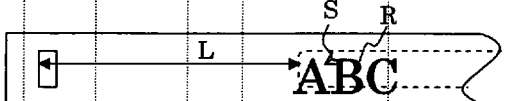
[FIG.26C]
[FIG.26D]
[FIG.26E]
[FIG.26F]
[FIG.26G]
[FIG.26H]
[FIG.26I]
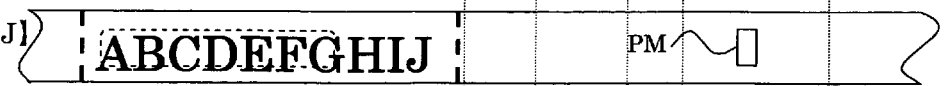
[FIG.26J]
[FIG.26K]

[FIG.27]
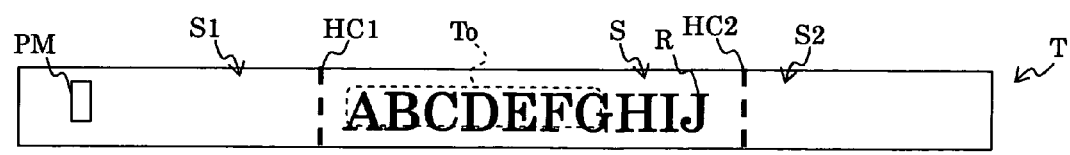

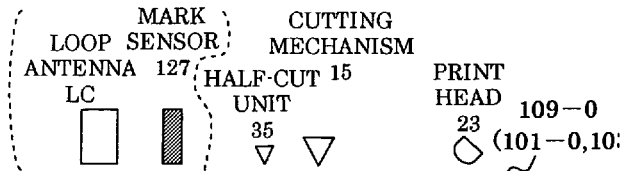
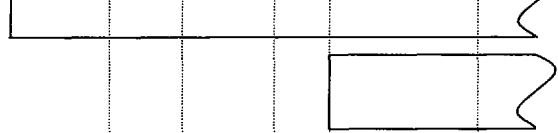
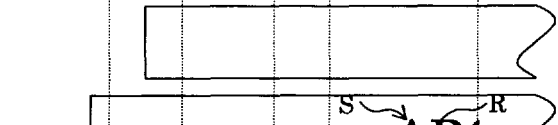
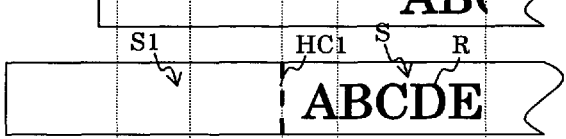
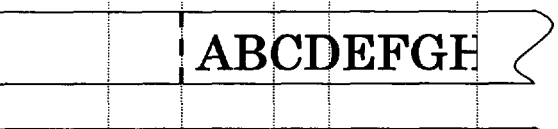
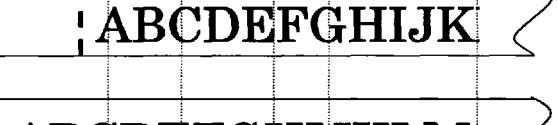
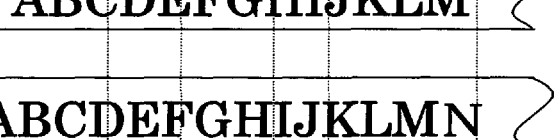
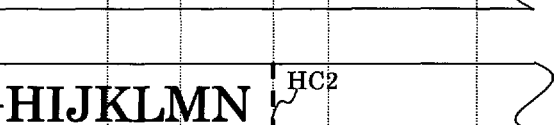
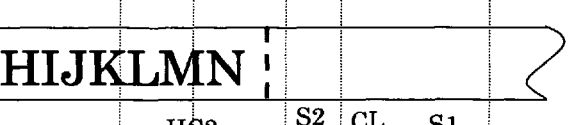

[FIG.29]

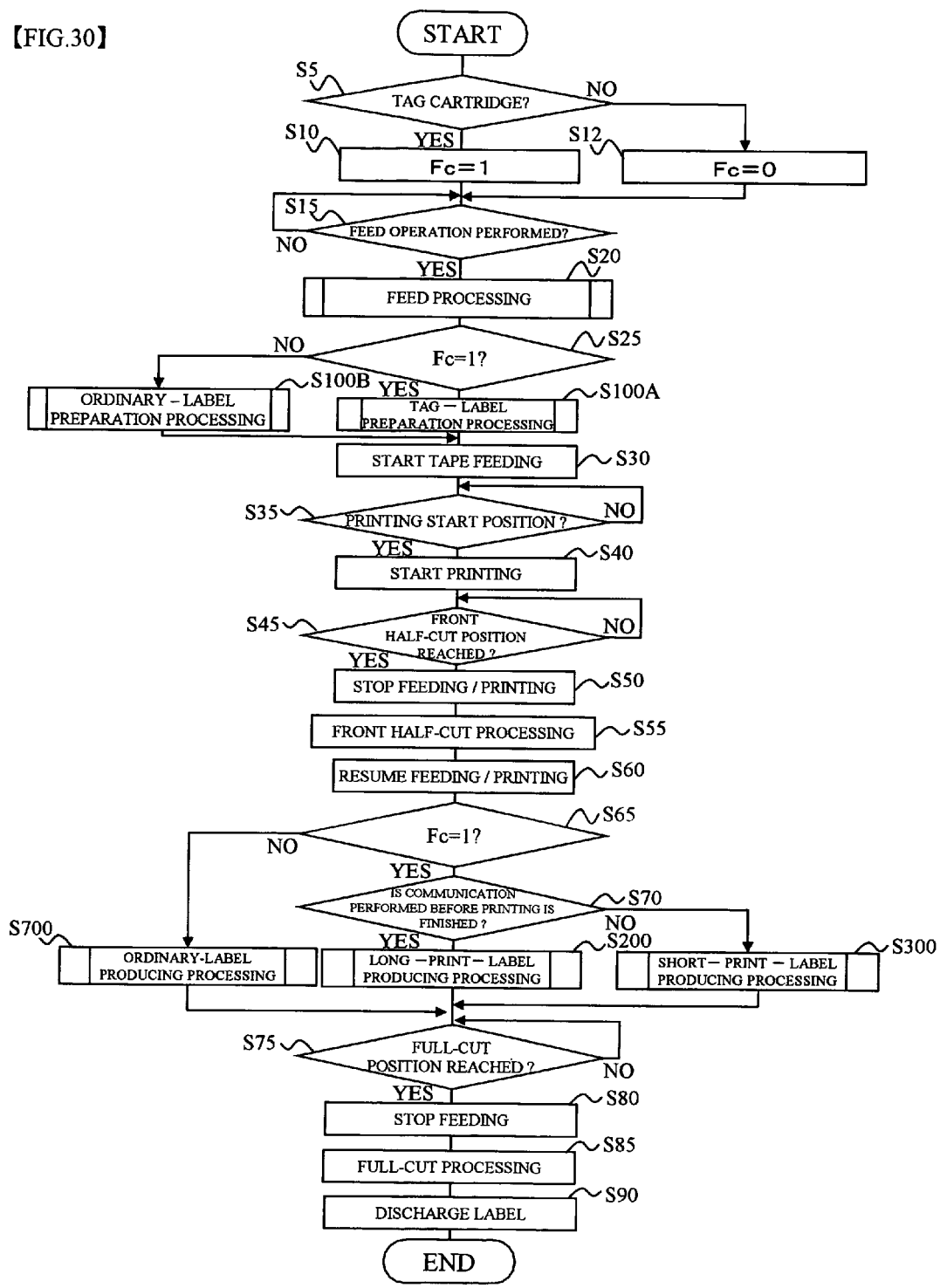
[FIG.30]

[FIG.31]
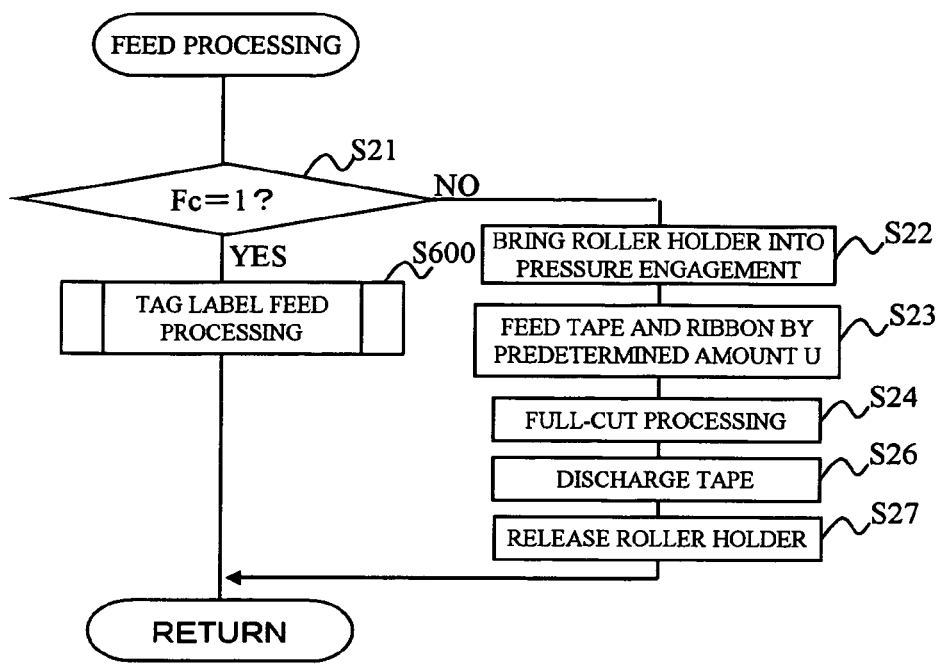

[FIG.32]
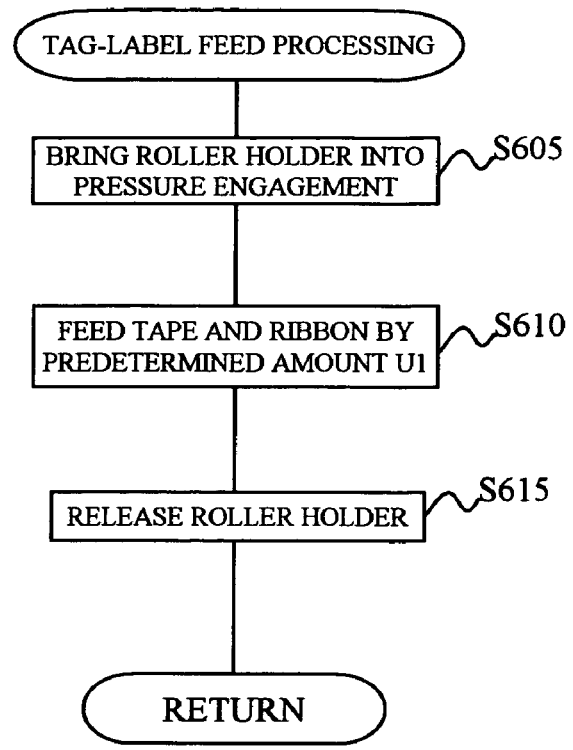

[FIG.33]
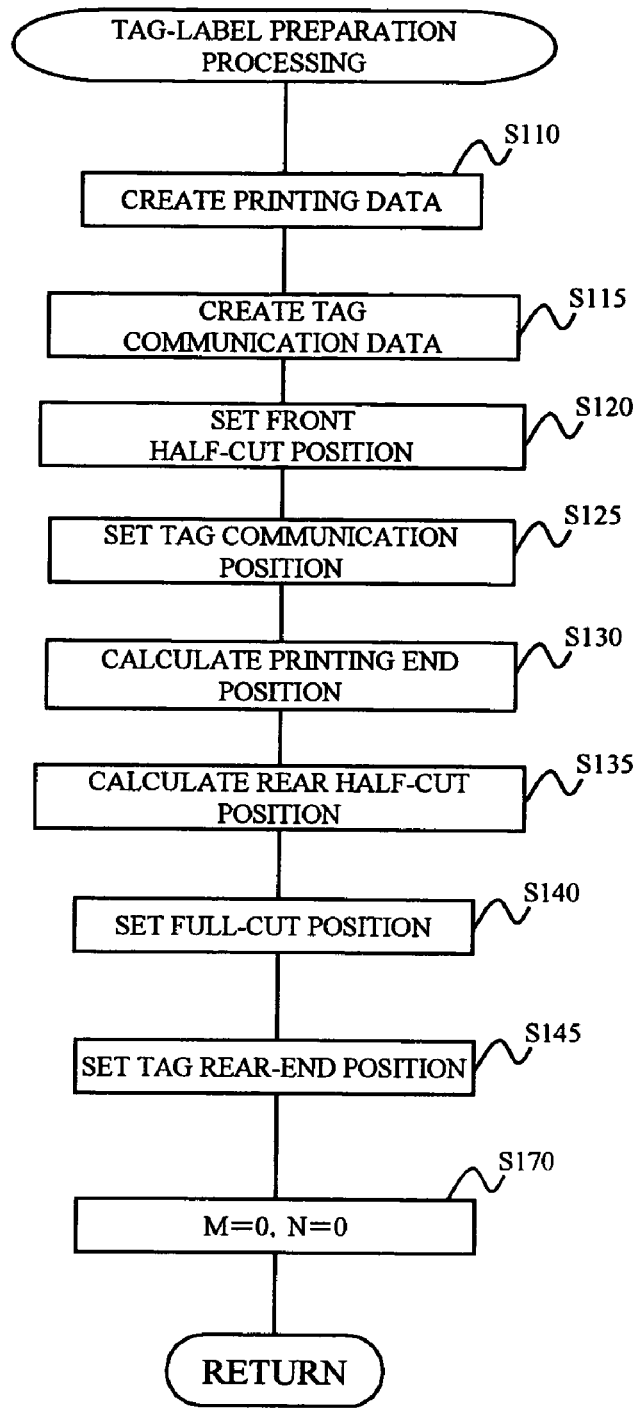

[FIG.34]
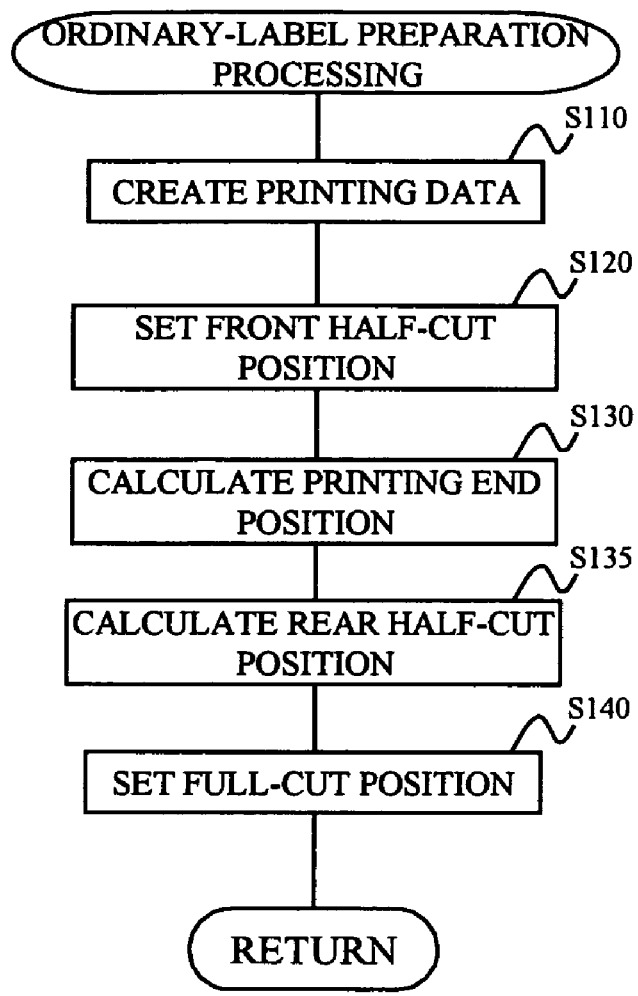

[FIG.35]
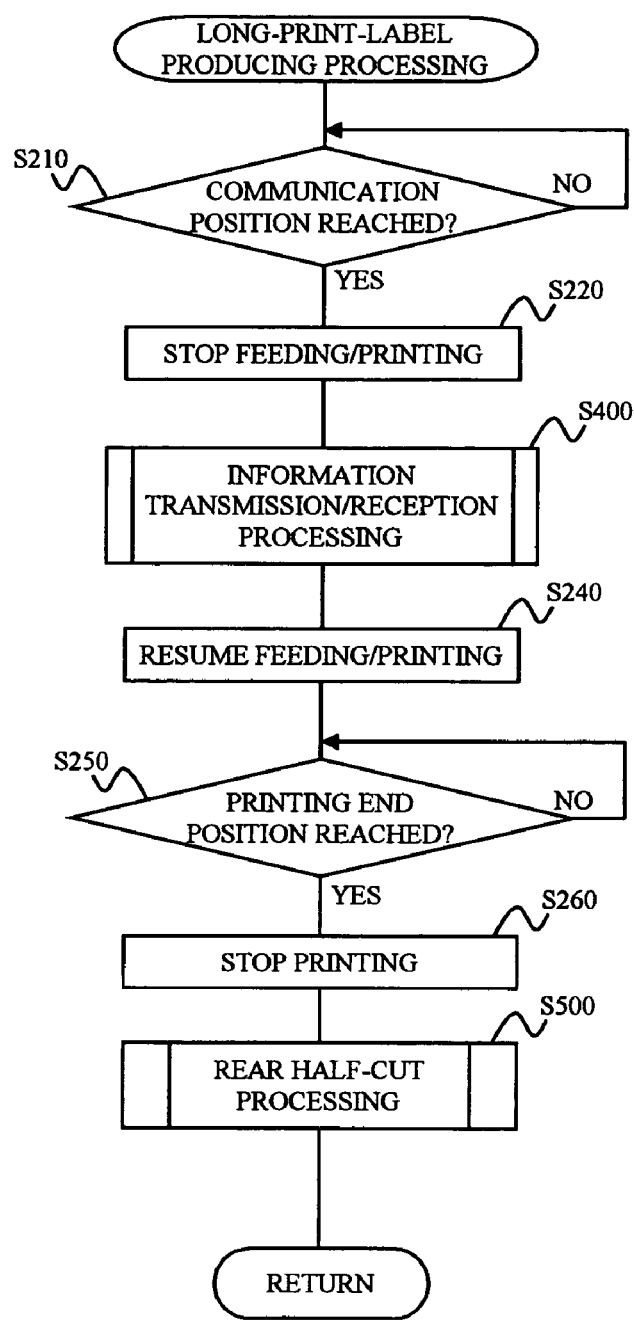

[FIG.36]
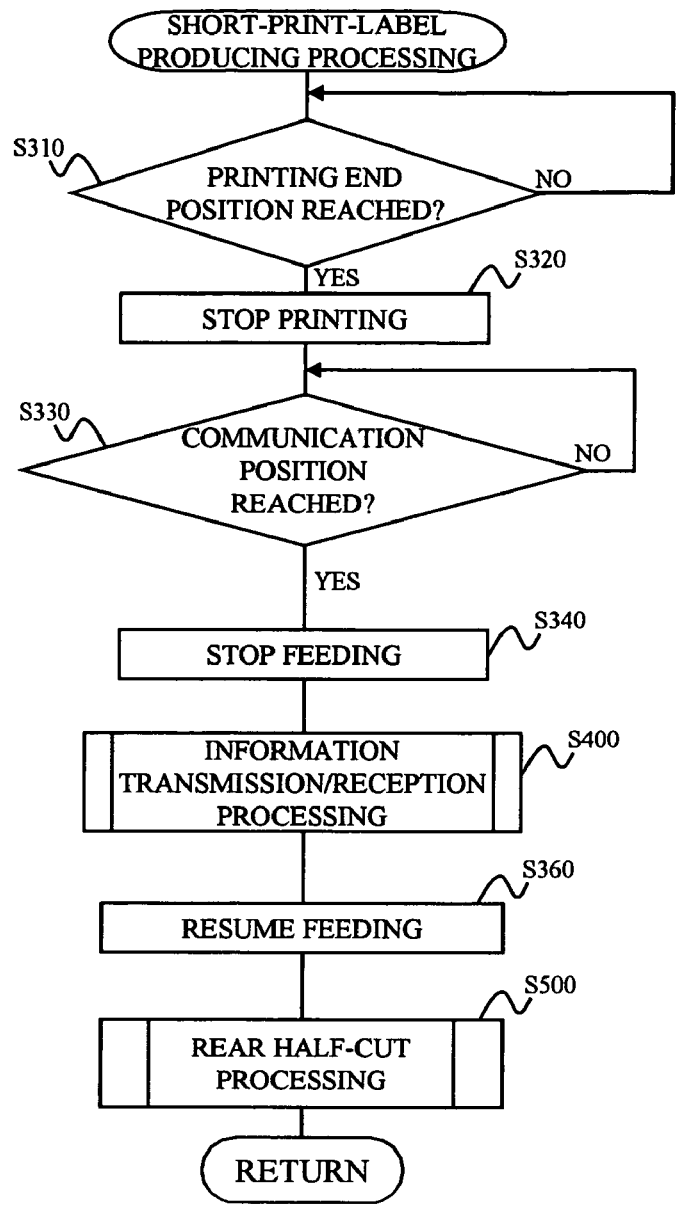

[FIG.37]
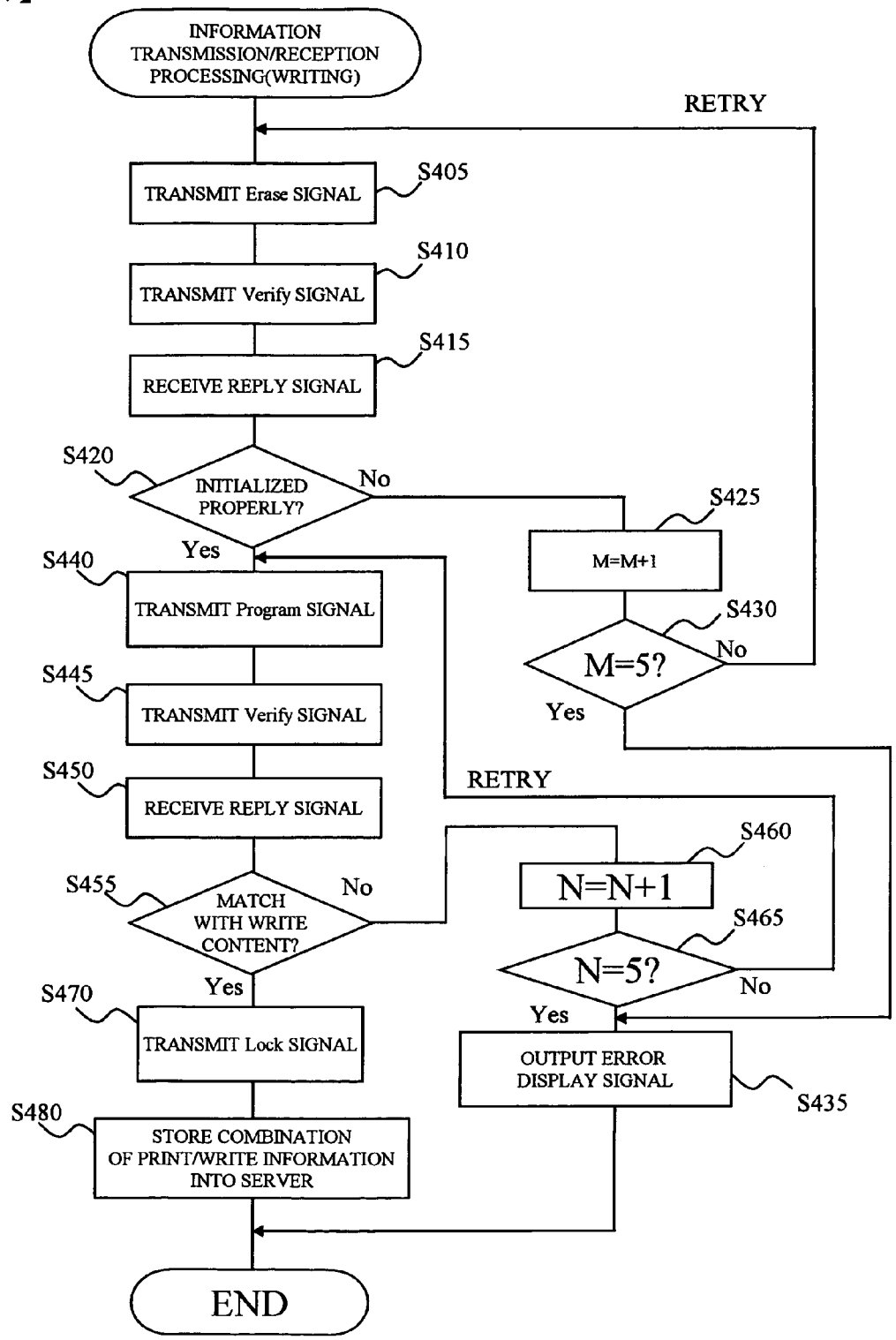

[FIG.38]
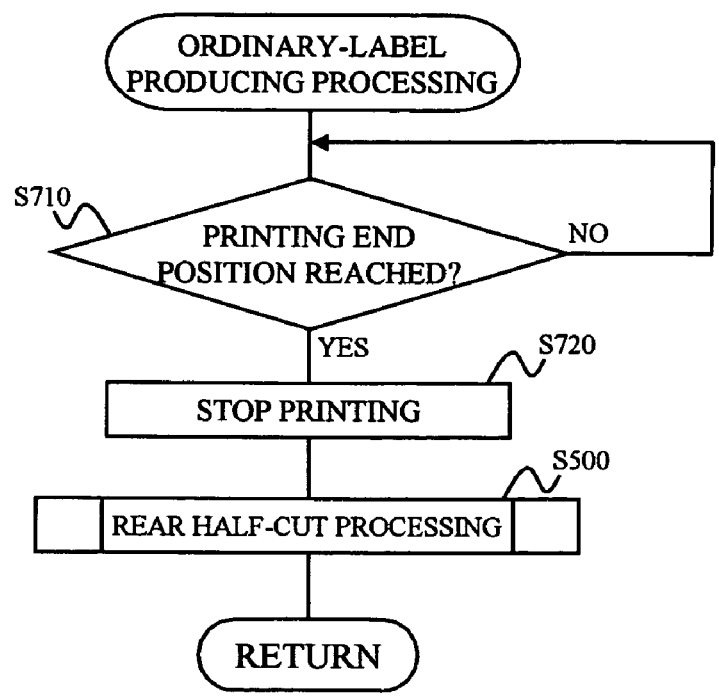

[FIG.39]
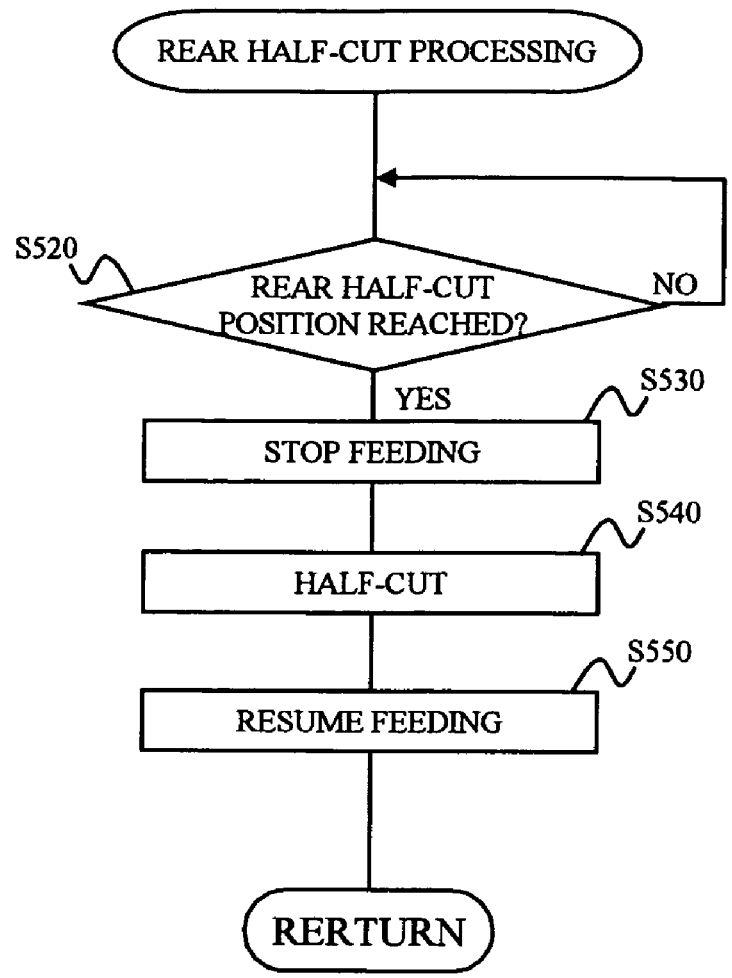

[FIG.40]
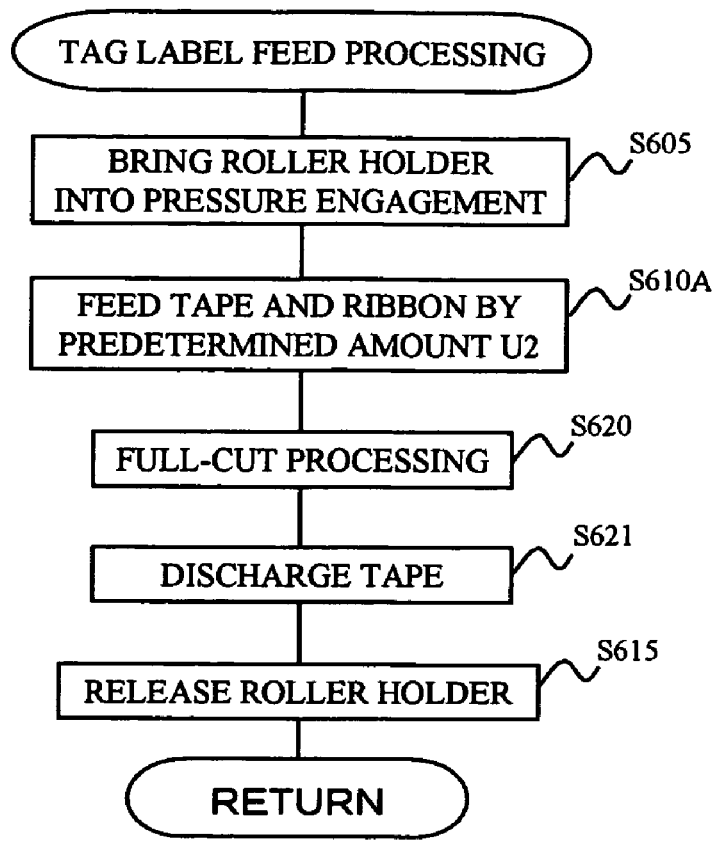

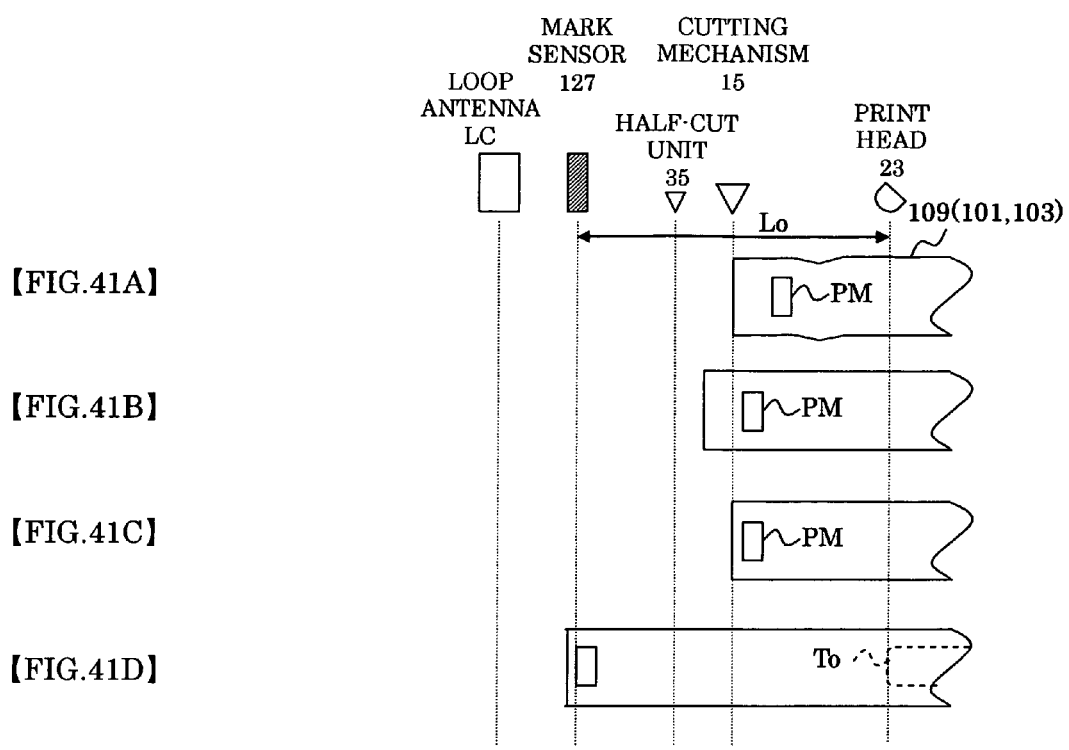

[FIG.42]
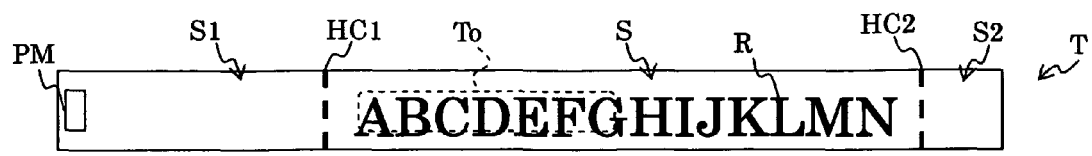

[FIG.43]
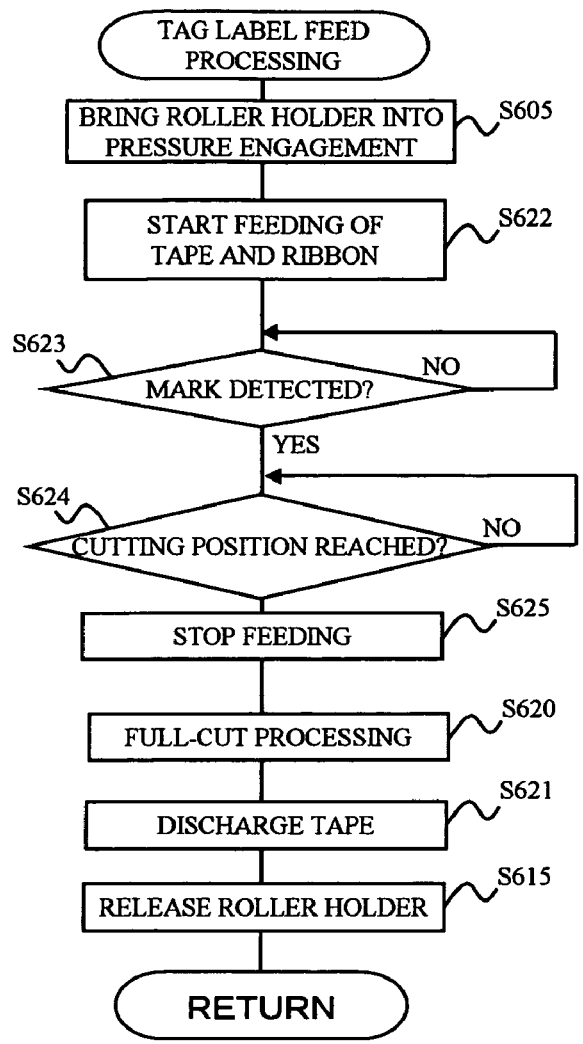

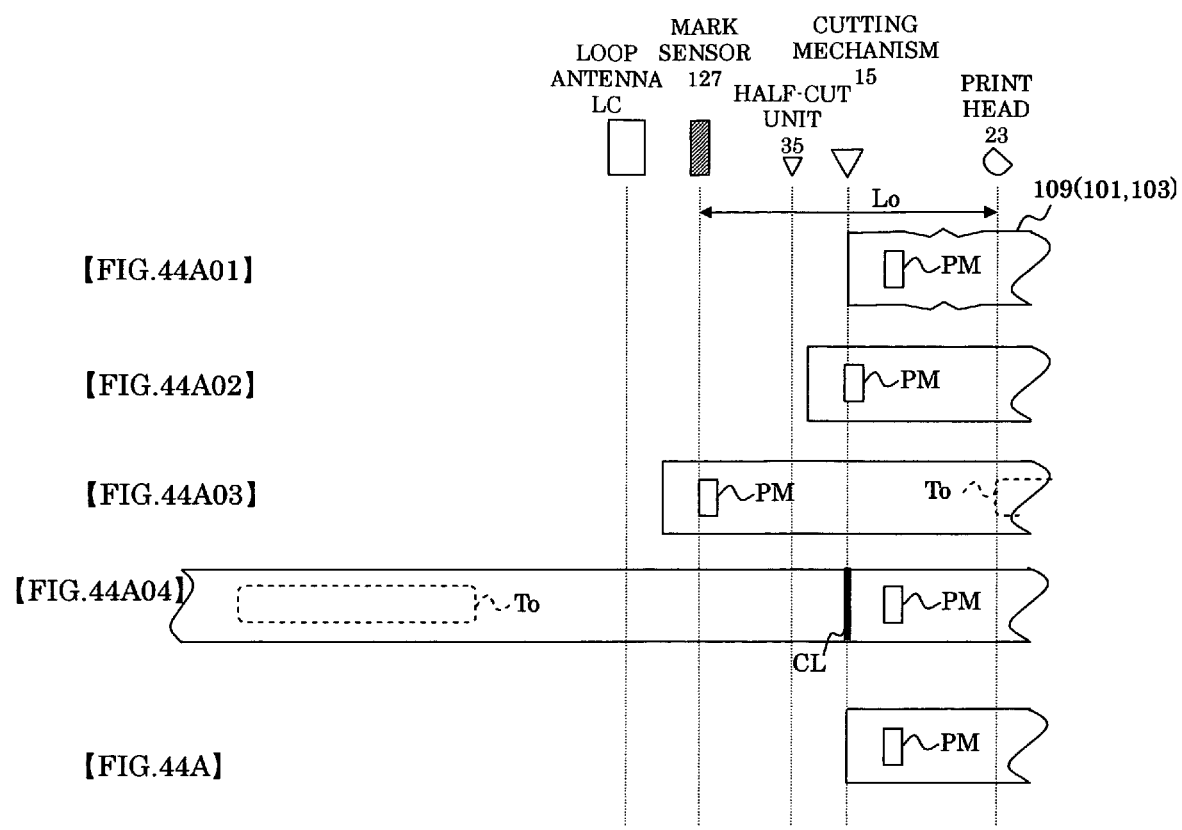

[FIG.45]
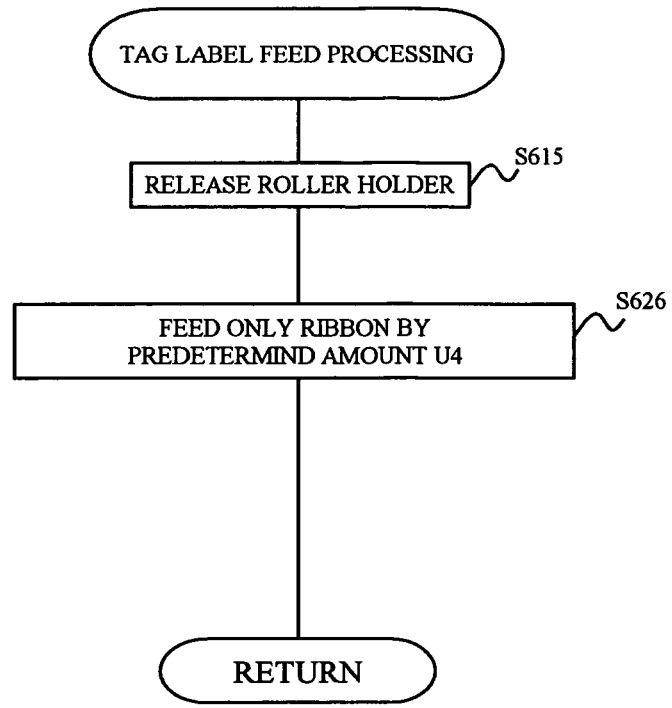
[FIG.46]
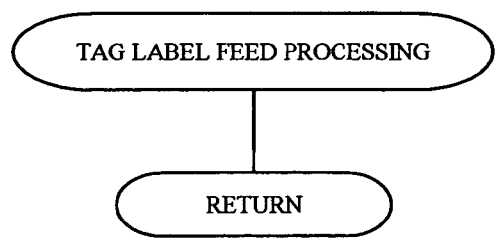

TAG LABEL PRODUCING DEVICE

CROSS-REFERENCE TO RELATED APPLICATIONS

This application claims priority from JP 2006-006301, filed Jan. 13, 2006, the contents of which are hereby incorporated by reference.

BACKGROUND

1. Field of the Invention

The present disclosure relates to a tag-label producing device that can continuously produce RFID labels using a tag tape paid out from a roll.

2. Description of the Related Art

An RFID (Radio Frequency Identification) system is known which performs reading/writing of information in a non-contact manner between a small RFID tag and a reader (reading device)/writer (writing device). For example, an RFID circuit element provided in a label-like RFID tag is equipped with an IC circuit part for storing predetermined RFID tag information, and an antenna connected to this IC circuit part to transmit/receive information. Since the reader/writer can make access (reading/writing of information) to the RFID tag information of the IC circuit part even in such a case where the RFID tag is soiled or the RFID tag is arranged at a position where it cannot be seen, such an RFID system has been put into practical use in a variety of fields such as merchandise management and inspection processes.

Such an RFID tag is usually formed by providing RFID circuit elements on a label-like material. This tag label is often affixed to a target item or the like for the purpose of classification/organization of various documents/items, for example. Further, at this time, if, separately from tag information stored in the tag, information related to the RFID tag information is printed on a label in advance, the above-mentioned related information can be viewed from the user side, which may prove convenient in many situations. Accordingly, in the related art, a tag-label producing device for producing an RFID label from such a point of view has been already proposed (see, for example, JP,A,2005-92699).

In this related art, the tag-label producing device is provided with a cartridge including a tag tape roll (first roll) having wound thereon a tag tape (base tape), in which an RFID circuit element including an IC circuit part and a tag-side antenna (antenna part) is arranged, and a roll (second roll) having wound thereon a print-receiving tape (cover film) to be bonded onto this tag tape. Upon loading the cartridge onto a predetermined location of the tag-label producing device, the tag tape and the print-receiving tape mentioned above are respectively paid out from the above-mentioned two rolls, and predetermined printing is performed on the print-receiving tape by printing means (thermal head); after bonding the print-receiving tape on which printing has been performed and the above-mentioned tag tape together, writing of information is performed with respect to the above-mentioned RFID circuit element, and the tape obtained by the above-mentioned bonding process is finally cut by cutting means (cutter) into a predetermined length, thereby providing an RFID label.

In the related art mentioned above, due to such reasons that the cartridge is detached from the device side while a plurality of labels are being produced, slack may develop in the tape inside the cartridge or in the tape feed path from the cartridge exit port to the label discharge port of the tag-label producing device. Such tape slack is undesirable as it can cause, for example, fading of print or the like with respect to the print-receiving tape in this case.

On the other hand, since a plurality of RFID circuit elements are arranged at predetermined intervals in the tag tape, at the time of cutting the above-mentioned tape to form a label, in order to maintain soundness, it is necessary to set the tape feed position in such a way that does not cause these RFID circuit elements to be cut. Accordingly, in the case where an RFID label is produced by using a cartridge equipped with the above-mentioned tag tape roll, with regard to the above-mentioned tape slack reducing function, consideration must be given to the feed position setting aimed at preventing the RFID circuit elements of the tag tape from being cut.

SUMMARY

An object of the present disclosure is to provide a tag-label producing device that is endowed with the function of reducing tape slack in the tape feed path while making it possible to prevent the soundness of the RFID circuit element from being impaired.

MEANS FOR SOLVING THE PROBLEM

In order to achieve the above-mentioned object, according to first aspect, there is provided a tag-label producing device including: a roll mounting/dismounting part that selectively installs a tag tape roll around which a tag tape is wound, and an ordinary-tape roll around which an ordinary tape is wound, the tag tape having arranged thereon an RFID circuit element including an IC circuit part that stores information and a tag-side antenna connected to the IC circuit part; a drive device that imparts a drive force in a tape length direction to a tape supplied from the tag tape roll or the ordinary-tape roll mounted on the roll mounting/dismounting part; a transmitting/receiving device that performs transmission/reception of information to/from the IC circuit part of the RFID circuit element equipped in the tag tape via wireless communication, upon installation of the tag tape roll using the roll mounting/dismounting part; a detection device that detects which one of the tag tape roll and the ordinary-tape roll has been installed using the roll mounting/dismounting part; and a controller including, with respect to tape slack reduction processing, a tag tape mode and an ordinary-tape mode respectively corresponding to the tag tape roll and the ordinary-tape roll, that controls the drive device by switching the mode in accordance with a result of detection by the detection device.

Upon installing the tag tape roll or the ordinary-tape roll by using the roll mounting/dismounting part, a drive force is imparted by the drive device to the tape supplied from this roll so that the tape is fed, and suitable processing such as printing or cutting is performed (in the case of a tag tape, transmission/reception of information to/from the RFID circuit element by the transmitting/receiving device is also performed in conjunction with this processing), thereby producing a label. Due to such reasons that the roll is detached from the roll mounting/dismounting part while a plurality of labels are being produced in this way, slack may develop in the tape in the tape feed path; if this is left as it is, for example, print fading or the like can occur, so it is preferable to reduce this slack. In the first aspect of the present application, the controller includes the mode for performing tape slack reduction processing. Accordingly, by controlling the drive device so as to impart a drive force to the tape to thereby feed the tape, it is possible to reduce the above-mentioned tape slack.

At this time, a plurality of RFID circuit elements are arranged at predetermined intervals in the tag tape; at the time of cutting the tape to form a label, in order to maintain soundness, it is necessary to set the tape feed position in such a way that does not cause these RFID circuit elements to be cut. Accordingly, in the case where an ordinary tape and a tag tape are selectively used, with regard to the above-mentioned tape slack reducing function, consideration must be given to the feed position setting aimed at preventing cutting of the RFID circuit element of the tag tape. In view of this, in the first aspect of the present application, the mode for performing tape slack reduction processing, which is included in the controller, is made to differ for each tape kind, with a tag tape mode being provided separately from an ordinary-tape mode. Further, the modes are switched by the controller in accordance with the result of detection by the detection device as to which one of the tag tape roll and the ordinary-tape roll has been installed. Accordingly, when using the tag tape, the tag tape mode is selected, whereby it is possible to give the highest priority to the prevention of the cutting of the RFID circuit element to thereby prevent the soundness of the RFID circuit element from being impaired; when using the ordinary label, the ordinary-tape mode is selected, whereby it is possible to give the highest priority to the feeding aimed at reducing tape slack to thereby reduce the slack with reliability.

According to second aspect, in the first aspect, of the tag tape mode and the ordinary-tape mode, in at least the ordinary-tape mode, the controller controls the drive device so that a drive force for effecting a predetermined amount of feeding in a forward or reverse direction for the tape slack reduction processing is imparted to the tape.

By performing tape feeding by a predetermined amount in the forward or reverse direction, tape slack can be reduced or eliminated.

According to third aspect, in the second aspect, the controller controls the drive device so that: in the ordinary-tape mode, a drive force for effecting feeding for the tape slack reduction processing is imparted to the ordinary tape; and in the tag-tape mode, a drive force for effecting the tape slack reduction processing is not imparted to the tag tape.

No drive force is given to the tape and hence no tape feeding is performed in the tag tape mode, whereby the influence on the setting of the tape feed position of the tag tape can be eliminated to thereby reliably prevent the cutting of the RFID circuit element.

According to fourth aspect, in the second aspect, the drive device drives an ink ribbon driving roller that drives an ink ribbon that performs predetermined printing with respect to the tag tape, a print-receiving tape that is bonded with the tag tape, or the ordinary tape, and that the controller controls the drive device so that: in the ordinary-tape mode, a drive force for effecting feeding for the tape slack reduction processing is imparted to each of the ordinary tape and the ink ribbon; and in the tag tape mode, a drive force for effecting the tape slack reduction processing is not imparted to the tag tape, and a drive force for effecting feeding for the tape slack reduction processing is imparted to the ink ribbon.

When performing printing using an ink ribbon, printing is performed by, for example, bringing the tape as the target printing medium into intimate contact with a thermal head as a print head through an ink ribbon, and then transferring ink onto the tape by heat. Accordingly, not only the tape but also the ink ribbon is fed by the drive force of the drive device. At this time, slack may develop also in this ink ribbon as well in the same manner as mentioned above, and it is thus preferable to reduce this slack in order to prevent print fading or the like.

In the fourth aspect of the present application, in the ordinary-tape mode, by imparting a drive force to the tape together with the ink ribbon, the highest priority is given to the feeding aimed at reducing slack in the tape or ink ribbon, thereby making it possible to reduce this slack with reliability. Further, in the tag tape mode, no drive force is imparted to the tape and hence no tape feeding is performed, and a drive force is imparted only to the ink ribbon to feed the ink ribbon, whereby the highest priority is given to the prevention of the cutting of the RFID circuit element and the influence on the setting of the tape feed position of the tag tape is eliminated, thereby making it possible to reliably prevent the soundness of the RFID circuit element from being impaired.

According to fifth aspect, in the second aspect, the controller controls the drive device so that: in the ordinary-tape mode, a drive force for effecting feeding by a first distance for the tape slack reduction processing is imparted to the ordinary tape; and in the tag tape mode, a drive force for effecting feeding by a second distance, which is shorter than the first distance, for the tape slack reduction processing is imparted to the tag tape.

By setting the tape feed amount in the tag tape mode to be smaller than that in the ordinary-tape mode, the tag tape feed amount at the time of tape slack reduction processing can be set as a minute distance. Accordingly, it is possible to prevent the cutting of the RFID circuit element while minimizing the influence of tape feeding on the setting of the tape feed position of the tag tape.

According to sixth aspect, in the second aspect, the controller controls the drive device so that: in the ordinary-tape mode, a drive force for effecting feeding by a first distance for the tape slack reduction processing is imparted to the ordinary tape; and in the tag tape mode, a drive force for effecting feeding by a third distance, which is longer than the first distance, for the tape slack reduction processing is imparted to the tag tape.

By setting the tape feed amount in the tag tape mode to be larger than that in the ordinary-tape mode, the tag tape feed amount at the time of tape slack reduction processing can be set as a longer distance substantially equal to the arrangement pitch of the RFID circuit element in the tag tape. Accordingly, it is possible to set the tape feed position in such a way that cutting is not performed anew with respect to the RFID circuit element arranged succeeding to the RFID circuit element that has been a setting target prior to the tape slack reduction processing.

According to seventh aspect, in the fifth aspect, the tag-label producing device further includes a cutting device that cuts the tape, and that the controller controls the drive device and the cutting device in a coordinated manner so that: in the ordinary-tape mode, after a drive force for effecting feeding by the first distance is imparted to the ordinary tape, feeding is stopped and tape cutting is performed; in the tag tape mode, after a drive force for effecting feeding by the second distance or the third distance is imparted to the tag tape, feeding is stopped and tape cutting is performed.

In the ordinary-tape mode, tape slack is reduced by feeding the tape by the first distance by the drive force of the drive device, and then cutting is performed by the cutting device to thereby produce a label of a predetermined length. In the tag tape mode, the tape is fed by the second distance (or the third distance) with the drive force of the drive device. Accordingly, by thus minimizing the influence of tape feeding on the setting of the tape feed position of the tag tape (or by performing feed position setting with respect to the succeeding RFID circuit element), tape slack is reduced while preventing the cutting of the RFID circuit element, and then cutting is performed by the cutting device to thereby produce an RFID label of a predetermined length.

According to eighth aspect, in the first aspect, the drive device is held by a holding device so as to be capable of advancing/retracting movement with respect to the tape, and drives a feed roller that performs feeding while in intimate contact with the tape.

As the holding device moves the feed roller forward toward the tape and brings the feed roller into intimate contact with the tape, a drive force is transmitted to the tape to thereby feed the tape, and as the holding device retracts the feed roller away from the tape, the transmission of the drive force is stopped so that feeding is not performed.

According to ninth aspect, in the first aspect, the roll mounting/dismounting part is a cartridge holder to/from which a tag tape cartridge accommodating the tag tape roll or an ordinary-tape cartridge accommodating the ordinary-tape roll can be selectively mounted/dismounted; and the detection device detects an object to be detected which is provided to the tag tape cartridge or the ordinary tape cartridge.

By detecting which one of the tag tape cartridge and the ordinary-tape cartridge has been loaded via the object to be detected that is provided to the cartridge, it is possible to detect which one of the tag tape roll and the ordinary-tape roll has been installed.

In accordance with the present disclosure, it is possible to realize the function of reducing tape slack in the feed path while preventing the soundness of an RFID circuit element from being impaired.

BRIEF DESCRIPTION OF THE DRAWINGS

FIG. 1 is a system configuration diagram showing an RFID tag manufacturing system equipped with a tag-label producing device according to an embodiment of the present disclosure.

FIG. 2 is a perspective view showing the overall construction of the tag-label producing device shown in FIG. 1.

FIG. 3 is a perspective view showing the construction of an internal unit of the tag-label producing device.

FIG. 4 is a plan view showing the construction of the internal unit shown in FIG. 3.

FIG. 5 is an enlarged plan view schematically showing the detailed construction of a cartridge for producing an RFID label.

FIG. 6 is an enlarged plan view schematically showing the detailed construction of a cartridge for producing an ordinary label.

FIG. 7 is a diagram as seen in the direction of the arrow D of FIG. 5, showing the conceptual structure of an RFID circuit element.

FIG. 8 is a partially extracted perspective view showing the detailed construction of the main potion of a label discharge mechanism.

FIG. 9 is a perspective view showing the outward appearance of the internal unit, with the label discharge mechanism removed from the construction shown in FIG. 3.

FIG. 10 is a perspective view showing the outward appearance of a cutting mechanism, with a half-cutter removed from the internal unit.

FIG. 11 is a perspective view showing the outward appearance of the cutting mechanism, with the half-cutter removed from the internal unit.

FIG. 12 is a perspective view showing the detailed construction of a movable blade and stationary blade together with a half-cut unit.

FIG. 13 is a partial enlarged sectional view of the construction shown in FIG. 12.

FIG. 14 is a front view showing the outward appearance of the movable blade.

FIG. 15 is a cross-sectional view taken along the line A-A of FIG. 14.

FIG. 16 is a functional block diagram showing the control system of the tag-label producing device.

FIG. 17 is a simplified circuit diagram showing the circuit configuration of the connecting portion between a transmitting circuit, a receiving circuit, and a loop antenna.

FIG. 18 is a functional block diagram showing the functional configuration of the RFID circuit element.

FIG. 19A is a top view showing an example of the outward appearance of the produced RFID label.

FIG. 19B is a bottom view showing an example of the outward appearance of the produced RFID label.

FIG. 20A is a view obtained by rotating the cross-sectional view taken along the line XXA-XXA' of FIG. 19 counterclockwise by 90°.

FIG. 20B is a view obtained by rotating the cross-sectional view taken along the line XXB-XXB' of FIG. 19 counterclockwise by 90°.

FIG. 20C is a view obtained by rotating the cross-sectional view in case that a hole bored by laser machining or the like so as to substantially penetrate the base tape may also serve as the identifier counterclockwise by 90°.

FIG. 21A is a top view showing an example of the outward appearance of an ordinary label.

FIG. 21B is a bottom view showing an example of the outward appearance of an ordinary label.

FIG. 22 is a view obtained by rotating the cross-sectional view taken along the line XXII-XXII' of FIG. 21 counterclockwise by 90°.

FIG. 23 is a view showing an example of the screen displayed on a terminal or a general purpose computer when making access to (performing reading from or writing to) RFID tag information of the IC circuit part of the RFID circuit element.

FIGS. 24AO to 24K are explanatory views each showing the positional relation between an identifier, RFID circuit element, and label print area of a label tape with print, and a loop antenna, a mark sensor, a half-cut unit, a cutting mechanism, and a print head, at the time of RFID label production.

FIG. 25 is a view showing an example of the completed RFID label.

FIGS. 26A to 26k are explanatory views each showing the positional relation between an identifier, RFID circuit element, and label print area of a label tape with print, and a loop antenna, a mark sensor, a half-cut unit, a cutting mechanism, and a print head, at the time of RFID label production.

FIG. 27 is a view showing another example of the completed RFID label.

FIGS. 28AO1 to 28K are explanatory views each showing the positional relation between a label tape with print and a label print area, and a half-cut unit, a cutting mechanism, and a print head, at the time of ordinary-label production.

FIG. 29 is a view showing an example of the completed ordinary label.

FIG. 30 is a flowchart showing the procedure of control executed by a control circuit.

FIG. 31 is a flowchart showing the detailed procedure of step S20.

FIG. 32 is a flowchart showing the detailed procedure of step S600.

FIG. 33 is a flowchart showing the detailed procedure of step S100A.

FIG. 34 is a flowchart showing the detailed procedure of step S100B.

FIG. 35 is a flowchart showing the detailed procedure of step S200.

FIG. 36 is a flowchart showing the detailed procedure of step S300.

FIG. 37 is a flowchart showing the detailed procedure of step S400.

FIG. 38 is a flowchart showing the detailed procedure of step S700.

FIG. 39 is a flowchart showing the detailed procedure of step S500.

FIG. 40 is a flowchart showing the detailed procedure of step S600.

FIGS. 41A to 41D are views each showing the behaviors according to a modification of slack reduction processing.

FIG. 42 is a view showing an example of the completed RFID label T.

FIG. 43 is a flowchart showing the detailed procedure of step S600 according to the modification shown in FIG. 41.

FIG. 44AO1 TO 44A are views each showing the behaviors according to another modification of slack reduction processing.

FIG. 45 is a flowchart showing the detailed procedure of step S600 according to the modification shown in FIG. 44.

FIG. 46 is a flowchart showing the detailed procedure of step S600 according to another modification of slack reduction processing.

DETAILED DESCRIPTION OF THE PREFERRED EMBODIMENTS

A tag-label producing device according to an embodiment of the present disclosure will be described below with reference to the drawings. In this embodiment, the present disclosure is applied to an RFID label manufacturing system.

FIG. 1 is a system diagram showing an RFID tag manufacturing system equipped with a tag-label producing device according to this embodiment.

In an RFID tag manufacturing system TS shown in FIG. 1, a tag-label producing device 1 is connected to a route server RS, a plurality of information servers IS, a terminal 118a, and a general purpose computer 118b via a wired or wireless communication line NW. It should be noted that in the following description, the terminal 118a and the general purpose computer 118b will be generically referred to as simply as "PC 118" as appropriate.

FIG. 2 is a perspective view showing the overall construction of the above-mentioned tag-label producing device 1.

In FIG. 2, the tag-label producing device 1 is connected to the PC 118 and produces an RFID label with a desired print (or an ordinary print label with no RFID tag) on the basis of operation from the PC 118. The tag-label producing device 1 includes a main body 2, and an open/close cover 3 provided to the upper surface of the main body 2 so as to freely open and close.

The main body 2 is located on the forward side (the left forward side in FIG. 2), and includes a side wall 10 equipped with a label discharge port 11 for discharging an RFID label T (or an ordinary print label T-0, details of which will be described later) produced inside the main body 2, and a side cover 12 that is provided in the portion of the side wall 10 below the label discharge port 11 and whose lower end is rotatably supported in place.

The side cover 12 includes a pressing portion 13. The side cover 12 opens forward by pressing the pressing portion 13 from above. Further, a power supply button 14 for turning on/off the power supply of the tag-label producing device 1 is provided in the portion of the side wall 10 below an open/close button 4. Provided below the power supply button 14 is a cutter driving button 16 for driving a cutting mechanism 15 (see FIG. 3 that will be described later) disposed inside the main body 2 through manual operation by the user. When the button 16 is pressed, a label tape 109 with print (or a label tape 109-0 with print, details of which will be described later) is cut into a predetermined length, thereby producing the RFID label T (or the ordinary print label T-0).

The open/close cover 3 is rotatably pivoted on the end of the main body 2 on the right rear side in FIG. 2, and always urged in the opening direction via an urging member such as a spring. When the open/close button 4 arranged in the upper surface of the main body 2 so as to be adjacent to the open/close cover 3 is pressed, the locking engagement between the open/close cover 3 and the main body 2 is released, causing the open/close cover 3 to open due to the operation of the urging member. It should be noted that a see-through window 5 covered with a transparent cover is provided at the central side portion of the open/close cover 3.

FIG. 3 is a perspective view showing the construction of an internal unit 20 of the tag-label producing device 1 (however, a loop antenna LC that will be described later is omitted). In FIG. 3, the internal unit 20 generally includes a cartridge holder 6 in which a cartridge 7 used for producing the RFID label T (or a cartridge 7-0 used for producing the ordinary label T-0) is selectively accommodated and installed, a printing mechanism 21 equipped with a print head (thermal head) 23, the cutting mechanism 15, a half-cut unit 35 (see FIG. 9 that will be described later), and a label discharge mechanism 22 for discharging the produced RFID label T (see FIG. 20 that will be described later) from the label discharge port 11 (see FIG. 2).

FIG. 4 is a plan view showing the construction of the internal unit 20 shown in FIG. 3, FIG. 5 is an enlarged plan view schematically showing the detailed construction of the above-mentioned cartridge 7 for producing the RFID label T, and FIG. 6 is an enlarged plan view schematically showing the detailed construction of the above-mentioned cartridge 7-0 for producing the ordinary RFID label T-0.

In FIGS. 4, 5, and 6, the cartridge holder 6 selectively accommodates the cartridge 7 so that the orientation in the width direction of the label tape 109 with print (or the label tape 109-0 with print) discharged from the label discharge port 11 becomes perpendicular. The cartridge 7 and the cartridge 7-0 each has a housing 7A, a first roll 102 (or a first roll 102-0) arranged inside the housing 7A and around which a base tape 101 (or a base tape 101-0) having a band-like shape is wound, a second roll 104 around which a transparent cover film 103 of substantially the same width as the base tape 101, 101-0 is wound, a ribbon-supply-side roll 111 for paying out an ink ribbon 105 (thermal transfer ribbon; unnecessary when the print-receiving tape used is a thermal tape), a ribbon take-up roller 106 for taking up the ink ribbon 105 after printing, a tape feed roller 27 rotatably supported near a tape discharging portion 30 of the cartridge 7, 7-0 and brought into intimate contact with the tape to feed the tape, a guide roller 112, and a portion 190 to be detected containing information relating to the kind of a cartridge (information indicating whether a cartridge is the cartridge 7 for producing the RFID label T or the cartridge 7-0 for producing the ordinary label T-0).

The tape feed roller 27 presses the base tape 101, 101-0 and the cover film 103 into adhesion with each other to thereby prepare the label tape 109, 109-0 with print, and feeds the label tape 109, 109-0 with print in the direction indicated by the arrow A.

The first roll 102 of the cartridge 7 shown in FIG. 5 has the base tape 101 wound around a reel member 102a. The base tape 101 has a plurality of RFID circuit elements To successively formed at predetermined equal intervals in the longitudinal direction thereof. The base tape 101 is of a four-layer structure in this example (see the partially enlarged view in FIG. 5). The base tape 101 includes an adhesive layer 101a (bonding adhesive layer) made of a suitable adhesive material, a colored base film 101b (base layer) made of PET (polyethylene terephthalate) or the like, an adhesive layer 101c (affixing adhesive layer) made of a suitable adhesive material, and a separation sheet 101d (separation material layer), which are laminated in the stated order from the side wound on the inner side (the right side in FIG. 5) toward the side opposite thereto (the left side in FIG. 5).

On the back side (the left side in FIG. 5) of the base film 101b, a loop antenna 152 (tag-side loop antenna) that is formed in a loop coil-like configuration and performs transmission/reception of information is provided integrally in this example, with an IC circuit part 151 for storing information being formed so as to connect to the loop antenna 152. These components constitute each RFID circuit element To. The above-mentioned adhesive layer 101a for adhering the cover film 103 later is formed on the front side (the right side in FIG. 5) of the base film 101b. Further, on the back side (the left side in FIG. 5) of the base film 101b, the separation sheet 101d is adhered onto the base film 101b by means of the above-mentioned adhesive layer 101c provided so as to contain the RFID circuit element To.

The separation sheet 101d is peeled off when affixing the finally completed ordinary label T-0 having a label-shaped configuration onto a predetermined item or the like, thus allowing adhesion of the ordinary label T-0 onto the item or the like by means of the adhesive layer 101c. Further, on the surface of the separation sheet 101d, a predetermined identifier for feed control (which in this example is a black-painted identifier. Alternatively, this may also be a hole bored by laser machining or the like so as to substantially penetrate the base tape 101, or the like. See FIG. 20C that will be described later) PM is provided at a predetermined position corresponding to each RFID circuit element To (which in this example is a position located on the side further forward with respect to the distal end of the antenna 152 located on the forward side in the feed direction).

On the other hand, the first roll 102-0 of the cartridge 7-0 shown in FIG. 6 has the above-mentioned ordinary base tape 101-0 with no RFID circuit element To wound around a reel member 102a-0. In this example, the base tape 101-0 is of the same structure as the above-mentioned base tape 101 except that the base tape 101-0 is not equipped with the RFID circuit element To (see the partially enlarged view of FIG. 6). The base tape 101-0 includes an adhesive layer 101a-0 made of a suitable adhesive material, a colored base film 101b-0 made of PET (polyethylene terephthalate) or the like, an adhesive layer 101c-0 made of a suitable adhesive material, and a separation sheet 101d-0, which are laminated in the stated order from the side wound on the inner side (the right side in FIG. 6) toward the side opposite thereto (the left side in FIG. 6).

The above-mentioned adhesive layer 101a-0 for adhering the cover film 103 later is formed on the front side (the right side in FIG. 6) of the base film 101b-0. Further, on the back side (the left side in FIG. 6) of the base film 101b-0, the separation sheet 101d-0 is adhered onto the base film 101b-0 by means of the above-mentioned adhesive layer 101c-0. The separation sheet 101d-0 is peeled off when affixing the finally completed ordinary label T-0 having a label-shaped configuration onto a predetermined item or the like, thus allowing adhesion of the ordinary label T-0 onto the item or the like by means of the adhesive layer 101c-0.

In FIGS. 5 and 6, the second roll 104 has the cover film 103 wound around a reel member 104a. In the cover film 103 paid out from the second roll 104, the ink ribbon 105 driven by the ribbon-supply-side roll 111, which is arranged on the back surface side (that is, the side where the cover film 103 is adhered onto the base tape 101, 101-0) of the cover film 103, and the ribbon take-up roller 106 is pressed by the print head 23 into abutment with the back surface of the cover film 103.

The ribbon take-up roller 106 and the tape feed roller 27 are rotationally driven in synchronization with a ribbon take-up roller drive shaft 107 and a tape-feed-roller drive shaft 108 as the drive force of a feed motor 119 (see FIG. 3 described above or FIG. 16 that will be described later) that is, for example, a pulse motor provided outside the cartridge 7, 7-0 is transmitted to the ribbon take-up roller drive shaft 107 and the tape-feed-roller drive shaft 108 via a gear mechanism (not shown), respectively.

On the other hand, at this time, the print head 23 equipped with a large number of heater elements is mounted to a head mounting portion 24 provided upright to the cartridge holder 6, and is arranged on the upstream side of the tape feed roller 27 with respect to the feed direction of the cover film 103.

Further, a roller holder 25 is rotatably pivoted by means of a support shaft 29 on the portion of the cartridge holder 6 located forward of the cartridge 7, 7-0 (the lower side in FIG. 4), and can be switched by means of a switching mechanism 193 (see FIG. 16 that will be described later) between a pressure engagement position (a printing position; see FIG. 4) and a release position (separated position). A platen roller 26 and a tape pressure-contact roller 28 are rotatably disposed in the roller holder 25. The roller holder 25 holds the rollers 26, 28 so as to be capable of advancing/retracting movement with respect to the tape. When the roller holder 25 is switched to the above-mentioned pressure engagement position, the platen roller 26 and the tape pressure-contact roller 28 are brought into pressure contact (pressure engagement) with the print head 23 and the tape feed roller 27, respectively.

The portion 190 to be detected is equipped with a plurality of identifiers (objects to be detected). In this example, the uneven configuration (or a mark) of each identifier is detected by a cartridge sensor 191 on the tag-label producing device side, and the resulting detection signal is input to a control circuit 110 (see FIG. 16 that will be described later) of the tag-label producing device. Then, on the basis of the results of this detection, for example, the control circuit 110 can acquire information (cartridge-kind information) indicating whether the cartridge that is being loaded on the cartridge holder 6 is the cartridge 7 or the cartridge holder 7-0.

In the cartridge 7, 7-0 constructed as mentioned above, the base tape 101, 101-0 paid out from the first roll 102, 102-0 is supplied to the tape feed roller 27. On the other hand, in the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

When the cartridge 7, 7-0 is loaded onto the cartridge holder 6 and the roller holder 25 is moved from the release position to the pressure engagement position (printing position), the cover film 103 and the ink ribbon 105 are held between the print head 23 and the platen roller 26, and also the base tape 101, 101-0 and the cover film 103 are held between the tape feed roller 27 and the pressure roller 28. Then, due to the drive force of the feed motor 119, the ribbon take-up roller 106 and the tape feed roller 27 are rotationally driven in synchronization with each other in the directions indicated by the arrow B and the arrow C, respectively. At this time, the tape-feed-roller drive shaft 108, and the pressure roller 28 and the platen roller 26 are coupled together by a gear mechanism (not shown). As the tape-feed-roller drive shaft 108 is driven, the tape feed roller 27, the pressure roller 28, and the platen roller 26 rotate, and the base tape 101, 101-0 is paid out from the first roll 102, 102-0 and supplied to the tape feed roller 27 as described above. On the other hand, the cover film 103 is paid out from the second roll 104, and the plurality of heater elements of the print head 23 are energized by a print-head drive circuit 120 (see FIG. 16 that will be described later). As a result, a label print R (or a predetermined label print R-0 input by the operator; see FIG. 19 or 21 that will be described later), which corresponds to the information stored in the RFID circuit elements To on the base tape 101 onto which the cover film 103 is to be bonded, is formed on the back surface of the cover film 103. Then, the base tape 101, 101-0 and the cover film 103 on which printing has been finished as described above are adhered and integrated together by means of the tape feed roller 27 and the pressure roller 28, thus forming the label tape 109, 109-0 with print, which is carried to the outside of the cartridge 7, 7-0 by the tape discharging portion 30. The ink ribbon 105 for which printing on the cover film 103 has been finished is taken up on the ribbon take-up roller 106 due to the drive of the ribbon take-up roller drive shaft 107.

It should be noted that as shown in FIG. 4, a tape specific indication portion 8, which indicates, for example, the width, color, and the like of the base tape 101, 101-0 incorporated in the cartridge 7, 7-0, is provided in the upper surface of the housing 7A of the cartridge 7, 7-0. When the cartridge 7 or cartridge 7-0 is loaded onto the cartridge holder 6 and the open/close cover 3 is closed, the above-mentioned see-through window 5 and the tape specific indication portion 8 are opposed to each other, thus allowing the tape specific indication portion 8 to be viewed from the outside of the main body 2 through the transparent cover of the see-through window 5. This allows the kind or the like of the cartridge 7 (or cartridge 7-0) loaded on the cartridge holder 6 to be readily identified visually from the outside of the main body 2 through the see-through window 5.

On the other hand, as described above, the internal unit 20 includes the cutting mechanism 15 and the label discharge mechanism 22. The internal unit 20 further includes a loop antenna LC for performing reading or writing of information via wireless communication with respect to the RFID circuit element To equipped in the base tape 101, 101-0 (the label tape 109, 109-0 with print after the bonding; the same applies hereinafter). After reading or writing of information from or to the RFID circuit element To is performed by the loop antenna LC with respect to the label tape 109, 109-0 with print produced through the bonding process as described above, the label tape 109, 109-0 with print is cut by the cutting mechanism 15 automatically or by operating the cutter driving button 16 (see FIG. 2), thereby producing the RFID label T (or the ordinary print label T-0). This label T, T-0 is then further discharged by the label discharge mechanism 22 from the label discharge port 11 formed in the side wall 10 (see FIG. 2).

The cutting mechanism 15 includes a stationary blade 40, a movable blade 41 for performing cutting operation together with the stationary blade 40, a cutter helical gear 42 coupled to the movable blade 41, and a cutter motor 43 coupled to the cutter helical gear 42 through a gear train.

The label discharge mechanism 22 is disposed near the label discharge port 11 provided in the side wall 10 of the main body 2, and functions for forcibly discharging from the label discharge port 11 the label tape 109, 109-0 with print that has been cut by the cutting mechanism 15 (in other words, the RFID label T or ordinary label T-0; the same applies hereinafter). That is, the label discharge mechanism 22 includes a drive roller 51, a pressing roller 52 opposed to the drive roller 51 with the label tape 109, 109-0 with print therebetween, a pressing actuation mechanism portion 53 that is actuated so as to press the pressing roller 52 against the label tape 109, 109-0 with print or to release the pressing, and a discharge drive mechanism portion 54 that operates in synchronization with the pressing release operation of the pressing actuation mechanism portion 53 to rotate the drive roller 51 so that the label tape 109, 109-0 with print is discharged by the drive roller 51.

At this time, first guide walls 55, 56 and second guide walls 63, 64 for guiding the label tape 109, 109-0 with print toward the label discharge port 11 are provided on the inner side of the label discharge port 11 (see FIG. 4). The first guide walls 55, 56 and the second guide walls 63, 64 are respectively formed integrally, and are arranged so as to be spaced apart from each other by a predetermined distance at the discharge position of the label tape 109, 109-0 with print that has been cut by the stationary blade 40 and the movable blade 41.

The pressing actuation mechanism portion 53 includes a roller supporting holder 57, a roller supporting portion 58 that is mounted to the roller supporting holder 57 and retains the pressing roller 52 at its distal end portion, a holder supporting shaft 59 that rotatably supports the roller supporting holder 57, a cam 60 that operates in synchronization with the cutting mechanism 15 to drive the pressing actuation mechanism portion 53, and an urging spring 61.

The roller supporting portion 58 is rotatably supported in place so as to sandwich the pressing roller 52 from above and below. When, due to the rotation of the cutter helical gear 42, the roller supporting holder 57 is pivoted counterclockwise (the arrow 71 direction in FIG. 3) about the holder supporting shaft 59 through the cam 60, the pressing roller 52 is pressed against the label tape 109, 109-0 with print. Further, when the cutter helical gear 42 is rotated again, the holder supporting shaft 59 is pivoted in the direction opposite to the above-mentioned direction due to the urging spring 61, thus releasing the pressing roller 52 from the label tape 109, 109-0 with print.

The discharge drive mechanism portion 54 is composed of a tape discharging motor 65 and a gear train 66. After the label tape 109, 109-0 with print is pressed against the drive roller 51 by the pressing roller 52, the tape discharging motor 65 is driven and the drive roller 51 is rotated in the direction for discharging the label tape 109, 109-0 with print, whereby the label tape 109, 109-0 with print is forcibly discharged in the discharging direction.

It should be noted that a mark sensor 127, which can detect the identifier PM (see FIG. 7 or the like that will be described later) provided to the separation sheet 101d of the base tape 101 of the cartridge 7 in correspondence with the position of each RFID circuit element, is provided on the upstream side of the drive roller 51 with respect to the feed direction (in other words, between a half-cutter 34 that will be described later and the loop antenna LC). The mark sensor 127 is, for example, a known reflection-type photoelectric sensor composed of a light projector and a light receiver. The control output from the light receiver is inverted depending on whether or not the above-mentioned identifier PM is present between the light projector and the light receiver. It should be noted that the first guide wall 56 opposed to the mark sensor 127 is formed such that the surface of the first guide wall 56 is of a color that does not reflect the light from the light projector or is inclined so that the light receiver does not receive the reflection light.

FIG. 7 is a conceptual diagram as seen in the direction of the arrow D of FIG. 5, showing the conceptual structure of the RFID circuit element To equipped in the base tape 101 paid out from the first roll 102. In FIG. 7, the RFID circuit element To is composed of the loop antenna 152 that is formed in a loop coil-like configuration and performs transmission/reception of information, and an IC circuit part 151 that is connected to the loop antenna 152 and stores information.

FIG. 8 is a partially extracted perspective view showing the detailed construction of the main portion of the label discharge mechanism 22. In FIG. 8, the first guide walls 55, 56 are cut out at their vertically midway portions, with the drive roller 51 being provided to the first guide wall 55 so as to face the discharge position of the label tape 109, 109-0 with print from the cutout portion. It should be noted that the drive roller 51 has a roller cutout portion 51A formed by a concentric groove on its upper surface. On the other hand, in the other first guide wall 56 the pressing roller 52 is supported on the roller supporting portion 58 of the pressing actuation mechanism portion 53 so as to face the discharge position of the label tape 109, 109-0 with print from the cutout portion.

The loop antenna LC (which is conceptually shown in 8 by an imaginary line) is arranged near the pressing roller 52 with the pressing roller 52 being positioned at the center in the radial direction thereof. Upon loading the cartridge 7 onto the cartridge holder 6, access to (reading of information from or writing of information to) the RFID circuit element To equipped in the label tape 109 with print is performed by magnetic induction (electromagnetic induction, magnetic coupling, and other such non-contact induction method performed via an electromagnetic field).

FIG. 9 is a perspective view showing the outward appearance of the internal unit 20 with the label discharge mechanism 22 removed from the construction shown in FIG. 3.

In FIG. 9, the cutter helical gear 42 is provided with a boss 50 in the form of a projection, and the boss 50 is inserted into an elongated hole 49 of the movable blade 41 (see also FIG. 12 or 10 that will be described later). Further, on the downstream side of the stationary blade 40 and the movable blade 41 along the tape discharge direction, the half-cut unit 35 is mounted so as to be located between the stationary blade 40 and the movable blade 41, and the first guide walls 55, 56 (see FIG. 4).

The half-cut unit 35 is composed of a pad 38 arranged in alightment with the stationary blade 40, the half-cutter 34 opposed to the pad 38 and arranged on the movable blade 41 side, a first guide portion 36 arranged in alignment with the stationary blade 40 between the stationary blade 40 and the pad 38, and a second guide portion 37 opposed to the first guide portion 36 and arranged in alignment with the movable blade 41 (see also FIG. 12 that will be described later). The first guide portion 36 and the second guide portion 37 are formed integrally, and mounted to a side plate 44 (see FIG. 4) together with the stationary blade 40 by means of a guide fixing portion 36A provided at a position corresponding to a fixing hole 40A of the stationary blade 40.

A half-cutter motor 129 (not shown; see FIG. 16 that will be described later) is provided to pivot the half-cutter 34 about a predetermined pivot point (not shown). Although its detailed illustration is omitted, the drive mechanism of the half-cutter 34 using the half-cutter motor 129 is constructed as described below, for example. That is, the half-cutter motor 129 is formed by an electric motor capable of rotating in forward and reverse, and is connected to a crank member (also not shown) equipped with a pin (also not shown) via a gear train, and an elongated groove for engagement with the above-mentioned pin of the crank member is bored in the half-cutter 34 in advance. When the crank member is pivoted by the drive force of the half-cutter motor 129, the above-mentioned pin of the crank member moves along the elongated groove, thereby making it possible to pivot the half cutter 34 in a predetermined (clockwise or counterclockwise) direction.

The pad 38 is bent so that its end portion opposed to the label tape 109, 109-0 with print discharged from the tape discharge portion 30 becomes parallel to the tape, thus forming a receiving surface 38B. At this time, as described above, the label tape 109, 109-0 with print is of a five-layer structure obtained by bonding together the cover film 103 and the base tape 101 (or 101-0) that has a four-layer structure consisting of the adhesive layer 101a (or 101a-0), the base film 101b (or 101b-0), the adhesive layer 101c (or 101c-0), and the separation sheet 101d (or 101d-0) (see also FIG. 20 or 22 that will be described later). Then, by pressing the half-cutter 34 against the receiving surface 38B using the drive force of the half-cutter motor 129 as mentioned above, the cover film 103, the adhesive layer 101a (or 101a-0), the base film 101b (or 101b-0), and the adhesive layer 101c (or 101c-0) are cut off from the label tape 109, 109-0 with print located between the half-cutter 34 and the receiving surface 38B, and only the separation sheet 101d (or 101d-0) is left uncut, whereby half-cut lines HC (see FIG. 19 or the like that will be described later) are formed substantially along the tape width direction. Preferably, after the half-cutter 34 comes into abutment against the receiving surface 38B, an overload is prevented from occurring in the half-cutter motor 129 by means of, for example, a sliding clutch (not shown) that is interposed in the gear train in the case of the above-described construction. The receiving surface 38B also serves to guide the label tape 109, 109-0 with print toward the label discharge port 11 together with the first guide portions 55, 56.

FIGS. 10 and 11 are perspective views each showing the outward appearance of the cutting mechanism 15 with the half-cutter 34 removed from the internal unit 20.

In FIGS. 9 and 10, in the cutting mechanism 15, when the cutter helical gear 42 is rotated by the cutter motor 43 (see FIG. 3), the movable blade 41 rocks about a shaft hole 48 due to the boss 50 and the elongated hole 49, thereby cutting the label tape 109, 109-0 with print.

That is, first, when the boss 50 of the cutter helical gear 42 is located on the inner side (the left side in FIG. 10), the movable blade 41 is positioned away from the stationary blade 40 (hereinafter, this state will be referred to as the initial state; see FIG. 10). Then, when the cutter motor 43 is driven in this initial state, and the cutter helical gear 42 rotates counterclockwise (the arrow 70 direction), the boss 50 moves to the outer side, and the movable blade 41 pivots counterclockwise (the arrow 73 direction) about the shaft hole 48 to cut the label tape 109, 109-0 with print together with the stationary blade 40 fixed to the internal unit 20 (hereinafter, this state will be referred to as the cut state; see FIG. 11).

After the label tape 109, 109-0 with print is cut in this way to produce the RFID label T (or ordinary print label T-0), it is necessary to return the movable blade 41 to the initial state in order to cut the next label tape 109, 109-0 with print that is fed. Accordingly, the cutter motor 43 is driven again to rotate the cutter helical gear 42 counterclockwise (the arrow 70 direction), so the boss 50 is moved to the inner side again and the movable blade 41 pivots clockwise (the arrow 74 direction), thus separating the movable blade 41 away from the stationary blade 40 (see FIG. 10). This makes the movable blade 41 ready for cutting the next label tape 109, 109-0 with print to be cut and fed by the cartridge 7, 7-0.

It should be noted that at this time, a cutter helical gear cam 42A is provided on the cylindrical outer wall of the cutter helical gear 42. When the cutter helical gear 42 is rotated by the cutter motor 43, a micro switch 126 that is provided adjacent to the cutter helical gear 42 is switched from the OFF state to the ON state through the operation of the cutter helical gear cam 42A. The cut state of the label tape 109, 109-0 with print can be thus detected.

FIG. 12 is a perspective view showing the detailed construction of the movable blade 41 and stationary blade 40 together with the half-cut unit 35. FIG. 13 is a partial enlarged sectional view of FIG. 12. In FIGS. 12 and 13, the stationary blade 40 is fixed to the side plate 44 (see FIG. 4), which is provided upright on the left side of the cartridge holder 6 inside the cutting mechanism 15, through the fixing hole 40A by means of a screw or the like.

The movable blade 41 is substantially V-shaped and includes a blade portion 45 provided at the cutting part, a handle portion 46 located opposite to the blade portion 45, and a bent portion 47. The shaft hole 48 is provided in the bent portion 47, and the movable blade 41 is supported onto the side plate 44 at the shaft hole 48 so as to be pivotable about the bent portion 47. Further, the elongated hole 49 is formed in the handle potion 46 on the side opposite to the blade portion 45 provided at the cutting part of the movable blade 41. The blade portion 45 is formed by a two-step blade whose blade surface includes two inclined surfaces of different inclination angles, namely a first inclined surface 45A and a second inclined surface 45B, which cause the thickness of the blade portion 45 to gradually decrease.

On the other hand, an end portion 36B of the first guide portion 36 of the above-described half-cut unit 35 which is opposed to the discharged label tape 109, 109-0 with print is projected along the receiving surface 38B formed at an end portion of the pad 38, and is bent in the discharging direction of the label tape 109, 109-0 with print. Accordingly, at the end portion 36B of the first guide portion 36, a contact surface 36C with the label tape 109, 109-0 with print discharged from the cartridge 7 has a gently curved surface with respect to the discharge direction of the label tape 109, 109-0 with print.

Since the end portion 36B of the first guide portion 36 is projected and the contact surface 36C is formed as a curved surface, the leading end portion of the label tape 109, 109-0 with print curled at a predetermined curvature or more first comes into abutment with the contact surface 36C of the first guide portion 36. At this time, when the leading end portion of the label tape 109, 109-0 with print abuts a position on the downstream side (the lower side in FIG. 13) in the discharge direction of the label tape 109, 109-0 with print with respect to a boundary point 75 on the contact surface 36C of the first guide portion, the leading end portion of the label tape 109, 109-0 with print moves to the downstream side along the curved surface, whereby the label tape 109, 109-0 with print is guided toward the label discharge port 11 without entering between the stationary blade 40 and the first guide portion 36 or the pad 38.

Further, the first guide portion 36 is formed so that its guide width L1 (see FIG. 12) corresponding to the feed path of the label tape 109, 109-0 with print is larger than the maximum width of the label tape 109, 109-0 with print to be loaded (36 mm in the embodiment), and an inner surface 36D is formed so as to extend continuous to the contact surface 36C. The inner surface 36D is formed so as to be opposed to the first and second inclined surfaces 45A, 45B (details of which will be described later) of the movable blade 41. When performing cutting, the first and second inclined surfaces 45A, 45B of the movable blade 41 partially abut the inner surface 36D (see FIG. 13). Since the blade portion of the movable blade 41 is formed by a two-step blade as described above, upon cutting the label tape 109, 109-0 with print by the movable blade 41, a gap 39 is formed between each of the contact surface 36C, which corresponds to the end portion of the first guide portion 36, and the inner surface 36D, and the second inclined surface 45B of the movable blade 41 (see FIG. 13).

FIG. 14 is a front view showing the outward appearance of the movable blade 41, and FIG. 15 is a cross-sectional view taken along the line A-A of FIG. 14.

In FIGS. 14 and 15, the angle formed between the first inclined surface 45A and the back surface of the blade portion 45 on the side opposite to the first inclined surface 45A is 50 degrees in this embodiment.

FIG. 16 is a functional block diagram showing the control system of the tag-label producing device 1 according to this embodiment. In FIG. 16, a control circuit 110 is arranged on a control board (not shown) of the tag-label producing device 1.

The control circuit 110 includes a CPU 111 that has a timer 111A provided therein and controls respective devices, an input/output interface 113 that is connected to the CPU 111 through a data bus 112, a CGROM 114, ROMs 115, 116, and a RAM 117.

In the CGROM 114, dot pattern data for display is stored in correspondence with code data with respect to each of a large number of characters.

In the ROM (dot pattern data memory) 115, dot pattern data is stored with respect to each of a large number of characters for printing characters such as alphabet letters or signs while being classified into respective typefaces (gothic type typeface, Mincho typeface, and the like) in correspondence with the size of the print letter for each typeface. Graphic pattern data for printing graphic images including grayscale expressions are also stored in the ROM 115.

The ROM 116 stores a print drive control program for driving the print head 23, the feed motor 119, and the tape discharging motor 65 by reading data of a print buffer in correspondence with code data of characters such as letters or numerals input from the PC 118, a pulse number determining program for determining the number of pulses corresponding to the amount of energy for forming each print dot, a cutting drive control program for driving the feed motor 119 upon the completion of printing to feed the label tape 109, 109-0 with print to the cutting position, and driving the cutter motor 43 to cut the label tape 109, 109-0 with print, a tape discharging program for forcibly discharging the cut label tape 109, 109-0 with print (=RFID label T or ordinary print label T-0) through the tape discharge port 11 by driving the tape discharging motor 65, and other various programs necessary for controlling the tag-label producing device 1. The CPU 111 performs various computations on the basis of these various programs that are stored in the ROM 116.

The RAM 117 is provided with a text memory 117A, a print buffer 117B, a parameter storing area 117E, and the like. The text memory 117A stores document data input from the PC 118. The print buffer 117B stores as dot pattern data a plurality of dot patterns for printing letters, signs, and the like, or the number of applied pulses representing the amount of energy for forming each dot. The print head 23 performs dot printing in accordance with the dot pattern data stored in the print buffer 117B. Various computation data are stored in the parameter storing area 117E.

Connected to the input/output interface 113 are the PC 118, the print-head drive circuit 120 for driving the print head 23, a feed-motor drive circuit 121 for driving the feed motor 119, a cutter-motor drive circuit 122 for driving the cutter motor 43, a half-cutter motor drive circuit 128 for driving the half-cutter motor 129, a tape-discharging-motor drive circuit 123 for driving the tape discharging motor 65, a drive circuit 192 for driving the switching mechanism 193 for switching the above-mentioned roller holder 25 between the pressure engagement position (printing position) and the release position, a transmitting circuit 306 that generates a carrier wave for making access to (performing reading/writing with respect to) the RFID circuit element To via the loop antenna LC, and modulates the carrier wave on the basis of a control signal input from the control circuit 110, a receiving circuit 307 that performs demodulation of a reply signal received from the RFID circuit element To via the loop antenna LC, and outputs the resultant to the control circuit 110, the above-mentioned cartridge sensor 191, a tape cut sensor 124, and a cut release sensor 125.

In the control system built around the control circuit 110 as described above, upon input of letter data or the like via the PC 118, the text (document data) thereof is sequentially stored into the text memory 117A, and the print head 23 is driven via the drive circuit 120; the respective heater elements are selectively heated and driven in correspondence with printing dots of one line to thereby perform printing of dot pattern data stored in the print buffer 117B, and in synchronization with this, the feed motor 119 performs tape feed control via the drive circuit 121. Further, the transmitting circuit 306 performs modulation control of the carrier wave on the basis of a control signal from the control circuit 110, and the receiving circuit 307 performs processing on a signal demodulated on the basis of a control signal from the control circuit 110.

The tape cut sensor 124 and the cut release sensor 125 are each composed of the cutter helical gear cam 42A and the micro switch 126 that are provided on the cylindrical outer wall of the cutter helical gear 42 (see FIG. 10 or 11). More specifically, when the cutter helical gear 42 is rotated by the cutter motor 43, the micro switch 126 is switched from OFF to ON through the operation of the cutter helical gear cam 42A, thus detecting the completion of cutting of the label tape 109, 109-0 with print by the movable blade 45. The above-mentioned process constitutes the tape cut sensor 124. When the cutter helical gear 42 is further rotated, the micro switch 126 is switched from ON to OFF through the operation of the cutter helical gear cam 42A, thus detecting the return of the movable blade 45 to the release position. The above-mentioned process constitutes the cut release sensor 125.

FIG. 17 is a simplified circuit diagram showing the circuit configuration of the connecting portion between each of the transmitting circuit 306 and receiving circuit 307 with the loop antenna LC. In FIG. 17, the transmitting circuit 306 is connected to the device-side loop antenna LC, and the receiving circuit 307 is connected to a capacitor 310 that is connected in series with the device-side loop antenna LC.

FIG. 18 is a functional block diagram showing the functional configuration of the RFID circuit element To. In FIG. 18, the RFID circuit element To includes the loop antenna 152 for performing transmission/reception of a signal to/from the loop antenna LC on the tag-label producing device 1 side by magnetic induction in a non-contact manner, and the IC circuit part 151 connected to the loop antenna 152.

The IC circuit part 151 includes a rectification part 153 for rectifying the carrier wave received by the loop antenna 152, a power source part 154 for storing the energy of the carrier wave rectified by the rectification part 153 to use the stored energy as a drive power source, a clock extraction part 156 for extracting a clock signal from the carrier wave received by the loop antenna 152 and supplying it to a control unit 155, a memory part 157 capable of storing a predetermined information signal, a modem part 158 connected to the loop antenna 152, and the control unit 155 for controlling the actuation of the RFID circuit element To via the rectification part 153, the clock extraction part 156, the modem part 158, and the like.

The modem part 158 performs demodulation of a communication signal from the loop antenna LC of the tag-label producing device 1 received by the loop antenna 152, and on the basis of a reply signal from the control unit 155, modulates and reflects the carrier wave received by the loop antenna 152.

The control unit 155 executes a basic control, such as interpreting the received signal demodulated by the modem part 158, generating a reply signal on the basis of an information signal stored in the memory part 157, and returning the reply signal by the modem part 158.

FIGS. 19A and 19B are views each showing an example of the outward appearance of the RFID label T formed after completing writing (or reading) of information to the RFID circuit element To and cutting of the label tape 109 with print in the tag-label producing device 1 configured as described above using the cartridge 7 for forming the RFID label T. FIG. 19A is a top view, and FIG. 19B is a bottom view. Further, FIG. 20A is a view obtained by rotating the cross-sectional view taken along the line XXA-XXA' of FIG. 19 counterclockwise by 90°. FIG. 20B is a view obtained by rotating the cross-sectional view taken along the line XXB-XXB' of FIG. 19 counterclockwise by 90°.

In FIGS. 19A, 19B, 20A, and 20B, as described above, the RFID label T is of a five-layer structure with the cover film 103 added to the four-layer structure shown in FIG. 5. The five layers consist of the cover film 103, the adhesive layer 101*a*, the base film 101*b*, the adhesive layer 101*c*, and the separation sheet 101*d*, as viewed from the cover film 103 side (the upper side in FIG. 20) toward the side opposite thereto (the lower side in FIG. 20). Further, as described above, the RFID circuit element To including the loop antenna 152 provided on the back side of the base film 101*b* is equipped inside each of the base film 101*b* and adhesive layer 101*c*, and the label print R (in this example, the letters "RF-ID" indicating the kind of the RFID label T) corresponding to information stored in the RFID circuit element To, or the like is printed on the back surface of the cover film 103.

As has been already described above, the half-cut lines HC (half-cutting part; this example includes two half-cut lines HC, a front half-cut line HC1 and a rear half-cut line HC2, of which details will be described later) are formed by the half-cutter 34 substantially along the tape width direction in the cover film 103, the adhesive layer 101*a*, the base film 101*b*, and the adhesive layer 101*c*. The area of the cover film 103 sandwiched between these half-cut lines HC1, HC2 serves as a print area S where the label print R is printed, and the areas on both sides of the print area S across the half-cut lines HC1, HC2 with respect to the tape length direction respectively serve as a front margin area S1 and a rear margin area S2.

It should be noted that the dimension (the distance from the half-cut line HC1 to the half-cut line HC2) of the print area S with respect to the tape length direction is set so as to be variable in accordance with the content or form (for example, the number of letters, font, or the like) of the label print R. Further, the dimension (the distance from the leading end of the tape to the half-cut line HC1) X1 of the front margin area with respect to the tape length direction, and the dimension (the distance from the half-cut line HC2 to the rear end of the tape) X2 of the rear margin area with respect to the tape length direction are each set to a predetermined value (fixedly in this example) in advance. Further, the above-mentioned identifier PM remains in the separation sheet 101d, and the distance from the leading end of the identifier PM in the tape feed direction to the leading end of the RFID circuit element To in the tape feed direction is set to a predetermined value L. It should be noted that instead of providing a black-painted marking as shown in each of FIGS. 20A and 20B as the identifier PM as already described above, as shown in FIG. 20C, a hole bored by laser machining or the like so as to substantially penetrate the base tape 101 may also serve as the identifier PM. In this case, when the mark sensor 127 is formed by a known reflection-type photoelectric sensor composed of a light projector and a light receiver, as the identifier PM consisting of the above-mentioned hole comes to the position between the light projector and the light receiver, light from the light projector passes through the hole of the identifier PM and the transparent cover film 103 and is no longer reflected and hence no longer received by the light receiver, whereby the control output from the light receiver is inverted.

FIGS. 21A and 21B are views each showing an example of the outward appearance of the ordinary label T-0 formed after cutting of the label tape 109-0 with print in the tag-label producing device 1 configured as described above using the cartridge 7-0 for forming the ordinary label T-0. FIG. 21A is a top view, and FIG. 21B is a bottom view. Further, FIG. 22 is a view obtained by rotating the cross-sectional view taken along the line XXII-XXII' of FIG. 21 counterclockwise by 90°.

In FIGS. 21A, 21B, and 22, as described above, the ordinary label T-0 is of a five-layer structure with the cover film 103 added to the four-layer structure shown in FIG. 6. The five layers consist of the cover film 103, the adhesive layer 101a-0, the base film 101b-0, the adhesive layer 101c-0, and the separation sheet 101d-0 as viewed from the cover film 103 side (the upper side in FIG. 22) toward the side opposite thereto (the lower side in FIG. 22). Further, as described above, the label print R (in this example, the letters "ABCD") is printed on the back surface of the cover film 103.

As in the above-mentioned RFID label T, the half-cut lines HC1, HC2 are formed by the half-cutter 34 substantially along the tape width direction in the cover film 103, the adhesive layer 101a-0, the base film 101b-0, and the adhesive layer 101c-0. The area of the cover film 103 sandwiched between these half-cut lines HC1, HC2 serves as the print area S where the label print R is printed, and the areas on both sides of the print area S across the half-cut lines HC1, HC2 with respect to the tape length direction respectively serve as the front margin area S1 and the rear margin area S2. As in the above-mentioned RFID label T, the dimension of the print area S with respect to the tape length direction is set so as to be variable in accordance with the content or form (for example, the number of letters, font, or the like) of the label print R. Further, the dimension X1 of the front margin area with respect to the tape length direction, and the dimension X2 of the rear margin area with respect to the tape length direction are each set to a predetermined value (fixedly in this example) in advance.

FIG. 23 is a view showing an example of the screen displayed on the PC 118 (the terminal 118a or the general purpose computer 118b) mentioned above when, at the time of loading the cartridge 7 onto the tag-label producing device 1 to produce the RFID label T, access (reading or writing) is made to the RFID tag information of the IC circuit part 151 of the RFID circuit element To.

In FIG. 23, in this example, the tag label kind (access frequency and tape dimensions), the label print R printed in correspondence with the RFID circuit element To, an access (reading or writing) ID as identification information (tag ID) unique to that RFID circuit element To, the address of item information stored in the information server IS, and the storage destination addresses of those corresponding information in the route serer RS, and the like can be displayed on the PC 118. Through operation on the PC 118, the tag-label producing device 1 is activated and the label print R is printed onto the cover film 103, and also information such as the reading ID or item information is written to the IC circuit part 151 (or information such as the reading ID or item information previously stored in the IC circuit part 151 is read).

It should be noted that at the time of performing reading and writing as described above, the correspondence between the tag ID of the RFID circuit element To of the produced RFID label T and information read from the IC circuit part 151 (or information written into the IC circuit part 151) of that RFID label T is stored in the route server RS described above and can be referenced as required.

The most prominent feature of this embodiment resides in that, in the tag-label producing device 1 having the basic configuration as described above, the tag-label producing device 1 is endowed with the function of removing the slack from the tape when producing the RFID label T or ordinary label T-0 by using the cartridge 7 or 7-0, and that the operation mode of this slack removal processing is switched in accordance with whether the RFID label T is to be produced or the ordinary label T-0 is to be produced. The operation mode at the time of label production including the above-mentioned slack removal processing will be described below with reference to FIGS. 24 to 29.

(I) When Producing the RFID Label T (I-A) When the Print Length is Relatively Long FIGS. 24AO to 24K are explanatory views each showing the positional relation between the identifier PM, RFID circuit element To, and print area S for label print R of the label tape 109 with print that is continuously paid out, and the loop antenna LC, the mark sensor 127, the half-cut unit 35, the cutting mechanism 15, and the print head 23. It should be noted that as illustrated in the drawings, in this embodiment, the distance L in the base tape 101 from the leading end position of the identifier PM in the tape feed direction to the leading end of the RFID circuit element To in the tape feed direction is set in advance so to be equal to the distance Lo in the tape feed direction between the mark sensor 127 and the print head 23.

First, FIG. 24AO conceptually illustrates a state in which, due to such reasons that the cartridge 7 is detached from the cartridge holder 6 while a plurality of RFID labels T are being produced, slack has developed in the base tape 101, the cover film 103, or the label tape 109 with print (or the ink ribbon 105, although not shown) in the tape feed path. In this embodiment, as the function for removing this slack, upon loading the cartridge 7, the feeding of the base tape 101, cover film 103, or label tape 109 with print by the tape feed roller 27 is performed by a relatively short distance (such a distance that at least does not cause the identifier PM to reach the detection position of the mark sensor 127) (at this time, the roller holder 25 is in the pressure engagement state, so the ink ribbon 105 is also fed similarly).

FIG. 24A shows a state in which the above-mentioned feeding has been performed, and thus the slack in the base tape 101, the cover film 103, or the label tape 109 with print (or the ink ribbon 105) has been substantially removed (or reduced). It should be noted that in this state, the identifier PM has not yet been detected by the mark sensor 127.

When the feeding of the label tape 109 with print (in other words, the feeding of the base tape 101 and cover film 103; the same applies hereinafter) further proceeds in this state, the portion in the vicinity of the leading end of the RFID circuit element To in the tape feed direction reaches the position of the print head 23 (FIG. 24B). At this time, since L=Lo as described above, when, due to the movement of the label tape 109 with print, the leading end of the identifier PM reaches the position of the mark sensor 127, the position of the cover film 103 corresponding to the RFID circuit element To (the position where the cover film 103 is to be bonded to the RFID circuit element To position of the base tape 101) reaches the position of the print head 23. When, in correspondence with this, the identifier PM is detected by the mark sensor 127, printing of the label print R onto the cover film 103 is started (FIG. 24C). In this example, as shown in FIGS. 24I to 24K that will be described later, a relatively long string of letters (alphabet letters "ABCDEFGHIJKLMN") is printed.

When the feeding of the label tape 109 with print further proceeds from the state as shown in FIG. 24C, the preset position of the front half-cut line HC1 (as described above, the position at the distance X1 from the leading end of the tape; see FIG. 19) reaches the position of the half-cut unit 35 (FIG. 24D). In this state, since the identifier PM has already been detected by the mark sensor 127 as described above, the detection of the arrival at this position is performed by detecting that the label tape 109 with print has moved by a predetermined distance from the state shown in FIG. 24B mentioned above (identifier PM detection start state). In response to this detection, the feeding of the label tape 109 with print is stopped, and the front half-cut line HC1 is formed by means of the half-cut unit 35 (FIG. 24D).

Thereafter, the feeding of the label tape 109 with print is resumed, and as the feeding of the label tape 109 with print further proceeds from the state shown in FIG. 24D mentioned above (FIG. 24E), the RFID circuit element To reaches the position of the loop antenna LC (FIG. 24F). At this time, since a relatively long letter string ("ABCDEFGHIJKLMN") is printed as the label print R in this example as described above, not all of the printing in the print area S has been finished at this point. Accordingly, the feeding and printing of the label tape 109 with print are temporarily stopped (interrupted), and after performing wireless communication with the RFID circuit element To by means of the loop antenna LC in this feeding stopped state, the feeding and printing are resumed (FIG. 24G), thus eventually completing printing of all of the string of letters ("ABCDEFGHIJKLMN") (FIG. 24H).

When the feeding of the label tape 109 with print further proceeds from the above-mentioned state shown in FIG. 24H, the preset position of the rear half-cut line HC2 (as described above, the position at the distance X2 from the rear end of the tape; see FIG. 19) reaches the position of the half-cut unit 35. As in the detection of the position of the front half-cut line HC1 as described above, the detection of the arrival at this position is performed by detecting that the label tape 109 with print has moved by a predetermined distance from the state shown in FIG. 24B. In response to this detection, the feeding of the label tape 109 with print is stopped, and the rear half-cut line HC2 is formed by means of the half-cut unit 35 (FIG. 24I).

As the feeding of the label tape 109 with print further proceeds from the state shown in FIG. 24I mentioned above (FIG. 24J), the position of a cutting line CL (cutting part) corresponding to the dimension X of the print area S of each RFID label T with respect to the tape length direction, which is set so as to be variable in accordance with the length of the label print R, reaches the position of the cutting mechanism 15. In the same manner as mentioned above, the detection of the arrival at this position is also performed by detecting that the label tape 109 with print has moved by a predetermined distance from the state shown in FIG. 24B. In response to this detection, the feeding of the label tape 109 with print is stopped, and cutting is performed by the cutting mechanism 15 at the cutting line CL (FIG. 24K), so the leading end side of the label tape with print is cut off to produce the RFID label T.

FIG. 25 is a view, substantially corresponding to FIG. 19A described above, showing an example of the RFID label T completed as described above. In the RFID label T, the RFID circuit element To is arranged on the center side in the tape length direction, the label print R is printed in the print area S corresponding to the RFID circuit element To, and the front margin area S1 where the identifier PM is present, and the rear margin area S2 are provided across the front and rear half cut lines HC1, HC2, respectively, from the print area S. It should be noted that as described above, the length of the print area S varies in accordance with the form of the label print R.

(I-B) When the Print Length is Relatively Short

Description will be given of a case where, unlike in the case of the section (I-A) mentioned above, a relatively short string of letters (alphabet letters "AMCDEFJHIJ") is printed. Since the procedure for the slack removal processing in this case is the same as that described in the section (I-A) mentioned above with reference to FIG. 24AO, the description thereof is omitted, and description will be given of the series of processing of FIGS. 26A to 26K corresponding to the series of processing of FIGS. 24A to 24K mentioned above.

FIGS. 26A to 26E are the same as FIGS. 24A to 24E described above. That is, when, after the slack removal is finished and the feeding of the label tape 109 with print is started (FIG. 26A), the feeding further proceeds and the leading end of the identifier PM reaches the position of the mark sensor 127 (FIG. 26B), the printing of the label print R onto the cover film 103 is started (FIG. 26C). When the feeding further proceeds, and the position of the front half-cut line HC1 reaches the position of the half-cut unit 35, the front half-cut line HC1 is formed by means of the half-cut unit 35 (FIG. 26D); thereafter, the feeding of the label tape 109 with print is resumed, and the feeding of the label tape 109 with print further proceeds (FIG. 26E).

Then, since the number of letters in the label print R is relatively small in this example, prior to the arrival of the RFID circuit element To at the position of the loop antenna LC (see FIG. 26G that will be described later), the printing of the label print ("ABCDEFGHIJ") is completed (FIG. 26F).

Thereafter, as the feeding proceeds, the RFID circuit element To reaches the position of the loop antenna LC (FIG. 26G). Here, unlike in the case of the section (I-A) described above, all of the printing with respect to the print area S has been already finished at this point. Accordingly, the feeding of the label tape 109 with print is temporarily stopped (interrupted), and after performing wireless communication with the RFID circuit element To by means of the loop antenna LC in this feeding stopped state, the feeding is resumed (FIG. 26H).

The subsequent operations in FIGS. 26I to 26K are the same as those in FIGS. 24I to 24K described above. That is, when the feeding of the label tape 109 with print further proceeds from the state shown in FIG. 26H mentioned above, and the position of the half-cut line HC2 reaches the position of the half-cut unit 35, the feeding of the label tape 109 with print is stopped, and the rear half-cut line HC2 is formed by means of the half-cut unit 35 (FIG. 26I). When the feeding further proceeds (FIG. 26J) and the position of the cutting line CL reaches the position of the cutting mechanism 15, the feeding is stopped, and cutting is performed by the cutting mechanism 15 at the cutting line CL (FIG. 26K), so the leading end side of the label tape 109 with print is cut off to produce the RFID label T.

FIGS. 27 is a view, substantially corresponding to FIG. 25 described above in the section (I-A) mentioned above, showing an example of the RFID label T completed as described above.

(II) When Producing the Ordinary Label T-0

FIGS. 28AO to 28K are explanatory views each showing the positional relation between the print area S for label print R of the label tape 109-0 with print that is continuously paid out, the half-cut unit 35, the cutting mechanism 15, and the print head 23 (it should be noted that the loop antenna LC and the mark sensor 127 are also illustrated for reference).

First, FIG. 28AO conceptually illustrates a state in which, due to such reasons that the cartridge 7-0 is detached from the cartridge holder 6 while a plurality of ordinary labels T-0 are being produced, slack has developed in the base tape 101-0, the cover film 103, the label tape 109-0 with print (or the ink ribbon 105, although not shown) in the tape feed path.

Here, in this embodiment, upon loading the cartridge 7-0, prior to starting the production of the ordinary label T-0, the feeding of the tape base 101-0, cover film 103, label tape 109-0 with print by the tape feed roller 27 is performed by a relatively long distance in order to remove this slack (at this time, the roller holder 25 is in the pressure engagement state, so the ink ribbon 105 is also fed similarly). FIG. 28AO2 shows this state. In the state of this example, the leading end of the label tape 109-0 with print has been fed by a long distance beyond the position of the loop antenna LC.

Then, once the feeding is performed as mentioned above, and the slack in the base tape 101-0, the cover film 103, the label tape 109-0 with print (or the ink ribbon 105) is removed in the tape feed path, cutting is performed by the cutting mechanism 15, and the leading end side thereof is discharged. FIG. 28A shows this state.

The feeding of the label tape 109-0 with print (in other words, the feeding of the base tape 101-0 and cover film 103; the same applies hereinafter) further proceeds from this state. The feed distance at this time is detected by, for example, counting the number of pulses output by the feed-motor drive circuit 121 for driving the feed motor 119 that is a pulse motor. Once this feed distance reaches a predetermined distance set in advance (FIG. 28B), the printing of the label print R onto the cover film 103 is started (FIG. 28C). In this example, as shown in FIGS. 28I to 28K that will be described later, a string of alphabet letters "ABCDEFGHIJKLMN" is printed.

When the feeding of the label tape 109-0 with print further proceeds from the state as shown in FIG. 28C mentioned above, the preset position of the front half-cut line HC1 (as described above, the position at the distance X1 from the leading end of the tape; see FIG. 21) reaches the position of the half-cut unit 35 (FIG. 28D). The detection of the arrival at this position may simply be performed by detecting that the label tape 109-0 with print has moved by a predetermined distance from the state shown in FIG. 24B described above. In response to this detection, the feeding of the label tape 109-0 with print is stopped, and the front half-cut line HC1 is formed by means of the half-cut unit 35 (FIG. 28D).

Thereafter, the feeding of the label tape 109-0 with print is resumed, and the feeding of the label tape 109-0 with print further proceeds from the state shown in FIG. 28D mentioned above (FIG. 28E, 28F, 28G), thus eventually completing printing of all of the string of letters ("ABCDEFGHIJKLMN") (FIG. 28H).

When the feeding of the label tape 109-0 with print further proceeds from the above-mentioned state shown in FIG. 28H, the preset position of the rear half-cut line HC2 (as described above, the position at the distance X2 from the rear end of the tape; see FIG. 21) reaches the position of the half-cut unit 35. As in the detection of the position of the front half-cut line HC1 as described above, the detection of the arrival at this position is performed by detecting that the label tape 109-0 with print has moved by a predetermined distance from the state shown in FIG. 28B. In response to this detection, the feeding of the label tape 109-0 with print is stopped, and the rear half-cut line HC2 is formed by means of the half-cut unit 35 (FIG. 28I).

As the feeding of the label tape 109-0 with print further proceeds from the state shown in FIG. 28I mentioned above (see FIG. 28J), the position of the cutting line CL (cutting part) corresponding to the dimension X of the print area S of each ordinary label T-0 with respect to the tape length direction, which is set so as to be variable in accordance with the length of the label print R, reaches the position of the cutting mechanism 15. In the same manner as mentioned above, the detection of the arrival at this position is also performed by detecting that the label tape 109-0 with print has moved by a predetermined distance from the state shown in FIG. 28B. In response to this detection, the feeding of the label tape 109-0 with print is stopped, and cutting is performed by the cutting mechanism 15 at the cutting line CL (FIG. 28K), so the leading end side of the label tape with print is cut off to produce the ordinary label T-0.

FIG. 29 is a view, substantially corresponding to FIG. 21A described above, showing an example of the ordinary label T-0 completed as described above. In the ordinary label T-0, the label print R is printed in the print area S on the center side in the tape length direction, and the front margin area S1 and the rear margin area S2 are provided across the front and rear half cut lines HC1, HC2, respectively, from the print area S. It should be noted that as described above, the length of the print area S varies in accordance with the form of the label print R.

It should be noted that when producing the ordinary label T-0, the procedure is the same as that of FIG. 28 mentioned above even in the case where the print length is relatively short, such as when printing the alphabet letters "ABCDEFGHIJ".

As described above, according to this embodiment, in accordance with whether the RFID label T is to be produced by loading the cartridge 7 onto the cartridge holder 6, or the ordinary label T-0 is to be produced by loading the cartridge 7-0, slack prevention processing and the subsequent label production are performed in different modes.

FIG. 30 is a flowchart showing the procedure of control executed by the control circuit 110 in order to perform the above-described control.

In FIG. 30, this flow is started when a predetermined RFID label producing operation is performed by the tag-label producing device 1 via the PC 118.

First, in step S5, on the basis of the detection signal from the cartridge sensor 191, it is determined whether or not the cartridge that is being loaded on the cartridge holder 6 is the cartridge 7 for producing the RFID label T. If the cartridge 7 is being loaded, the determination is satisfied, and the flag Fc indicating the kind of the cartridge is set as Fc=1; if the cartridge 7-0 for producing the ordinary label T-0 is being loaded, the determination is not satisfied, and the flag Fc is set as Fc=0 in step S12. The process then transfers to the next step S15.

In step S15, the operation signal from the PC 118 is input via the communication line NW and the input/output interface 113 (or the operation signal from suitable operation means provided to the tag-label producing device 1 is input), and it is determined whether or not the operator has performed "FEED" operation aimed at removing slack from the tape. The determination is not satisfied until this FEED operation is performed by the operator, and once the FEED operation is performed, the determination is satisfied and the process transfers to the next step S20.

In step S20, processing is executed in a slack removal (reduction) mode that differs in accordance with whether the above-mentioned flag Fc is 0 or 1 (in other words, whether the cartridge being loaded is the cartridge 7 for producing the RFID label T or the cartridge 7-0 for producing the ordinary label T-0) (details of this processing will be described later), and the process transfers to step S25.

In step S25, it is determined whether or not the above-mentioned flag Fc=1 (in other words, whether or not the cartridge being loaded is the cartridge 7 for the RFID label T). If the cartridge 7 is loaded on the cartridge holder 6, since Fc=1 is set in step S10 mentioned above, the determination is satisfied, and the process transfers to step S100A where tag label preparation processing of performing various settings and the like on the basis of the above-mentioned operation signal is executed (details of which will be described later). If the cartridge 7-0 is loaded on the cartridge holder 6, since Fc=0 is set in step S12 mentioned above, the process transfers to step S100B where ordinary-label preparation processing of performing various settings and the like on the basis of the above-mentioned operation signal is executed (details of which will be described later).

Once step S100A or S100B mentioned above is finished, the process transfers to step S30, and after a control signal is output to the drive circuit 192 via the input/output interface 113 to drive the switching mechanism 193 and the roller holder 25 is switched into the pressure engagement position (printing position), a control signal is further output to the feed-motor drive circuit 121, and the tape feed roller 27 and the ribbon take-up roller 106 are rotationally driven by the drive force of the feed motor 119. Further, a control signal is output to the tape discharging motor 65 via the tape-discharging-motor drive circuit 123, and the drive roller 51 is rotationally driven. Due to these operations, the base tape 101, 101-0 is paid out from the first roll 102, 102-0 and supplied to the tape feed roller 27, and the cover film 103 is paid out from the second roll 104. By means of the tape feed roller 27 and the pressure roller 28, the base tape 101, 101-0 and the cover film 103 are adhered and integrated together to form the label tape 109, 109-0 with print, which is carried in the direction to the outside of the cartridge 7, 7-0 and further to the outside of the tag-label producing device 1.

Thereafter, in step S35, it is determined whether or not the label tape 109, 109-0 with print has reached the printing start position. In the case of the cartridge 7, on the basis of a detection signal of the mark sensor 127 input via the input/output interface 113, it is determined whether or not the identifier PM of the label tape 109 with print has been detected. In the case of the cartridge 7-0, as described above, after cutting is performed by the cutting mechanism 15 in the FEED processing of step S20 mentioned above (details of which will be described later), on the basis of the count value of the number of pulses output by the feed-motor drive circuit 121 for driving the feed motor 119 that is a pulse motor, it may be determined whether or not feeding has been performed by the corresponding distance. The determination is not satisfied until the arrival at the printing start position and this procedure is repeated, and upon detecting the identifier PM, the determination is satisfied, and the process transfers to the next step S40.

In step S40, a control signal is output to the print-head drive circuit 120 via the input/output interface 113, and the print head 23 is energized, thus starting printing of the label print R such as letters, signs, or barcodes corresponding to the print data generated in step S100A or S100B, with respect to the above-described print area S (in the case of the cartridge 7, the area to be substantially bonded onto the back surface of the RFID circuit elements To that are arranged in the base tape 101 at predetermined equal intervals) of the cover film 103 (see FIGS. 24 and 28).

Thereafter, in step S45, it is determined whether or not the label tape 109, 109-0 with print has been fed to the above-described front half-cut position (in other words, whether or not the label tape 109, 109-0 with print has reached the position where the half-cutter 34 of the half-cut mechanism 35 directly faces the front half-cut line HC1 set in step S100A or S100B). In the case of the cartridge 7, for example, the determination at this time may be performed by calculating, through the counting of the number of pulses output by the feed-motor drive circuit 121, the distance by which the label tape 109 with print has been fed after the detection of the identifier PM of the base tape 101 in step S10 mentioned above. In the case of the cartridge 7-0, as described above, the feed distance may be calculated by counting the number of pulses output after the cutting in the FEED processing. The determination is not satisfied until the arrival at the front half-cut position and this procedure is repeated, and upon the arrival at the front half-cut position, the determination is satisfied and the process transfers to the next step S50.

In step S50, a control signal is output to each of the feed-motor drive circuit 121 and the tape-discharging-motor drive circuit 123 via the input/output interface 113, and the drives of the feed motor 119 and tape discharging motor 65 are stopped to thereby stop the rotations of the tape feed roller 27, ribbon take-up roller 106, and drive roller 51. Accordingly, as the label tape 109, 109-0 with print paid out from the cartridge 7, 7-0 moves in the discharge direction, the paying out of the base tape 101, 101-0 from the first roll 102, 102-0, the paying out of the cover film 103 from the second roll 104, and the feeding of the label tape 109, 109-0 with print are stopped in the state with the half-cutter 34 of the half-cut mechanism 35 directly facing the front half-cut line HC1 set in step S100A or S100B. Further, at this time, a control signal is also output to the print-head drive circuit 120 via the input/output interface 113, and the energization of the print head 23 is stopped to thereby stop (interrupt) the printing of the label print R.

Thereafter, in step S55, a control signal is output to the half-cutter motor drive circuit 128 via the input/output interface 113 to drive the half-cutter motor 129, and the half-cutter 34 is pivoted to perform front half-cut processing of cutting the cover film 103, adhesive layer 101a, base film 101b, and adhesive layer 101c of the label tape 109 with print (or cutting the cover film 103, adhesive layer 101a-0, base film 101b-0, and adhesive layer 101c-0 of the label tape 109-0 with print) to thereby form the front half-cut line HC1 (see FIG. 24D or 42).

Then, the process transfers to step S60 where, in the same manner as in step S30 mentioned above, the feeding of the label tape 109, 109-0 with print is resumed by rotationally driving the tape feed roller 27, the ribbon take-up roller 106, and the drive roller 51, and in the same manner as in step S40, the print head 23 is energized to resume the printing of the label print R.

Thereafter, the process transfers to step S65 where, in the same manner as in step S25 described above, it is determined whether or not the above-mentioned flag Fc=1 (in other words, whether or not the cartridge being loaded is the cartridge 7 for producing the RFID label T). If the cartridge 7-0 is loaded on the cartridge holder 6, the determination is not satisfied, and the process transfers to step S700 where ordinary-label producing processing is executed (details of which will be descried later). If the cartridge 7 is loaded on the cartridge holder 6, the determination is satisfied, and process transfers to step S70.

In step S70, in accordance with the print end position (see step S130 that will be described later), which is set so as to be variable in accordance with the content of print (the number of print letters, font, and the like) in step S100A, and the tag rear end position (see step S145 that will be described later), which is set in accordance with the information on the kind of the cartridge 7 contained in the operation signal input by the operator in step S100A, it is determined with respect to the label tape 109 with print whether or not the communication position with the RFID circuit element To (the position where the RFID circuit element To directly faces the loop antenna LC) is reached before the printing of all of the label print R with respect to the print area S is finished (the state shown in FIG. 24F described above), or whether or not the printing of all of the label print R with respect to the print area S is finished before the communication position with the RFID circuit element To (the position where the RFID circuit element To directly faces the loop antenna LC) is reached (the state shown in FIG. 26G described above).

For example, if the length of the label print R to be printed is relatively long and the positional relation as shown in FIG. 24F mentioned above results, the determination of step S70 mentioned above is satisfied, and the process transfers to step S200 where the processing of producing a long print label is performed. That is, once the label tape 109 with print has been fed to the communication position with the RFID circuit element To (the position where the RFID circuit element To directly faces the loop antenna LC), the feeding and printing are stopped to perform transmission/reception of information; thereafter, the feeding and printing are resumed to complete the printing, and the feeding is further continued and then stopped at the rear half-cut position to form the rear half-cut line HC2.

On the other hand, for example, if the length of the label print R to be printed is relatively short and the positional relation as shown in FIG. 26G mentioned above results, the determination of step S70 mentioned above is not satisfied, and the process transfers to step S300 where the processing of producing a short print label is performed. That is, after the feeding and printing are continued as they are to complete the printing first, the feeding is further continued; upon arrival at the communication position with the RFID circuit element To (the position where the RFID circuit element To directly faces the loop antenna LC), the feeding is stopped to perform transmission/reception of information, and after the feeding is further continued, the feeding is stopped at the rear half-cut position to form the rear half-cut line HC2.

Once step S200, S300, or S700 is finished as described above, the process transfers to step S75 (at this point, the feeding of the label tape 109 with print has been resumed in step S200, S300, or S700). In step S75, it is determined whether or not the label tape 109, 109-0 with print has been fed to the above-described full-cut position (in other words, whether or not the label tape 109 with print has reached the position where the movable blade 41 of the cutting mechanism 15 directly faces the cutting line CL set in step S100A or S100B)(the determination at this time as well may simply be performed in the same manner as the determination in step S45 described above). The determination is not satisfied until the arrival at the full-cut position and this procedure is repeated, and upon the arrival at the full-cut position, the determination is satisfied and the process transfers to the next step S80.

In step S80, in the same manner as step S50 mentioned above, the rotations of the tape feed roller 27, ribbon take-up roller 106, and drive roller 51 are stopped to thereby stop the feeding of the label tape 109 with print. Accordingly, in the state with the movable blade 41 of the cutting mechanism 15 directly facing the cutting line CL set in step S100A or S100B, the paying out of the base tape 101, 101-0 from the first roll 102, 102-0, the paying out of the cover film 103 from the second roll 104, and the feeding of the label tape 109, 109-0 with print stop.

Thereafter, in step S85, a control signal is output to the cutter-motor drive circuit 122 to drive the cutter motor 43, and the movable blade 41 of the cutting mechanism 15 is pivoted to perform full-cut processing of cutting (severing) all of the cover film 103, adhesive layer 101a, base film 101b, adhesive layer 101c, and separation sheet 101d of the label tape 109 with print (or the cover film 103, adhesive layer 101a-0, base film 101b-0, adhesive layer 101c-0, and separation sheet 101d-O of the label tape 109-0 with print) to form the cutting line CL (see FIG. 24K or 28K). Due to the severing by the cutting mechanism 15, a label-shaped RFID label T from which RFID tag information of the RFID circuit element To has been read and on which corresponding predetermined printing has been performed, is produced as it is cut off from the label tape 109 with print (or an ordinary label T-0 which has been cut off from the label tape 109-0 with print and on which predetermined printing has been performed is produced).

Thereafter, the process transfers to step S90 where a control signal is output to the tape-discharging motor drive circuit 123 via the input/output interface 113 to resume the drive of the tape discharging motor 65, thereby rotating the drive roller 51. Accordingly, the feeding by the drive roller 51 is resumed, the label T, T-0 produced in a label shape in step S55 mentioned above is fed toward the label discharge port 11 and discharged to the outside of the tag-label producing device 1 from the label discharge port 11, and this flow is ended.

It should be noted that the cutting processing in step S85 and the label discharge processing in step S90 mentioned above may be performed in synchronization with each other.

FIG. 31 is a flowchart showing the detailed procedure of step S20 descried above. In the flow shown in FIG. 31, first, in step S21, as in step S25 or S65 described above, it is determined whether or not the above-mentioned flag Fc=1 (in other words, whether or not the cartridge being loaded is the cartridge 7 for producing the RFID label T). If the cartridge 7 is loaded on the cartridge holder 6, the determination is satisfied, and the process transfers to step S600 where tag label FEED processing is executed (details of which will be described later). If the cartridge 7-0 is loaded on the cartridge holder 6, the determination is not satisfied, and the process transfers to step S22.

In step S22, a control signal is output to the drive circuit 192 via the input/output interface 113 to drive the switching mechanism 193, and the roller holder 25 is switched into the pressure engagement position (printing position).

Thereafter, in step S23, the base tape 101-0, the cover film 103, and the label tape 109-0 with print are fed by means of the tape feed roller 27 by a relatively long distance U in advance in order to sufficiently remove the slack (see FIG. 28AO2). It should be noted that since the roller holder 25 is in the pressure engagement state at this time, the ink ribbon 105 is also fed similarly.

Then, the process transfers to step S24 where, in the same manner as in step S85 described above, a control signal is output to the cutter-motor drive circuit 122 to drive the cutter motor 43, and the movable blade 41 of the cutting mechanism 15 is pivoted to perform full-cut processing of cutting (severing) the label tape 109-0 with print. Accordingly, on the rear side from this cutting position, a label tape 109-0 with print that is free from any slack remains with its leading end positioned at the position of the cutting mechanism 15 (see FIG. 28A).

Thereafter, the process transfers to step S26 where, as in step S90 mentioned above, a control signal is output to the tape-discharging motor drive circuit 123 via the input/output interface 113 to resume the drive of the tape discharging motor 65, thereby rotating the drive roller 51. Accordingly, the feeding by the drive roller 51 is resumed, and the leading end portion of the label tape 109-0 with print (however, in actuality, there may be cases where no printing has been performed in this portion) that has been cut off in step S25 mentioned above is fed toward the label discharge port 11 and discharged to the outside of the tag-label producing device 1 from the label discharge port 11.

Then, the process transfers to step S27, and a control signal is output to the drive circuit 192 via the input/output interface 113 to drive the switching mechanism 193, the roller holder 25 is switched into the original release position (separated position), and this routine is ended.

FIG. 32 is a flowchart showing the detailed procedure of step S600. In FIG. 32, first, in step S605, as in step S22 mentioned above, the switching mechanism 193 is driven to switch the roller holder 25 into the pressure engagement position (printing position).

Thereafter, in step S610, in order to remove (or reduce) slack while avoiding a situation where the RFID circuit element To directly faces the cutting mechanism 15, the base tape 101, the cover film 103, the label tape 109 with print is fed by means of the tape feed roller 27 by a relatively short distance U1 (which is smaller than the distance U described above) in advance (see FIG. 24A described above). It should be noted that since the roller holder 25 is in the pressure engagement state at this time, the ink ribbon 105 is also fed similarly.

Then, the process transfers to step S615 where, as in step S27 mentioned above, the switching mechanism 193 is driven to switch the roller holder 25 into the original release position (separated position), and this routine is ended.

FIG. 33 is a flowchart showing the detailed procedure of step S100A descried above. In the flow shown in FIG. 33, first, in step S110, as in step S15 mentioned above, an operation signal from the PC 118 is input via the communication line NW and the input/output interface 113 (or an operation signal from suitable operation means provided in the tag-label producing device 1 is input), and print data is created on the basis of this operation signal. At this time, this operation signal contains print information including, for example, the letter, design, pattern, and the like of the label print R designated by the operator or the font (typeface, size, thickness, and the like) thereof, or the code data of characters such as letters and numerals. When performing writing of information with respect to the RFID circuit element To, the operation signal also contains this writing information (RFID tag information including at least tag ID as identification information). Here, print data corresponding to the above-mentioned print information is created.

Then, in step S115, on the basis of the operation signal mentioned above, communication data corresponding to the above-mentioned writing information is created. It should be noted that as described above, although this procedure is executed in the case where the RFID label T is produced by performing writing of information to the RFID circuit element To, in the case where the RFID label T is produced by performing reading of information previously stored in the RFID circuit element To, this procedure may be omitted.

Thereafter, the process transfers to step S120, and the position of the front half-cut line HC1 described above is set. In this setting, on the basis of the detection signal of the cartridge sensor 191 or the input operation signal, the position of the front half-cut line HC1 on the tape corresponding to the above-mentioned cartridge information is set. That is, as described above, the arrangement interval (in other words, the distance between the cutting line CL and the cutting line CL, or the length of one RFID label T) of the RFID circuit elements in the base tape 101 is uniquely determined by the kind of the cartridge 7. Further, the position of the front half-cut line HC1 is (unlike the rear half-cut line HC2) previously determined (for example, stored in a suitable location of the control circuit 110 in the form of a table) by the length of this RFID label T to be a certain position from the leading end of the label tape 109 with print, irrespective of the content of the label print R. In this procedure, under the assumption as mentioned above, the position of the front half-cut line HC1 mentioned above is (fixedly) set to a position that is previously defined for each cartridge 7.

Then, in step S125, the communication position on the tape with the RFID circuit element To described above is set. As in step S120 mentioned above, in this setting as well, on the basis of the detection signal of the cartridge sensor 191 or the input operation signal, the arrangement position of the RFID circuit element To in the label tape 109 with print is (fixedly) set to a position previously defined for each cartridge 7 under the assumption that the kind (size) and arrangement position of the RFID circuit element To are previously determined by the kind of the cartridge 7 to be a certain position from the leading end of the label tape 109 with print.

Thereafter, the process transfers to step S130, and on the basis of the print data prepared in step S110 mentioned above, the position on the tape where the printing of the label print R ends is calculated. That is, this position varies in accordance with the content of the label print R such that when the print length is long, the printing end position becomes (relatively) closer to the rear end portion of the label, and when the print length is long, the printing end position becomes (relatively) closer to the front end portion of the label.

Then, in step S135, the position of the rear half-cut line HC2 described above is set. In this setting, on the basis of the detection signal of the cartridge sensor 191 or the input operation signal, and the printing end position calculated in step S130 mentioned above, the position of the rear half-cut line HC2 on the tape corresponding to the above-mentioned cartridge information is set. That is, under the assumption that the distance from the printing end position to the rear half-cut line HC2 is previously determined to a certain distance by the kind of the cartridge 7, the position of the rear half-cut line HC2 on the tape is calculated by adding (intervening) the determined distance with respect to the printing end position calculated in step S130 mentioned above.

Thereafter, the process transfers to step S140, and the position (full-cut position) of the cutting line CL of the label tape 109 with print is set. As in step S120 mentioned above, in this setting as well, on the basis of the detection signal of the cartridge sensor 191 or the input operation signal, under the assumption that the size of the label is previously determined to be a certain size by the kind of the cartridge 7, the cutting position of the label tape 109 with print is (fixedly) set to a position that is previously defined for each cartridge 7.

Then, in step S145, the rear end position of the RFID circuit element To on the tape mentioned above is set. In this setting as well, in the same manner as described above, on the basis of the detection signal of the cartridge sensor 191 or the input operation signal, and under the assumption that the kind (size) and the arrangement position of an RFID circuit element To are previously determined by the kind of the cartridge 7, the rear end position of the RFID circuit element To in the label tape 109 with print is (fixedly) set to a position that is previously defined for each cartridge 7.

Then, in step S170, when performing communication with an RFID circuit element To from the loop antenna LC that will be described later, variables M, N for counting the number of times communication retry is performed (the number of times of access try) if there is no response from the RFID circuit element To are initialized to 0, and this routine is ended.

FIG. 34 is a flowchart showing the detailed procedure of step S100B descried above. The procedures that are equivalent to those of FIG. 33 mentioned above are denoted by the same reference numerals, and description thereof is omitted or simplified as appropriate. In the flow shown in FIG. 34, first, in step S110, in the same manner as in FIG. 33 mentioned above, an operation signal from the PC 118 is input via the communication line NW and the input/output interface 113 (or an operation signal from suitable operation means provided in the tag-label producing device 1 is input), and print data corresponding to print information included in this operation signal is created.

Next, the process transfers to step S120 where, in the same manner as in FIG. 33 mentioned above, on the basis of the detection signal of the cartridge sensor 191 or the input operation signal, the position of the front half-cut line HC1 on the tape corresponding to the above-mentioned cartridge information is set. That is, the position of the front half-cut line HC1 is (unlike the rear half-cut line HC2) previously determined (for example, stored in a suitable location of the control circuit 110 in the form of a table) to be a certain position from the leading end position of the label tape 109-0 with print, irrespective of the content of the label print R. In this procedure, under the assumption as mentioned above, the position of the front half-cut line HC1 mentioned above is (fixedly) set to a position that is previously defined for each cartridge 7-0.

Thereafter, the process transfers to step S130, and on the basis of the print data created in step S110 mentioned above, the position on the tape where the printing of the label print R ends is calculated. That is, this position varies in accordance with the content of the label print R such that when the print length is long, the printing end position becomes (relatively) closer to the rear end portion of the label, and when the print length is long, the printing end position becomes (relatively) closer to the front end portion of the label.

Then, in step S135, the position of the rear half-cut line HC2 described above is set. In this setting, on the basis of the detection signal of the cartridge sensor 191 or the input operation signal, and the printing end position calculated in step S130 mentioned above, the position of the rear half-cut line HC2 on the tape corresponding to the above-mentioned cartridge information is set. That is, under the assumption that the distance from the printing end position to the rear half-cut line HC2 is previously determined to a certain distance by the kind of the cartridge 7-0, the position of the rear half-cut line HC2 on the tape is calculated by adding (intervening) the determined distance with respect to the printing end position calculated in step S130 mentioned above.

Thereafter, the process transfers to step S140, and the position (full-cut position) of the cutting line CL of the label tape 109-0 with print is set. As in FIG. 33 mentioned above, in this setting as well, on the basis of the detection signal of the cartridge sensor 191 or the input operation signal, under the assumption that the size of the label is previously determined to be a certain size by the kind of the cartridge 7-0, the cutting position of the label tape 109-0 with print is (fixedly) set to a position that is previously defined for each cartridge 7-0.

FIG. 35 is a flowchart showing the detailed procedure of step S200 described above. In the flow shown in FIG. 35, first, in step S210, it is determined whether or not the label tape 109 with print has been fed to the communication position with the loop antenna LC described above (in other words, whether or not the label tape 109 with print has reached the position as set in step S125 mentioned above where the loop antenna LC substantially directly faces the position of the RFID circuit element To). As in step S20 of FIG. 30 described above, the determination at this time as well may be performed by, for example, detecting by a predetermined known method the distance by which the label tape 109 with print has been fed after the detection of the identifier PM of the base tape 101 in step S35 mentioned above. The determination is not satisfied until the arrival at the communication position and this procedure is repeated, and upon the arrival at the communication position, the determination is satisfied and the process transfers to the next step S220.

In step S220, as in step S50 mentioned above, the rotations of the tape feed roller 27, ribbon take-up roller 106, and drive roller 51 are stopped, and feeding of the label tape 109 with print is stopped in the state with the loop antenna LC substantially directly facing the RFID circuit element To. Further, the energization of the print head 23 is stopped to thereby stop (interrupt) the printing of the above-mentioned label print R (see FIG. 24F).

Thereafter, the process transfers to step S400, and transmission/reception of information is performed via wireless communication between the antenna LC and the RFID circuit element To, thereby performing information transmission/reception processing of writing the information created in step S115 of FIG. 33 mentioned above to the IC circuit part 151 of the RFID circuit element To (or reading information previously stored in the IC circuit part) (for details, see FIG. 37 that will be described later).

Then, in step S240, in the same manner as in step S60 of FIG. 30, the tape feed roller 27, the ribbon take-up roller 106, and the drive roller 51 are rotationally driven to resume the feeding of the label tape 109 with print, and the print head 23 is energized to resume the printing of the label print R.

Thereafter, the process transfers to step S250, and it is determined whether or not the label tape 109 with print has been fed to the above-described printing end position (calculated in step S130 of FIG. 33 mentioned above). The determination at this time as well may be performed by, for example, detecting by a predetermined known method the distance by which the label tape 109 with print has been fed after the detection of the identifier PM of the base tape 101 in step S35 mentioned above. The determination is not satisfied until the arrival at the printing end position and this procedure is repeated, and upon the arrival at the printing end position, the determination is satisfied and the process transfers to the next step S260.

In step S260, as in step S50 of FIG. 30 mentioned above, the energization of the print head 23 is stopped to stop the printing of the above-mentioned label print R. This completes the printing of the label print R with respect to the print area S (see FIG. 24H).

Thereafter, the process transfers to step S500, and rear half-cut processing, in which the formation of the rear half-cut line HC2 is performed using the half-cutter 34 of the half-cut unit 35 after the label tape 109 with print is fed to a predetermined rear half-cut position, is carried out (for details, see FIG. 39 that will be described later).

When step S500 as described above is finished, this routine is ended.

FIG. 36 is a flowchart showing the detailed procedure of step S300 described above. In the flowchart shown in FIG. 36, first, in step 310, in the same manner as in step S250 of FIG. 35, it is determined whether or not the label tape 109 with print has been fed to the above-described printing end position (calculated in step S130 of FIG. 33 mentioned above). The determination at this time as well may be performed in the same manner as in step S250. The determination is not satisfied until the arrival at the printing end position and this procedure is repeated, and upon the arrival at the printing end position, the determination is satisfied and the process transfers to the next step S320.

In step S320, in the same manner as in step S260 of FIG. 35 mentioned above, the energization of the print head 23 is stopped to thereby stop the printing of the above-mentioned label print R. This completes the printing of the label print R with respect to the print area S (see FIG. 26F).

Thereafter, the process transfers to step S330, and in the same manner as in step S210 of FIG. 35 mentioned above, it is determined whether or not the label tape 109 with print has been fed to the communication position with the loop antenna LC described above. The determination at this time as well may be performed in the same manner as in step S210. The determination is not satisfied until the arrival at the communication position and this procedure is repeated, and upon the arrival at the communication position, the determination is satisfied and the process transfers to the next step S340.

In step S340, in the same manner as in step S220 mentioned above, the rotations of the tape feed roller 27, ribbon take-up roller 106, and drive roller 51 are stopped, and feeding of the label tape 109 with print is stopped in the state with the loop antenna LC substantially directly facing the RFID circuit element To (see FIG. 26G).

The step S400 after step S340 is the same as that of FIG. 35, and information transmission/reception processing of performing transmission/reception of information via wireless communication between the antenna LC and the RFID circuit element To is carried out (for details, see FIG. 37 that will be described later).

Thereafter, in step S360, as in step S240 of FIG. 35, the tape feed roller 27, the ribbon take-up roller 106, and the drive roller 51 are rotationally driven to resume the feeding of the label tape 109 with print (see FIG. 26H).

Since step S500 after step S360 is the same as that of FIG. 35, the description thereof is omitted.

FIG. 37 is a flowchart showing the detailed procedure of step S400 described above with reference to FIGS. 35 and 36. It should be noted that in this example, of the information writing and information reading described above, the description is directed to the case of information writing.

First, in step S405 of the flow shown in FIG. 37, a control signal is output to the above-described transmitting circuit 306 (see FIG. 16 or the like) via the input/output interface 113, and as an "Erase" signal for initializing information stored in the memory part 157 of the RFID circuit element To, a carrier wave on which predetermined modulation has been performed is transmitted via the loop antenna LC to the RFID circuit element To to which information is to be written. The memory part 157 of the RFID circuit element To is thus initialized.

Next, in step S410, a control signal is transmitted to the transmitting circuit 306 via the input/output interface 113, and as a "Verify" signal for verifying the contents of the memory part 157, a carrier wave on which predetermined modulation has been performed is transmitted via the loop antenna LC to the RFID circuit element To to which information is to be written, thus urging a reply.

Thereafter, in step S415, a reply signal transmitted from the RFID circuit element To, to which writing is to be performed, in response to the above-mentioned "Verify" signal is received via the loop antenna LC, and taken in via the receiving circuit 307 (see FIG. 16 or the like) and the input/output interface 113.

Next, in steps S420, on the basis of the reply signal received as mentioned above, information in the memory part 157 of that RFID circuit element To is checked to determine whether or not the memory part 157 has been properly initialized.

If the determination is not satisfied, the process transfers to step S425 where 1 is added to M, and further in step S430, it is determined whether or not M=5. If M≦4, the determination is not satisfied, and the process returns to step S405 to repeat the same procedure. If M=5, the process transfers to step S435. In step S435, an error display signal is output to the above-mentioned PC 118 via the input/output interface 113 and the communication line NW so that a corresponding writing failure (error) display is made, and this routine is ended. In this way, even when the initialization is unsuccessful, retry is performed up to 5 times.

If the determination in step S420 is satisfied, the process transfers to step S440 where a control signal is output to the transmitting circuit 306, and as a "Program" signal for writing desired data to the memory part 157, a carrier wave on which predetermined modulation has been performed is transmitted to the RFID circuit element To to which information is to be written, thus performing writing of information.

Thereafter, in step S445, a control signal is output to the transmitting circuit 306, and as the "Verify" signal, a carrier wave on which predetermined modulation has been performed is transmitted via the loop antenna LC to the RFID circuit element To to which information is to be written, thus urging a reply. Thereafter, in step S450, a reply signal transmitted from the RFID circuit element To, to which writing is to be performed, in response to the received "Verify" signal mentioned above is received via the loop antenna LC, and taken in via the receiving circuit 307 and the input/output interface 113.

Next, in step S455, on the basis of the received reply signal mentioned above, information stored in the memory part 157 of that RFID circuit element To is checked, and it is determined using a known error detecting code (CRC code: Cyclic Redundancy Check or the like) whether or not the predetermined information transmitted as described above has been properly stored into the memory part 157.

If the determination is not satisfied, the process transfers to step S460 where 1 is added to N, and further in step S465, it is determined whether or not N=5. If N≦4, the determination is not satisfied, and the process returns to step S440 to repeat the same procedure. If N=5, the process transfers to step S435, and in the same manner as described above, a writing failure (error) display corresponding to the PC 118 is made and this routine is ended. In this way, even when the writing of information is unsuccessful, retry is performed up to 5 times.

If the determination in step S455 is satisfied, the process transfers to step S470. In step S470, a control signal is output to the transmitting circuit 306, and a carrier wave on which predetermined modulation has been performed is transmitted as a "Lock" command via the loop antenna LC to the RFID circuit element To to which information is to be written, thereby prohibiting additional writing of information to that RFID circuit element To. This completes the writing of RFID tag information to the RFID circuit element To to which writing is to be performed.

Thereafter, the process transfers to step S480, and a combination of the information written to the RFID circuit element To in step S440 mentioned above, and the print information of the label print R that has already been printed in the print area S by the print head 23 in correspondence with the above-mentioned information, is output via the input/output interface 113 and the communication network NW and stored into the information server IS or the route server RS. It should be noted that this storage data is stored and retained in the database of each of the servers IS and RS, for example, so that it can be referenced by the PC 118 as required. In this way, this routine is ended.

FIG. 38 is a flowchart showing the detailed procedure of step S700 described above. In the flow shown in FIG. 38, first, in step S710, as in step S310 of FIG. 36, it is determined whether the label tape 109-0 with print has been fed to the above-described printing end position (calculated in step S130 of FIG. 34 mentioned above). As described above, the determination at this time may be performed by, for example, determining whether or not feeding has been performed by a corresponding distance after the cutting by the cutting mechanism 15, on the basis of the count value of the number of pulses output by the feed-motor drive circuit 121 for driving the feed motor 119 that is a pulse motor. The determination is not satisfied until the arrival at the printing end position and this procedure is repeated, and upon the arrival at the printing end position, the determination is satisfied, and the process transfers to the next step S720.

In step S720, in the same manner as in step S320 of FIG. 36 mentioned above, the energization of the print head 23 is stopped to thereby stop the printing of the above-mentioned label print R. This completes the printing of the label print R with respect to the print area S (see FIG. 28H).

Thereafter, the process transfers to step S500 that is the same as one described above, and rear half-cut processing, in which the formation of the rear half-cut line HC2 is performed using the half-cutter 34 of the half-cut unit 35 after the label tape 109-0 with print is fed to a predetermined rear half-cut position, is carried out (for details, see FIG. 39 that will be described later).

FIG. 39 is a flowchart showing the detailed procedure of step S500 described above with reference to FIGS. 35, 36, and 38.

In the flow shown in FIG. 39, first, in step S520, in the same manner as in step S45, it is determined whether or not the label tape 109, 109-0 with print has been fed to the above-described rear half-cut position (in other words, whether or not the label tape 109, 109-0 with print has reached the position where the half-cutter 34 of the half-cut mechanism 35 directly faces the rear half-cut line HC2 calculated in step S135 of FIG. 33 or 34). In the same manner as described above, in the case of the cartridge 7, the determination at this time may be performed by, for example, detecting the distance by which the label tape 109 with print has been fed after the detection of the identifier PM of the base tape 101 in step S10 mentioned above (in the case of the cartridge 7-0, the distance by which the label tape 109-0 with print has been fed after the cutting by the cutting mechanism 15), by counting the number of pulses output by the feed-motor drive circuit 121 or the like. The determination is not satisfied until the arrival at the rear half-cut position and this procedure is repeated, and upon the arrival at the rear half-cut position, the determination is satisfied and the process transfers to the next step S530.

In step S530, in the same manner as in step S80 or the like described above, a control signal is output to the feed-motor drive circuit 121 and the tape-discharging-motor drive circuit 123 via the input/output interface 113, and the drives of the feed motor 119 and tape discharging motor 65 are stopped, thus stopping the rotations of the tape feed roller 27, ribbon take-up roller 106, and drive roller 51. Accordingly, in the state with the half-cutter 34 of the half-cut mechanism 35 directly facing the rear half-cut line HC2 calculated in step S135 mentioned above, the paying out of the base tape 101, 101-0 from the first roll 102, 102-0, the paying out of the cover film 103 from the second roll 104, and the feeding of the label tape 109, 109-0 with print stop.

Thereafter, the process transfers to step S540, and in the same manner as in step S55 mentioned above, a control signal is output to the half-cutter motor drive circuit 128 to pivot the half-cutter 34, thereby performing rear half-cutting processing of cutting the cover film 103, adhesive layer 101a, base film 101b, and adhesive layer 101c of the label tape 109 with print (the cover film 103, adhesive layer 101a-0, base film 101b-0, and adhesive layer 101c-0 of the label tape 109-0 with print) to form the rear half-cut line HC2 (see FIG. 24I, 26I, and 28I).

Then, the process transfers to step S550 where, in the same manner as in step S60 mentioned above, the tape feed roller 27, the ribbon take-up roller 106, and the drive roller 51 are rotationally driven to resume the feeding of the label tape 109, 109-0 with print, and this routine is ended.

In the label producing device 1 of this embodiment configured as described above, the cartridge 7 for producing the RFID label T or the cartridge 7-0 for producing the ordinary label T-0 is loaded onto the cartridge holder 6, the predetermined label print R is printed by the print head 23 with respect to the print area S of the cover film 103, the cover film 103 and the base tape 101 or 101-0 are bonded together to form the label tape 109 or 109-0 with print, and the label tape 109 or 109-0 with print is cut by the cutting mechanism 15 into a predetermined length, thereby producing the RFID label T or ordinary print label T-0.

Due to such reasons that the cartridge 7, 7-0 is detached from the cartridge holder 6 while a plurality of labels T, T-0 are being produced in this way, slack may develop in the tape 109, 101, 103 or 109-0, 101-0, 103 and the ink ribbon 105 in the tape feed path. If this is left as it is, for example, print fading or the like can occur, so it is preferable to reduce this slack. In the tag-label producing device 1 of this embodiment, the control circuit 110 can execute the FEED processing that is a mode for performing tape slack reducing processing, thereby making it possible to impart a driving force to and feed the label tape 109, 109-0 with print by the tape feed roller 27 to reduce the above-mentioned tape slack.

Here, a plurality of RFID circuit elements To are arranged at predetermined intervals in the base tape 101 paid out from the cartridge 7. In this regard, at the time of cutting the tape by the cutting mechanism 15 to form a label, in order to maintain soundness, it is necessary to set the tape feed position in such a way that does not cause these RFID circuit elements to be cut. Accordingly, in the case where the cartridge 7 and the cartridge 7-0 are selectively used, with regard to the above-mentioned tape slack reducing function, consideration must be given to the feed position setting aimed at preventing the RFID circuit element To of the base tape 101 from being cut. In view of this, according to this embodiment, the mode for performing the above-mentioned tape slack reduction processing is made to differ for each tape kind, with a tag tape mode of step S600 being provided separately from an ordinary-tape mode shown in steps S22 to S27 of FIG. 31. Further, the above-mentioned modes are switched in accordance with the result of detection by the cartridge sensor 191 as to which one of the cartridges 7, 7-0 has been installed. When loading the cartridge 7 to produce the RFID label T, the tag label FEED processing (step S600) corresponding to the tag tape mode is executed, whereby the highest priority is given to the prevention of the cutting of the RFID circuit element To, thereby preventing the soundness of the RFID circuit element To from being impaired; when loading the cartridge 7-0 to produce the ordinary label T-0, FEED processing of steps S22 to S27 corresponding to the ordinary-tape mode is executed, whereby the highest priority is given to the feeding aimed at reducing the tape slack, thereby making it possible to reduce the slack with reliability.

Further, in this embodiment, in particular, the tape feed distance U1 in step S600 mentioned above corresponding to the tag tape mode is set to a minute distance shorter than the feed distance U in steps S22 to S27 corresponding to the ordinary-tape mode, whereby the influence of tape feeding on the setting of the tape feed position of the label tape 109-0 with print is minimized, thereby making it possible to prevent the RFID circuit element To from being cut.

It should be noted that the present disclosure is not limited to the above-mentioned embodiment but can be modified in various ways without departing from the scope and technical idea thereof. Such modifications will be sequentially described below.

(1) When Tape Cutting is Performed Even in the Tag Tape Mode

While in the above-mentioned embodiment the cutting of the label tape 109 with print is not performed in the tag label FEED processing of step S600 as the tag label mode (only feeding by the distance U1 is performed), this should not be construed restrictively. If an extremely minute amount (a feed distance such that even after the feeding, the cutting mechanism 15 does not directly face the RFID circuit element To and hence does not cut the RFID circuit element To; see FIG. 41 that will be described later) can be set as the feed distance, the tape cut processing using the cutting mechanism 15 may be performed in the same manner as in the ordinary-tape mode mentioned above.

FIG. 40 is a flowchart, substantially corresponding to FIG. 32 of the above-mentioned embodiment, showing the detailed procedure of step S600 according to this modification. The procedures that are the same as those of FIG. 32 are denoted by the same reference numerals, and description thereof is omitted. In the tag label FEED processing shown in FIG. 40, instead of step S610, step S610A corresponding to step S610 is provided. In step S610A, in order to remove (or reduce) slack while reliably preventing the RFID circuit element To from directly facing the cutting mechanism 15, feeding of the base tape 101, cover film 103, label tape 109 with print by the tape feed roller 27 is performed in advance by a minute distance U2 (which is shorter than the distance U1 in the above-mentioned embodiment). FIG. 41A to 41D are views each corresponding to FIG. 24 mentioned above and showing the behaviors at this time, of which FIG. 41B shows a state in which the label tape 109 with print has been fed by the distance U2 from the state shown in FIG. 41a and slack has been thus substantially removed or reduced. It should be noted that since the roller holder 25 is in the pressure engagement state at this time, the ink ribbon 105 is also fed similarly.

In FIG. 40, after step S610A, the process transfers to step S620 that is newly provided, and as in step S24 mentioned above, a control signal is output to the cutter-motor drive circuit 122 to drive the cutter motor 43, and the movable blade 41 of the cutting mechanism 15 is pivoted to perform full-cut processing of cutting (severing) the label tape 109 with print. Accordingly, on the rear side from this cutting position, a label tape 109 with print whose slack has been substantially removed (or removed) remains with its leading end positioned at the position of the cutting mechanism 15 (see FIG. 41C).

Thereafter, the process transfers to step S621 where, as in step S26 mentioned above, the drive of the tape discharging motor 65 is resumed to resume the feeding by the drive roller 51, and the leading end portion of the label tape 109 with print (however, in actuality, there may be cases where no printing has been performed in this portion) that has been cut off in step S620 is fed toward the label discharge port 11 and discharged to the outside of the tag-label producing device 1 from the label discharge port 11.

Since the subsequent step S615 is the same as that in FIG. 32, the description thereof is omitted. FIG. 42 is a view, substantially corresponding to FIG. 25 described above, showing an example of the RFID label T according to this embodiment completed as mentioned above. FIG. 32 differs from FIG. 25 in that, as shown in the drawing, the portion that is relatively close to the identifier PM is cut by the cutting mechanism 15.

In this modification as well, as in the above-mentioned embodiment, by setting the tape feed amount at the time of tape slack reduction processing in the tag tape mode to the minute distance U2 smaller than that in the ordinary-tape mode, the influence of tape feeding on the setting of the tape feed position of the base tape 101 is minimized, thereby making it possible to prevent the cutting of the RFID circuit element To.

(2) When Tape Cutting is Performed After Feeding by a Long Distance

According to the modification of (1) mentioned above, in the tag label FEED processing of step S600 corresponding to the tag tape mode, feeding by the minute distance U2 is performed in order to avoid the cutting of the RFID circuit element To. However, this should not be construed restrictively. A configuration is also possible in which, conversely, the feed distance is set to a relatively large value (distance substantially corresponding to one RFID label T), and the RFID label T is formed without using the RFID circuit element To that is likely to be cut by the cutting mechanism 15 but by using the next succeeding one of the RFID circuit elements To.

FIG. 43 is a flowchart, corresponding to FIG. 32 or 40 mentioned above, showing the detailed procedure of step S600 according to this modification. The procedures that are the same as those of FIG. 32 are denoted by the same reference numerals, and description thereof is omitted.

In the FEED processing shown in FIG. 43, first, in step S605 similar to step S403 mentioned above, the roller holder 25 is switched into the pressure engagement position by the switching mechanism 193, and then the process transfers to step S622.

In step S622, as in step S30 of FIG. 30 described above, a control signal is output to the feed-motor drive circuit 121 to rotationally drive the tape feed roller 27 and the ribbon take-up roller 106, and further the drive roller 51 is rotationally driven via the tape-discharging-motor drive circuit 123, thereby starting the feeding of the label tape 109 with print. It should be noted that since the roller holder 25 is in the pressure engagement state at this time, the ink ribbon 105 is also fed similarly. FIG. 44AO1 to 44A are views each corresponding to FIG. 24 mentioned above and showing the behaviors at this time; feeding is started in the manner as mentioned above from the slacked state shown in FIG. 44AO1 (see FIG. 44AO2).

Thereafter, the process transfers to step S623, and as in step S35 of FIG. 30 mentioned above, on the basis of a detection signal of the mark sensor 127 input via the input/output interface 113, it is determined whether or not the identifier PM of the label tape 109 with print has been detected. The same procedure is repeated until the determination is satisfied, and when the identifier PM is detected by the mark sensor 127 due to the above-mentioned feeding (see FIG. 44AO3), the determination is satisfied, and the process transfers to the next step S624.

In step S624, as in step S75 of FIG. 30, it is determined whether or not the label tape 109 with print has been fed to the above-described full-cut position (in other words, whether or not the label tape 109 with print has reached the position where the movable blade 41 of the cutting mechanism 15 directly faces the cutting line CL set in step S100A). The determination at this time may be performed by, for example, calculating the distance by which the label tape 109 with print has been fed after the detection of the identifier PM of the base tape 101 in step S623 mentioned above, through the counting of the number of pulses output by the feed-motor drive circuit 121.

Once the label tape 109 with print is fed to the above-described full-cut position, the determination of step S624 mentioned above is satisfied, and as in step S80 mentioned above, the rotations of the tape feed roller 27, ribbon take-up roller 106, and drive roller 51 are stopped to thereby stop the feeding of the label tape 109 with print. Accordingly, in order to remove slack while reliably avoiding a situation where the RFID circuit element To directly faces the cutting mechanism 15, the feeding of the base tape 101, cover film 103, label tape 109 with print by the tape feed roller 27 is performed in advance by a distance longer than the distance U in the above-mentioned ordinary-tape mode. FIG. 44AO4 shows a state in which slack has been removed by feeding the label tape 109 with print by a long distance in this way.

Since steps S620, S621, and S615 thereafter are the same as those of FIG. 40 mentioned above, description thereof is omitted. In the state shown in FIG. 44A, the leading end portion has been cut off in step S620, and this leading end portion has been discharged in step S621.

In this modification, by setting the tape feed amount in step S600 corresponding to the tag tape mode to be larger than that in the ordinary-tape mode, the tag-tape feed amount at the time of tape slack reduction processing is set to a long distance substantially equal to the arrangement pitch of the RFID circuit element To in the base tape 101. Accordingly, it is possible to set the tape feed position in such a way that cutting is not performed anew with respect to the RFID circuit element To arranged succeeding to the RFID circuit element To that has been a setting target prior to the tape slack reduction processing.

(3) When Feeding Only the Ink Ribbon

The foregoing description is directed to the case where, in the tag label FEED processing of step S600 corresponding to the tag tape mode, feeding of both the label tape 109 with print and the ink ribbon 105 is performed in order to perform the slack removal (or reduction) processing. However, this should not be construed restrictively. When it suffices to remove mainly the slack of the ink ribbon 105, only feeding of the ink ribbon 105 may be performed.

FIG. 45 is a flowchart, corresponding to FIG. 32, 40, 43, or the like mentioned above, showing the detailed procedure of step S600 according to this modification. In the FEED processing shown in FIG. 45, first, in step S615 similar to step S40 or S43 mentioned above, the switching mechanism 193 is driven to switch the roller holder 25 into the release position (separated position), and then the process transfers to step S626.

In step S626, in the state with the roller holder 25 released as mentioned above, as in step S30 of FIG. 30 described above, a control signal is output to the feed-motor drive circuit 121, and the tape feed roller 27 and the ribbon take-up roller 106 are rotationally driven by the drive force of the feed motor 119. Accordingly, feeding of only the ink ribbon 105 is started without feeding of the label tape 109 with print; once the feeding is performed by a predetermined amount U4 (for example, an amount sufficient for removing slack from the ink ribbon 105), the above-mentioned rotational drive is stopped, and this routine is ended.

This modification provides the following effects. That is, as described above, in the tag-label producing device 1, printing is performed by bringing the cover film 103 as the target printing medium into intimate contact with the thermal head 23 as the print head through the ink ribbon 105, followed by thermal transfer of ink. Accordingly, not only the label tape 109 with print and the cover film 103 but also the ink ribbon 105 is fed by the drive force of the tape feed roller 27. At this time, slack may develop also in the ink ribbon 105 as in each tape 109, 101, 103, and it is thus preferable to reduce this slack in order to prevent print fading or the like. In this embodiment, in the ordinary-tape mode, the tape 109-0, 101-0, 103 is fed together with the ink ribbon 105, whereby the highest priority is given to the feeding aimed at reducing slack in the tape 109-0, 101-0 or the ink ribbon 105, thereby making it possible to reduce this slack with reliability. Further, in the tag tape mode, no drive force is imparted to the tape 109, 101, 103 and hence no feeding is performed, and drive force is imparted only to the ink ribbon 105 to feed the ink ribbon 105, whereby the influence on the setting of the tape feed position of the base tape 101 is eliminated while giving the highest priority to the prevention of the cutting of the RFID circuit element To, thereby making it possible to reliably prevent the soundness of the RFID circuit element To from being impaired.

(4) When No Feeding is Performed in the Tag Tape Mode

While in the foregoing description the feeding of at least the label tape 109 with print or ink ribbon 105 is performed for effecting the slack removal (or reduction) processing in the tag label FEED processing of step S600 corresponding to the tag tape mode, this should not be construed restrictively; a configuration is also conceivable in which feeding is not performed at all.

FIG. 46 is a flowchart, corresponding to FIG. 32, 40, 43, 45, or the like mentioned above, showing the detailed procedure of step S600 according to this modification. In the FEED processing shown in FIG. 46, as shown in the drawing, no particular processing is performed. That is, in other words, while in the ordinary-tape mode the feeding aimed at the tape slack reduction processing is performed with respect to the label tape 109-0 with print or the like as described above, in the tag tape mode, the drive force for effecting the tape slack reduction processing is not imparted to the tape at all. In this way, since no drive force is imparted to the tape and hence no tape feeding is performed in the tag tape mode, the influence on the setting of the tape feed position of the base tape 101 is eliminated, thereby making it possible to reliably prevent the RFID circuit element To from being cut.

(5) When Tape Bonding is Not Performed

The foregoing description is directed to the system in which printing is performed on the cover film 103 that is separate from the base tape 101 equipped with the RFID circuit element To, and the cover film 103 and the base tape 101 are bonded together. However, this should not be construed restrictively. For example, the present disclosure may be applied to a system (of a type in which no bonding is performed) in which printing is performed on the print area of a cover film layer equipped to a thermal tape. In this case, by using a thermal tape, printing may be performed solely with the heat generated by the print head without particularly using an ink ribbon or the like. Alternatively, it is also possible to perform printing by using an ordinary ink ribbon as in the above-mentioned embodiment.

In this embodiment, although detailed illustration is omitted, in the same manner as described above, the mode for performing the above-mentioned tape slack reduction processing is made to differ for each tape kind between the case where the cartridge for producing the RFID label T is used and the case where the cartridge for producing the ordinary label T-0 is used. It is detected by the cartridge sensor which one of the cartridges has been installed, and the above-mentioned modes are switched in accordance with the result of this detection. That is, when producing the RFID label T, in the same manner as mentioned above, the tag label FEED processing corresponding to the tag tape mode, in which the feed distance differs from that in the ordinary-tape mode, is executed, and the highest priority is given to the prevention of the cutting of the RFID circuit element To, thereby preventing the soundness of the RFID circuit element To from being impaired; when producing the ordinary label T-O, in the same manner as mentioned above, the FEED processing corresponding to the ordinary-tape mode is executed and the highest priority is given to the feeding aimed at reducing tape slack, thereby making it possible to reduce this slack with reliability.

Further, in the case where bonding is not performed as described above, the reel member around which the above-mentioned thermal tape or the like is wound may be configured so as to be capable of rotating in reverse by means of a roller. In this case, a configuration may be conceived in which instead of feeding the tape in the forward direction in order to remove slack as mentioned above, the roller is rotated in reverse by rotationally driving the reel member in reverse, thereby effecting slack removal. In this case as well, as mentioned above, when producing the RFID label T, the tag tape mode processing, in which the feed distance in the direction of the above-mentioned reverse rotation is different from that in the ordinary-tape mode, is executed and the highest priority is given to the prevention of the cutting of the RFID circuit element To; when producing the ordinary label T-0, the ordinary-tape mode processing is executed and the highest priority is given to the feeding aimed at reducing tape slack, thereby making it possible to reduce this slack with reliability.

(6) Others

The foregoing description is directed to the example in which, using a loop antenna as the antenna LC on the device side or the antenna 152 on the RFID circuit element To side, transmission/reception of information is performed by magnetic induction (electromagnetic induction, magnetic coupling, and other such non-contact induction method performed via an electromagnetic field). However, this should not be construed restrictively. For example, transmission/reception of information may be performed by radio communication by using, as the above-mentioned two antennas, dipole antennas, patch antennas, or the like.

Further, while in the foregoing example the half-cut unit 35 is provided separately from the cutting mechanism 15, this should not be construed restrictively. That is, for example, half-cutting may be performed by controlling the pivot angle of the stationary blade 41 of the cutting mechanism 15 to be smaller than that at the time of full-cutting, thus allowing the cutting mechanism 15 to also serve as the half-cut unit 35. The same effect as mentioned above can be attained in this case as well.

While the foregoing description is directed to the example in which RFID tag information is transmitted to the RFID circuit element To and written to the IC circuit part 151 to thereby produce the RFID label T, this should not be construed restrictively. That is, as already mentioned above, the present disclosure is also applicable to the case where the RFID label T is produced by reading RFID tag information from a read-only RFID circuit element To in which predetermined RFID tag information is previously stored and retained in a non-rewritable manner, and performing printing corresponding to the read information. In this case as well, the same effect as mentioned above can be attained.

Further, a configuration may be conceived in which the above-mentioned first roll 102, 102-0 is directly mounted to a predetermined location on the tag-label producing device 1 side in a detachable manner without using the cartridge 7, 7-0, and which one of the rolls 102, 102-0 has been loaded is detected at this time by predetermined detection device. In this case as well, the same effect as mentioned above can be attained.

It is assumed that the "Erase" signal, the "Verify" signal, the "Program" signal, and the like used in the foregoing description conform to the specifications developed by EPC global. EPC global is a non-profit corporation jointly founded by the international EAN association, which is an international association of distribution codes, and the Uniformed Code Council (UCC), which is a distribution code association of the United States. It should be noted that signals that conform to other standards may be used as long as they serve the same function.

Further, other than those already described above, the methods according to the above-mentioned embodiment and the respective modifications may be used in combination as appropriate.

In addition, although not exemplified herein, it is to be understood that the present disclosure is implemented in various modified forms without departing from the scope of the present disclosure.

What is claimed is:

1. A tag-label producing device comprising:
a roll mounting/dismounting part that selectively installs a tag tape roll around which a tag tape is wound, and an ordinary-tape roll around which an ordinary tape is wound, said tag tape having arranged thereon an RFID circuit element including an IC circuit part that stores information and a tag-side antenna connected to said IC circuit part;
at least a roller drive shaft that feeds a tape in a tape length direction, the tape being supplied from said tag tape roll or said ordinary-tape roll mounted on said roll mounting/dismounting part;
a transmitting/receiving device that performs transmission/reception of information to/from said IC circuit part of said RFID circuit element equipped in said tag tape via wireless communication, upon installation of said tag tape roll using said roll mounting/dismounting part;
a detection device that detects which one of said tag tape roll and said ordinary-tape roll has been installed using said roll mounting/dismounting device; and
a controller including, with respect to tape slack reduction processing, a tag tape mode and an ordinary-tape mode respectively corresponding to said tag tape roll and said ordinary-tape roll, that controls said roller drive shaft by switching said mode in accordance with a result of detection by said detection device;
wherein:
said controller controls said roller drive shall so that a predetermined amount of feeding of said tape in a forward or reverse direction for said tape slack reduction processing is performed upon loading said tag tape or said ordinary-tape in said device; and
said controller controls said roller drive shaft so that:
in said ordinary-tape mode, a feeding of said ordinary tape by a first distance for said tape slack reduction processing is performed; and
in said tag tape mode, a feeding of said tag tape by a second distance, which is shorter than said first distance, for said tape slack reduction processing is performed.

2. The tag-label producing device according to claim 1, further comprising a cutting device that cuts said tape; and
said controller controls said roller drive shaft and said cutting device in a coordinated manner so that:
in said ordinary-tape mode, after a feeding of said ordinary tape by said first distance is performed, the feeding is stopped and tape cutting is performed;
in said tag tape mode, after a feeding of said tag tape by said second distance is performed, the feeding is stopped and tape cutting is performed.

3. The tag-label producing device according to claim 1, wherein:
said roller drive shaft rotates a feed roller that performs feeding while in intimate contact with said tape, said feed roller being held by a holding device so as to be capable of advancing/retracting movement with respect to said tape.

4. The tag-label producing device according to claim 1, wherein:
said roll mounting/dismounting part is a cartridge holder to/from which a tag tape cartridge accommodating said tag tape roll or an ordinary-tape cartridge accommodating said ordinary-tape roll can be selectively mounted/dismounted; and
said detection device detects an object to be detected which is provided to said tag tape cartridge or said ordinary tape cartridge.

5. A tag-label producing device comprising:
a roll mounting/dismounting part that selectively installs a tag tape roll around which a tag tape is wound, and an ordinary-tape roll around which an ordinary tape is wound, said tag tape having arranged thereon an RFID circuit element including an IC circuit part that stores information and a tag-side antenna connected to said IC circuit part;
at least a roller drive shaft that feeds a tape in a tape length direction, the tape being supplied from said tag tape roll or said ordinary-tape roll mounted on said roll mounting/dismounting part;
a transmitting/receiving device that performs transmission/reception of information to/from said IC circuit part of said RFID circuit element equipped in said tag tape via wireless communication, upon installation of said tag tape roll using said roll mounting/dismounting part;
a detection device that detects which one of said tag tape roll and said ordinary-tape roll has been installed using said roll mounting/dismounting device; and
a controller including, with respect to tape slack reduction processing, a tag tape mode and an ordinary-tape mode respectively corresponding to said tag tape roll and said ordinary-tape roll, that controls said roller drive shaft by switching said mode in accordance with a result of detection by said detection device:
wherein:
said controller controls said roller drive shaft so that a predetermined amount of feeding of said tape in a forward or reverse direction for said tape slack reduction processing is performed upon loading said tag tape or said ordinary-tape in said device; and
said controller controls said roller drive shaft so that:
in said ordinary-tape mode, a feeding of said ordinary tape by a first distance for said tape slack reduction processing is performed; and
in said tag tape mode, a feeding of said tag tape by a another distance, which is longer than said first distance, for said tape slack reduction processing is performed.

6. The tag-label producing device according to claim 5, further comprising a cutting device that cuts said tape; and
said controller controls said roller drive shaft and said cutting device in a coordinated manner so that:
in said ordinary-tape mode, oiler a feeding of said ordinary tape by said first distance is performed, the feeding is stopped and tape cutting is performed;
in said tag tape mode, after a feeding of said tag tape by said another distance is performed, the feeding is stopped and tape cutting is performed.

7. The tag-label producing device according to claim 5, wherein:
said roller drive shaft rotates a feed roller that performs feeding while in intimate contact with said tape, said feed roller being held by a holding device so as to be capable of advancing/retracting movement with respect to said tape.

8. The tag-label producing device according to claim 5, wherein:
said roll mounting/dismounting part is a cartridge holder to/from which a tag tape cartridge accommodating said tag tape roll or an ordinary-tape cartridge accommodating said ordinary-tape roll can be selectively mounted/dismounted; and
said detection device detects an object to be detected which is provided to said tag tape cartridge or said ordinary tape cartridge.

* * * * *